(12) United States Patent
Weller et al.

(10) Patent No.: US 11,053,134 B2
(45) Date of Patent: Jul. 6, 2021

(54) SYNTHESIS OF NANOSIZED CUBIC LITHIUM LANTHANUM ZIRCONATE FAST ION CONDUCTOR

(71) Applicants: Jon Mark Weller, Phoenix, AZ (US); Candace Chan, Phoenix, AZ (US)

(72) Inventors: Jon Mark Weller, Phoenix, AZ (US); Candace Chan, Phoenix, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 369 days.

(21) Appl. No.: 16/111,939

(22) Filed: Aug. 24, 2018

(65) Prior Publication Data

US 2019/0062176 A1 Feb. 28, 2019

Related U.S. Application Data

(60) Provisional application No. 62/550,155, filed on Aug. 25, 2017.

(51) Int. Cl.
*C01G 25/00* (2006.01)
*H01M 10/0525* (2010.01)
*H01M 10/0562* (2010.01)

(52) U.S. Cl.
CPC ...... *C01G 25/006* (2013.01); *H01M 10/0525* (2013.01); *H01M 10/0562* (2013.01); *C01P 2002/72* (2013.01); *C01P 2002/74* (2013.01); *C01P 2002/76* (2013.01); *C01P 2002/85* (2013.01); *C01P 2004/04* (2013.01);
(Continued)

(58) Field of Classification Search
CPC ............ C01G 25/006; H01M 10/0525; H01M 10/0562; H01M 2300/0077; C01P 2004/51; C01P 2002/76; C01P 2004/64; C01P 2002/72; C01P 2004/04; C01P 2002/85;
(Continued)

(56) References Cited

U.S. PATENT DOCUMENTS 8,906,551 B2  12/2014  Chan et al.
9,590,247 B2  3/2017  Chan
(Continued)

FOREIGN PATENT DOCUMENTS

CN  104332651 A  2/2015
WO  WO2013158307  10/2013
(Continued)

OTHER PUBLICATIONS

Keiteb et al., "A Modified Thermal Treatment Method for the Up-Scalable Synthesis of Size-Controlled Nanocrystalline Titania," Appl. Sci., 2016, 6(295):1-10.
(Continued)

*Primary Examiner* — Anthony J Zimmer
(74) *Attorney, Agent, or Firm* — Fish & Richardson P.C.

(57) ABSTRACT

Synthesizing lithium lanthanum zirconate includes combining a reagent composition with a salt composition to yield a molten salt reaction medium, wherein the reagent composition comprises a lithium component, a lanthanum component, and zirconium component having a lithium:lanthanum:zirconium molar ratio of about 7:3:2; heating the molten salt reaction medium to yield a reaction product; and washing the reaction product to yield a crystalline powder comprising lithium lanthanum zirconate.

20 Claims, 44 Drawing Sheets

(52) U.S. Cl.
CPC ...... *C01P 2004/51* (2013.01); *C01P 2004/62* (2013.01); *C01P 2004/64* (2013.01); *C01P 2006/40* (2013.01); *H01M 2300/0077* (2013.01)

(58) Field of Classification Search
CPC .............. C01P 2002/74; C01P 2006/40; C01P 2004/62; Y02E 60/10; C04B 35/48–4885
See application file for complete search history.

(56) References Cited

U.S. PATENT DOCUMENTS

| | | | |
|---|---|---|---|
| 9,853,324 | B2 | 12/2017 | Chan et al. |
| 10,128,488 | B2 | 11/2018 | Chan |
| 10,170,759 | B2 | 1/2019 | Seo et al. |
| 2010/0047696 | A1 | 2/2010 | Yoshida et al. |
| 2013/0344416 | A1 | 12/2013 | Sakamoto et al. |
| 2014/0072870 | A1 | 3/2014 | Otsuka et al. |
| 2014/0186720 | A1 | 7/2014 | Kintaka |
| 2015/0130115 | A1* | 5/2015 | Sung ........................ C04B 35/64 264/406 |
| 2016/0141605 | A1 | 5/2016 | Chan et al. |
| 2016/0248118 | A1 | 8/2016 | Chan et al. |
| 2016/0293988 | A1 | 10/2016 | Sakamoto et al. |
| 2017/0155169 | A1 | 6/2017 | Hitz et al. |
| 2018/0034054 | A1 | 2/2018 | Chan et al. |
| 2018/0362360 | A1 | 12/2018 | Chan et al. |
| 2018/0375149 | A1 | 12/2018 | Beck et al. |
| 2019/0337817 | A1 | 11/2019 | Weller et al. |
| 2020/0131643 | A1 | 4/2020 | Chan et al. |

FOREIGN PATENT DOCUMENTS

| | | |
|---|---|---|
| WO | WO2013192417 | 12/2013 |
| WO | WO2014134350 | 9/2014 |
| WO | WO2014205381 | 12/2014 |
| WO | WO2015006010 | 1/2015 |
| WO | WO2015038735 | 3/2015 |
| WO | WO 2015006010 A9 | 7/2015 |

OTHER PUBLICATIONS

Afyon et al. "A Shortcut to Garnet-Type Fast Li-Ion Conductors for All-Solid State Batteries". J. Mater. Chem. A 2015, 3, pp. 18636-18648.
Awaka et al. "Synthesis and Structure Analysis of Tetragonal Li7La3Zr2O12 with the Garnet-Related Type Structure". J. Solid State Chem. 2009, 182, pp. 2046-2052.
Baek et al. "Garnet Related Lithium Ion Conductor Processed by Spark Plasma Sintering for All Solid State Batteries". J. Power Sources 2014, 249, pp. 197-206.
Buschmann et al. "Lithium Metal Electrode Kinetics and Ionic Conductivity of the Solid Lithium Ion Conductors 'Li7La3Zr2O12' and Li7—xLa3Zr2—xTaX012 with Garnet-Type Structure". J. Power Sources 2012, 206, pp. 236-244.
Chan et al. "Nanostructured Garnet-Type Li7La3Zr2O12 : Synthesis, Properties, and Opportunities as Electrolytes for Li-Ion Batteries". Electrochim. Acta 2017, 253, pp. 268-280.
Cheng et al. "Effect of surface microstructure on electrochemical performance of garnet solid electrolytes". ACS Appl. Mater. Interfaces 7, pp. 2073-2081 (2015).
Cheng et al. "Interrelationships among Grain Size, Surface Composition, Air Stability, and Interfacial Resistance of Al-Substituted Li7La3Zr2O12 Solid Electrolytes". ACS Appl. Mater. Interfaces 2015, 7, pp. 17649-17655.
Danks et al. "The evolution of 'sol-gel' chemistry as a technique for materials synthesis" Mater. Horizons 3, pp. 91-112 (2016).
Deviannapoorani et al. "Synthesis of Garnet Structured Li7+xLa3YXZr2 XO12 (X=0-0.4) by Modified Sol-Gel Method". J. Sol-Gel Sci. Technol. 2012, 64, pp. 510-514.

Deviannapoorani et al. "Synthesis of Lithium Garnets from La2Zr2O7 Pyrochlore," Solid State Ionics 2015, 283, pp. 123-130.
Fang et al. "Grain growth during sintering of nanosized particles". Ceram. Trans. 209, pp. 389-400 (2010).
Fu et al "Flexible, solid-state, ion-conducting membrane with 3D garnet nanofiber networks for lithium batteries" PNAS, vol. 113 No. 26, Jun. 28, 2016, pp. 7094-7099.
Geiger et al. "Crystal Chemistry and Stability of "Li7La3Zr2O12" garnet: A Fast Lithium-Ion Conductor". Inorg. Chem. 2011, 50, 1089-1097.
Gordon et al. "101, Preparation of Nano- and Microstructured Garnet Li7La3Zr2O12 Solid Electrolytes for Li-Ion Batteries via Cellulose Templating". ACS Sustainable Chem. Eng. 2016, 4, pp. 6391-6398.
Guo et al. "Molten Salt Synthesis of Different Ionic Radii Metallic Compounds Doped Lithium Titanate Used in Li-Ion Battery Anodes". Mater. Trans. 2017, 58, pp. 383-389.
Guo et al. "Molten Salt Synthesis of Nano-Sized Li4Ti5O12 Doped with Fe2O3 for Use as Anode Material in the Lithium-Ion Battery". RSC Adv. 2014, 4, pp. 60327-60333.
Hanc et al. "On Fabrication Procedures of Li-Ion Conducting Garnets," J. Solid State Chem. 2017, 248 (Nov. 2016), pp. 51-60.
Huang et al. "Effect of Sintering Temperature on Structure and Ionic Conductivity of Li7—xLa3Zr2-0.5x (x=0.5 ~ 0.7) Ceramics". Solid State Ionics 2011, 204, pp. 41-45.
Huang et al. "Growth of Well-Developed LaOCl Microplates by Chloride Salt-Assisted Method". CrystEngComm 2017, 19, pp. 2971-2976.
Huang et al. "Preparation of CaZrO3 Powders by a Microwave—Assisted Molten Salt Method". J. Ceram. Soc. Jpn. 2016, 124, pp. 593-596.
Ishiguro et al. "Ta-Doped Li7La3Zr2O12 for Water-Stable Lithium Electrode of Lithium-Air Batteries". J. Electrochem. Soc. 2014, 161, pp. A668-A674.
Janani et al. "Synthesis of cubic Li7La3Zr2O12 by modified sol-gel process". Ionics (Kiel). 17, pp. 575-580 (2011).
Jin et al. "Al-doped Li7La3Zr2O12 synthesized by a polymerized complex method" Journal of Power Sources 196, 2011, pp. 8683-8687.
Kazyak et al. "Atomic Layer Deposition of the Solid Electrolyte Garnet Li7La3Zr2O12". Chem. Mater. 2017, 29, pp. 3785-3792.
Kim et al. "Electrochemical Stability of Li6.5La3Zr1.5M0.5O12 (M=Nb or Ta) against Metallic Lithium. Front". Energy Res. 2016, 4, pp. 1-7.
Knauth "Inorganic Solid Li Ion Conductors: An Overview". Solid State Ionics 2009, 180, pp. 911-916.
Kokal "Solid State Electrolytes for All-Solid-State 3D Lithium-ion Batteries" Technische Universiteit Eindhoven, Jan. 1, 2012, 185, pp. 42-46.
Kokal et al. "Sol-gel Synthesis and Lithium Ion Conductivity of Li7La3Zr2O12 with Garnet-Related Type Structure". Solid State Ionics 2011, 185, pp. 42-46.
Larraz et al. "Cubic Phases of Garnet-Type Li7La3Zr2O12: The Role of Hydration". J. Mater. Chem. A 2013, 1, pp. 11419-1428.
Liu et al. "Garnet-type Li6.4La3Zr1.4Ta0.6O12 thin sheet: Fabrication and application in lithium-hydrogen peroxide semi-fuel cell" Electrochemistry Comminications 48, 2014, pp. 147-150.
Liu et al. "High Lithium Ionic Conductivity in the Garnet-Type Oxide Li72—XLa3Zr2—XMoXO12 (X=0-0.3) Ceramics by Sol-Gel Method". J. Am. Ceram. Soc. 2017, 100, pp. 1527-1533.
Liu et al. "Salt Melt Synthesis of Ceramics, Semiconductors and Carbon Nanostructures". Chem. Soc. Rev. 2013, 42, pp. 8237-8265.
Loho et al. "Garnet-Type Li7La3Zr2O12 Solid Electrolyte Thin Films Grown by CO2-Laser Assisted CVD for All-Solid-State Batteries". J. Electrochem. Soc. 2017, 164, pp. A6131-A6139.
Matsuda et al. "Phase Formation of a Garnet-Type Lithium-Ion Conductor Li7—3xAlxLa3Zr2O12". Solid State Ionics 2015, 277, pp. 23-29.
Murugan et al. "Fast Lithium Ion Conduction in Garnet-Type Li7La3Zr2O12". Angew. Chem., Int. Ed. 2007, 46, pp. 7778-7781.
Ohta et al. "High Lithium Ionic Conductivity in the Garnet-Type Oxide Li7 XLa3(Zr2 X,NbX)O12 (X=0-2)". J. Power Sources 2011, 196, pp. 3342-3345.

(56) References Cited

OTHER PUBLICATIONS

Rahman et al. "Basic Molten Salt Process—A New Route for Synthesis of Nanocrystalline Li4Ti5O12—TiO2 Anode Material for Li-Ion Batteries Using Eutectic Mixture of LiNO3—LiOH—Li2O2". J. Power Sources 2010, 195, pp. 4297-4303.
Ramakumar et al. "Lithium Garnets: Synthesis, Structure, Li+ Conductivity, Li+ Dynamics and Applications". Prog. Mater. Sci. 2017, 88, pp. 325-411.
Rangasamy et al. "The Role of Al and Li Concentration on the Formation of Cubic Garnet Solid Electrolyte of Nominal Composition Li7La3Zr2O12". Solid State Ionics 2012, 206, pp. 28-32.
Reddy et al. "Molten salt synthesis and characterization of fast ion conductor Li6.75La3Zr1.75Ta0.25O12". J. Solid State Electrochem. (2017). 21, pp. 2921-2928.
Sakamoto et al. "Synthesis of Nano-Scale Fast Ion Conducting Cubic Li7La3Zr2O12". Nanotechnology 2013, 24, 42005, pp. 1-8.
Sharafi et al. "Impact of Air Exposure and Surface Chemistry on Li—Li7La3Zr2O12 Interfacial Resistance". J. Mater. Chem. A 2017, 5, pp. 13475-13487.
Shimonishi et al "Synthesis of Garnet-Type Li7 XLa3Zr2O12-1/2x and Its Stability in Aqueous Solutions". Solid State Ionics 2011, 183, pp. 48-53.
Thangadurai et al. "Garnet-Type Solid-State Fast Li Ion Conductors for Li Batteries: Critical Review". Chem. Soc. Rev. 2014, 43, pp. 4714-4727.
Thompson et al. "Tetragonal vs. Cubic Phase Stability in Al-Free Ta Doped Li7La3Zr2O12 (LLZO)". J. Mater. Chem. A 2014, 2, pp. 13431-13436.
Toda et al. "Low Temperature Cubic Garnet-Type CO2-Doped Li7La3Zr2O12". Solid State Ionics 2013, 233, pp. 102-106.
Tsai et al. "High Conductivity of Mixed Phase Al-Substituted Li7La3Zr2O12". J. Electroceram. 2015, 35, pp. 25-32.
Wang et al. "Phase Transition in Lithium Garnet Oxide Ionic Conductors Li7La3Zr2O12: The Role of Ta Substitution and H2O/CO2 Exposure". J. Power Sources 2015, 275, pp. 612-620.
Wang et al. "Preparation of Lanthanum Zirconate Nano-Powders by Molten Salts Method". J. Non-Cryst. Solids 2010, 356, pp. 1049-1051.
Weller et al. "Synthesis of Fine Cubic Li7La3Zr2O12 Powders in Molten LiCl-KCl Eutectic and Facile Densification by Reversal of Li+/H+ Exchange," ACS Appl. Energy Mater. 2018, 1, pp. 552-560. Jan. 9, 2018.
Weller et al., U.S. Appl. No. 16/399.331, filed Apr. 30, 2019, 47 pages. pp. 1-47.
Wolfenstine et al. "Synthesis and High Li-Ion Conductivity of Ga-Stabilized Cubic Li7La3Zr2O12". Mater. Chem. Phys. 2012, 134, pp. 571-575.
Xie et al. "Low-Temperature Synthesis of Li7La3Zr2O12 with Cubic Garnet-Type Structure". Mater. Res. Bull. 2012, 47, pp. 1229-1232.
Yang et al. "Composite Polymer Electrolytes with Li7La3Zr2O12 Garnet-Type Nanowires as Ceramic Fillers: Mechanism of Conductivity Enhancement and Role of Doping and Morphology". ACS Appl. Mater. Interfaces 2017, 9, 21773-21780, and the Supporting Information, pp. S1-S15 (Year: 2017).
Yang et al. "Nanostructured Garnet-Type Solid Electrolytes for Lithium Batteries: Electrospinning Synthesis of Li7La3Zr2O12 Nanowires and Particle Size-Dependent Phase Transformation". J. Phys. Chem. C 2015, 119, pp. 14947-14953.
Yi et al. "Flame Made Nanoparticles Permit Processing of Dense, Flexible, Li+ Conducting Ceramic Electrolyte Thin Films of Cubic-Li7La3Zr2O12 (c-LLZO)". J. Mater. Chem. A 2016, 4, pp. 12947-12954.
Yi et al. "Key Parameters Governing the Densification of Cubic-Li7La3Zr2O12 Li+ Conductors". J. Power Sources 2017, 352, pp. 156-164.
Zhang "Low Temperature Synthesis of Complex Refractory Oxide Powders From Molten Salts". J. Pakistan Mater. Soc. 2007, 1, pp. 49-53.
Zhong et al. "Layered lithium-rich oxide nanoparticles: low-temperature synthesis in mixed molten salt and excellent performance as cathode of lithium-ion battery". Ionics (Kiel). (2017), 23, pp. 1955-1966.
Cassir et al., "Synthesis of ZrO2 Thin Films by Atomic Layer Deposition: Growth Kinetics, Structural and Electrical Properties," Applied Surface Science, 2002, 193(1-4):120-128.
Chen et al., "Effect of a ZrO2 Coating on the Structure and Electrochemistry of LixCoO2 When Cycled to 4.5 V," Electrochemical and Solid-State Letters, Aug. 2, 2002, 5(10):A213, 5 pages.
Chen et al., "Towards Shape Control of Metal Oxide Nanocrystals in Confined Molten Media," Chem. Nano. Mat., 2015, 1(1):18-26.
Cho et al., "Zero-Strain Intercalation Cathode for Rechargeable Li-Ion Cell," Angew. Chemie—Int. Ed., 2001, 40(18):3367-3369.
Daviannapoorani et al., "Synthesis of Lithium garnets from La2Zr2O7 pyrochlore," Solid State Ionics, Oct. 24, 2015, 283:123-130.
Hamalainen et al., "Lithium Phosphate Thin Films Grown by Atomic Layer Deposition," Journal of the Electrochemical Society, Jan. 6, 2012, 159(3):A259-A263.
Karakaya et al., "Assembly of Molten Transition Metal Salt-Surfactant in a Confined Space for the Synthesis of Mesoporous Metal Oxide-Rich Metal Oxide-Silica Thin Films," Chemistry of Materials, May 24, 2011, 23(12):3062-3071.
Kim et al., "Atomic Layer Deposition of ZrO2 Thin Films with High Dielectric Constant on TiN Substrates," Electrochemical Solid-State Letters, Dec. 26, 2007, 11(3):G9-G11.
Kozen et al., "Atomic Layer Deposition of the Solid Electrolyte LiPON," Chemistry of Materials, Jul. 9, 2015, 27(15):5324-5331.
Li et al., "Significant Impact on Cathode Performance of Lithium-Ion Batteries by Precisely Controlled Metal Oxide Nanocoatings via Atomic Layer Deposition," Journal of Power Sources, Aug. 29, 2013, 247:57-69.
Liu et al., "Atomic Layer Deposition of Lithium Tantalate Solid-State Electrolytes," Journal of Physical Chemistry C, Sep. 6, 2013, 117(39):20260-20267.
Liu et al., "Toward 3D Solid-State Batteries via Atomic Layer Deposition Approach," Frontiers in Energy Research, Mar. 12, 2018, 6(10):1-5.
Liu et al., "Ultrathin Atomic Layer Deposited ZrO2 coating to Enhance the Electrochemical Performance of Li4Ti5O12 as an Anode Material," Electrochimica Acta, Jan. 26, 2013, 93:195-201.
Long et al., "Three-Dimensional Battery Architectures," Chemical Reviews, Aug. 19, 2004, 104:4463-4492.
Miyashiro et al., "Improvement of Degradation at Elevated Temperature and at High State-of-Charge Storage by ZrO2 Coating on LiCoO2," Journal of the Electrochemical Society, Dec. 30, 2005, 153(2):A348-A353.
Nisula et al., "Atomic Layer Deposition of Lithium Phosphorus Oxynitride," Chemistry of Materials, Sep. 30, 2015, 27(20):6987-6993.
Pearse et al., "Three-Dimensional Solid-State Lithium-Ion Batteries Fabricated by Conformal Vapor-Phase Chemistry," ACS Nano, Apr. 24, 2018, 12:4286-4294.
Putkonen et al., "Atomic Layer Deposition of Lithium Containing Thin Films," Journal of Materials Chemistry, Dec. 14, 2009, 19(46):8767-8771.
Putkonen et al., "ZrO2 Thin Films Grown on Silicon Substrates by Atomic Layer Deposition with Cp2Zr(CH3)2 and Water as Precursors," Chemical Vapor Deposition, 2003, 9(4):207-212.
Smolenski et al., "A Potentiometric Study of the Interaction of Zr(IV) and O(II) Ions in the LiCl—KCl Eutectic Molten Salt," Journal of the Electrochemical Society, Aug. 18, 2004, 151(9):E302-E305.
Van Hemmen et al., "Plasma and Thermal ALD of Al2O3 in a Commercial 200 Mm ALD Reactor," Journal of the Electrochemical Society, May 21, 2007, 154(7):165-169.
Wang et al., "Atomic Layer Deposited Lithium Silicates as Solid-State Electrolytes for All-Solid-State Batteries," ACS Appl. Mater. Interfaces, Jul. 27, 2017, 9(37):31786-31793.
Wang et al., "Atomic Layer Deposition of Lithium Niobium Oxides as Potential Solid-State Electrolytes for Lithium-Ion Batteries," ACS Applied Materials & Interfaces, 2018, 10(2):1654-1661.

(56) References Cited

OTHER PUBLICATIONS

Whetten et al., "Li7La3Zr2O12 Nanoparticles Prepared Using Molten Salt Synthesis as Ceramic Fillers in Polymer Composite Solid Electrolytes," Presented at MRS Spring Meeting & Exhibit, 2018, Phoenix, AZ, 3 pages.

* cited by examiner

SYNTHESIS OF NANOSIZED CUBIC LITHIUM LANTHANUM ZIRCONATE FAST ION CONDUCTOR

CROSS-REFERENCE TO RELATED APPLICATION

This application claims the benefit of U.S. Application No. 62/550,155 entitled "SYNTHESIS OF NANOSIZED CUBIC LITHIUM LANTHANUM ZIRCONATE FAST ION CONDUCTOR" and filed on Aug. 25, 2017, which is incorporated herein by reference in its entirety.

STATEMENT OF GOVERNMENT INTEREST

This invention was made with government support under DMR 1553519 awarded by the National Science Foundation. The government has certain rights in the invention.

BACKGROUND

Lithium lanthanum zirconate ($Li_7La_3Zr_2O_{12}$, LLZO) is a ceramic ionic conductor that may have a cubic or tetragonal crystal structure. The cubic phase has high lithium-ion (Li-ion) conductivity, but is only thermodynamically favorable at high temperatures (>600° C.). The tetragonal phase is stable at room temperature, but has poor ionic conductivity. Currently, most LLZO is synthesized through solid state reactions, typically requiring high temperatures, repeated heat treatments, ball milling or other mixing methods, as well as carefully controlled addition of extrinsic dopants to stabilize the cubic phase at room temperature. In some cases, dopants used in these processes can often form impurity phases, particularly at interfaces and grain boundaries, resulting in reduced overall conductivity.

SUMMARY

In a general aspect, synthesizing lithium lanthanum zirconate includes combining a reagent composition with a salt composition to yield a molten salt reaction medium. The reagent composition includes a lithium component, a lanthanum component, and zirconium component having a lithium:lanthanum:zirconium molar ratio of about 7:3:2. The molten salt reaction medium is heated to yield a reaction product, and the reaction product is washed to yield a crystalline powder including lithium lanthanum zirconate. The salt composition is selected from the group consisting of one of the following mixtures: a eutectic mixture of potassium chloride and lithium chloride; a eutectic mixture of lithium carbonate, sodium carbonate, and potassium carbonate; a eutectic mixture of lithium chloride and lithium hydroxide; a eutectic mixture of lithium bromide and potassium bromide; and a basic mixture of lithium nitrate, lithium peroxide, and lithium hydroxide in a molar ratio of 1:2:2.

Implementations of the general aspect may include one or more of the following features.

The lithium component may include lithium nitrate, lithium hypochlorite, or both. The lanthanum component may include lanthanum nitrate, lanthanum oxychloride, or both. The zirconium component may include zirconium oxide, zirconium oxynitrate, or both. In some cases, the zirconium component is in the form of zirconium oxide nanoparticles. The molten salt reaction medium may include an extrinsic dopant, such as aluminum, gallium, tantalum, tungsten, or any combination thereof. In some cases, sodium fluoride is combined with the molten salt reaction mixture.

In some cases, the molten salt reaction medium has a reagent composition: salt composition weight ratio of 1:1. The lithium lanthanum zirconate may consist of or consist essentially of cubic phase $Li_7La_3Zr_2O_{12}$. The lithium lanthanum zirconate may be in the form of nanoparticles. A maximum dimension of the nanoparticles is less than 1000 nm, or between 300 nm and 500 nm.

Heating the molten salt reaction medium may include heating to a temperature in a range of 700° C. to 1000° C. Heating the molten salt reaction medium may include heating for a length of time up to 12 hours.

In some cases, the salt composition is melted to yield a molten salt composition before combining the reagent composition with the salt composition, and combining the reagent composition with the salt composition includes combining the reagent composition with the molten salt composition. Heating the molten salt reaction medium comprises heating to a temperature in a range of 500° C. to 600° C. Combining the reagent composition with the salt composition to yield the molten salt reaction medium may include combining the reagent composition with a molten salt composition to yield the molten salt reaction medium. Combining the reagent composition with the salt composition to yield the molten salt reaction medium may include forming a mixture including the reagent composition and the salt composition and heating the mixture to yield the molten salt reaction medium.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
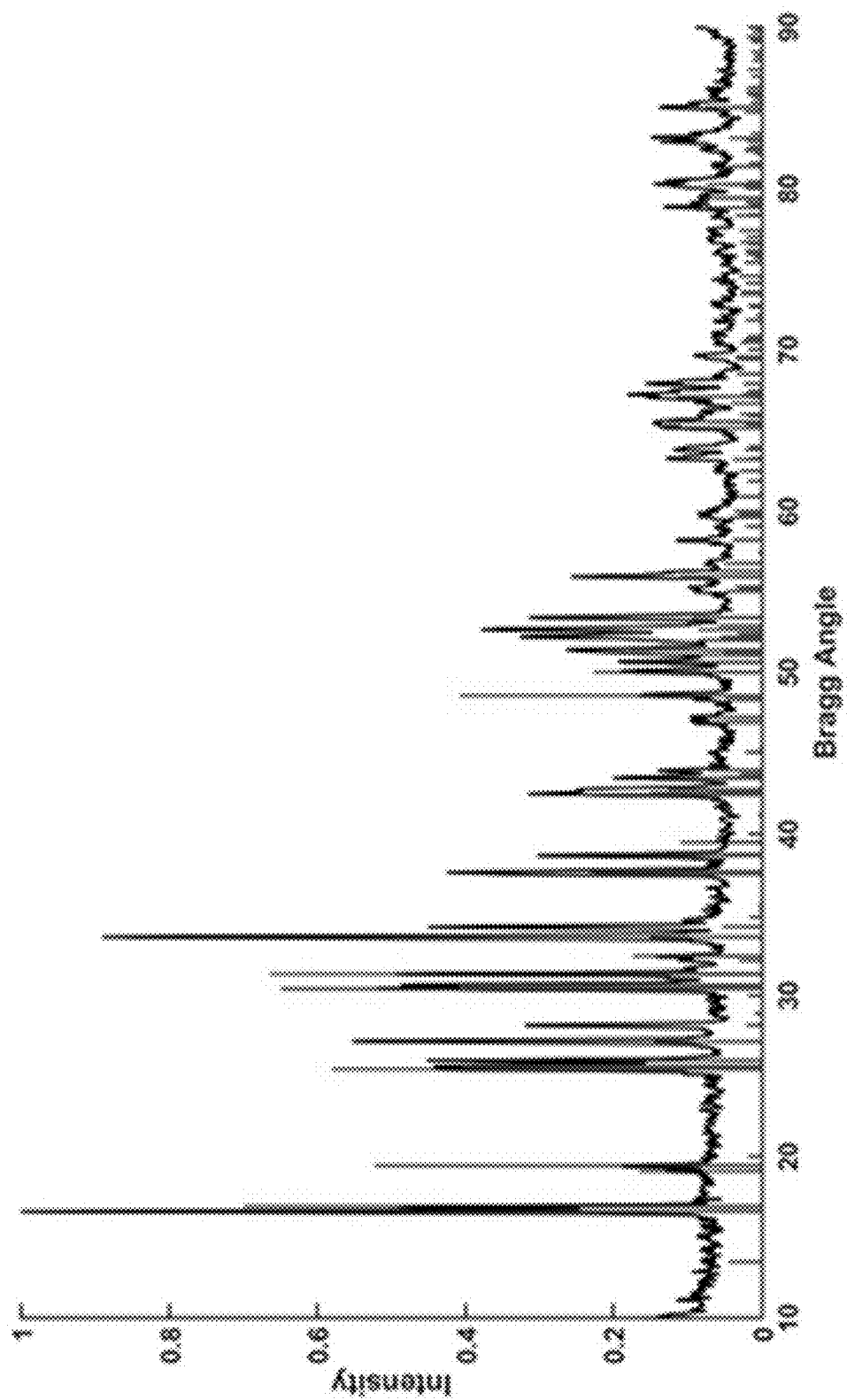
FIG. 1 shows an X-ray diffraction pattern of product obtained from molten salt synthesis of LLZO in eutectic $LiNO_3$:LiCl with comparison to the reference pattern for the tetragonal structure of LLZO.

Cubic lithium lanthanum zirconate (LLZO) is a fast ion conducting solid electrolyte with a high conductivity ($\sigma \sim 10^{-4}$ S/cm). LLZO is chemically stable with respect to elemental lithium and is suitable as a solid electrolyte for lithium-ion batteries (LIBs), allowing pure lithium anodes and thus increasing the energy capacity of a lithium ion battery. LLZO exists in cubic and tetragonal crystal structures. The cubic phase possesses high Li☐ion conductivity, and is thermodynamically favorable at high temperatures (>600° C.), while the tetragonal phase is stable at room temperature and has poor ionic conductivity.

Synthesis of nanostructured LLZO via molten salt synthesis is described. "Molten salt synthesis" (or "molten salt method," "salt melt synthesis," or "molten salt mediated route") involves combining a salt composition including a salt or a mixture of salts ("salt composition" or "molten flux") and a reagent composition commonly in the form of metal oxides or inorganic salts of the desired metal species to form a molten salt reaction medium. The molten salt reaction medium is heated, and the resulting reaction product is washed. In some cases, the reagent composition is combined with a molten salt composition to yield the molten salt reaction medium. By tuning the properties of the molten salt medium as well as the nature of the precursors, phase pure cubic LLZO (c-LLZO) has been synthesized in molten eutectic lithium chloride/potassium chloride from lithium nitrate, lanthanum nitrate, and zirconium oxynitrate without addition of extrinsic dopants. Other precursors such as oxides or other salts (e.g., carbonates, chlorides, hydroxides etc.) may also be used as desired either to tune the properties of the final product or to synthesize the same product at lower cost, and extrinsic dopants may be incorporated as desired. Under the appropriate synthesis conditions, pure LLZO can be synthesized using this molten salt synthesis route as outlined in the subsequent examples.

Reducing the crystallite size of LLZO below a certain threshold (e.g., to nanometric dimensions) can stabilize the cubic phase at low temperatures without the use of extrinsic dopants. In addition to stabilization of the cubic crystalline phase, nanosized ceramics have some particular advantages. For example, the onset temperature of sintering is substantially lower for nanosized ceramic particles due to the relatively higher surface energy of nanoparticles compared to bulk particles. Other advantages include enhanced densification and sintering properties and lower temperature preparation methods.

Molten salt synthesis can provide particular benefits to the synthesis of LLZO, including lower reaction temperatures than those used in solid state reaction (and often in less time), less expensive precursors than those used in sol-gel methods, and a straightforward synthesis route that enables the rapid preparation of fine crystalline powders in a short time. The ability to easily synthesize fine, nonagglomerated powders of LLZO via MSS may promote widespread utilization of LLZO as a solid electrolyte. These uniform and fine powders may enable roll-to-roll processing of electrolyte materials (e.g., by tape-casting, which requires a stable slurry of fine powder), and thus better incorporation into practical battery production methods. This factor may help overcome one of the challenges of using a brittle, crystalline ceramic as an electrolyte. Additionally, on a lab scale, tens of grams of uniform c-LLZO can be obtained in a matter of hours using a single small furnace, suggesting a scalable method of LLZO production.

Referring to Example 2, undoped, aluminum-doped, and gallium-doped c-LLZO is synthesized using a molten salt synthesis route. As the reaction temperature increases from 500 to 900° C., LaOCl is formed, followed by initial formation of ultrafine LZO nanocrystals, and finally fine LLZO powders at 900° C. in 4 h. Well-dispersed, fine (submicron to few micron) powders were obtained. Hydration/proton-exchange resulting from washing may be reversed by addition of LiOH before pellet sintering, improving density and conductivity. Well-densified pellets were obtained with Li-ion conductivity values ranging from 0.230 to 0.371 mS cm$^{-1}$ using simple uniaxial pressing followed by sintering at 1100° C.

Molten salt synthesis of LLZO includes mixing salts of lithium, lanthanum, and zirconium having a molar ratio of about 7:3:2, respectively, with a salt composition to form a reaction mixture. The reaction mixture is heated to a selected temperature for an appropriate length of time, forming a molten reaction medium. The resulting product is washed (e.g., with water, or optionally an alcohol such as methanol) to yield a phase pure, highly crystalline powder of c-LLZO ($Li_7La_3Zr_2O_{12}$). Components of the reagent composition may or may not be fully or partially soluble in the molten salt medium, although some solubility of at least one reagent promotes formation of c-LLZO. Suitable salts include a eutectic mixture of lithium chloride and potassium chloride ("chloride based molten salt"); a ternary eutectic mixture of lithium carbonate, sodium carbonate, and potassium carbonate ("carbonate based molten salt"); a basic mixture of 1:2:2 (by mole) lithium nitrate, lithium peroxide, lithium hydroxide; pure lithium hydroxide; and others as appropriate.

In a typical synthesis, a chloride based molten salt or a carbonate based molten salt is combined with a mixture of lithium nitrate ($LiNO_3$), lanthanum nitrate ($La(NO_3)$), and zirconium oxynitrate ($ZrO(NO_3)_2$) (molar ratio of about 7:3:2, respectively) in a weight ratio of about 1:1, mixed using a mortar and pestle, and placed in a crucible (alumina or optionally magnesia) followed by heating to a selected temperature. In some examples, the mixture is heated to a temperature between 700° C. and 1000° C. for several hours. In one example, a 1:1 mixture of the chloride based molten salt and nitrate salts of Li, La, and Zr is heated to 900° C. in 2 hours followed by holding at 900° C. for 4 hours. LLZO nanopowder is obtained by addition of water to dissolve the salt mixture followed by centrifugation and repeated suspension in water to wash the LLZO or by vacuum filtration using a membrane with a suitably small pore size and washing with enough water to remove impurities. The LLZO nanopowder formed using this heating scheme consists of or consists essentially of phase pure, cubic LLZO. Cubic LLZO can be formed without dopants (undoped, size stabilized LLZO) if the particle size is small enough. For LLZO nanopowder consisting essentially of phase pure, cubic LLZO, a trace of another phase of LLZO may be present, according to X-ray diffraction (XRD) analysis.

Dopant-stabilized cubic LLZO can be prepared with appropriate dopant precursors. In some embodiments, an extrinsic dopant may be combined with the precursor mixture to yield cubic nanosized doped LLZO. Suitable extrinsic dopants include salts or other precursors of alkaline earth metals (e.g., barium), metals (e.g., aluminum), or transition metals (e.g., tantalum).

In Example 2, LLZO was synthesized in a eutectic mixture of lithium chloride and potassium chloride (59:41 mol % LiCl:KCl). In addition to forming c-LLZO without the requirement of extrinsic dopants, aluminum-doped (ALLZO) and gallium-doped (GLLZO) LLZO powders were also synthesized as described in Example 3 using this approach. The role of proton-exchange and hydration on the sinterability of the as-synthesized powders was also investigated. In the case of ALLZO and GLLZO powders synthesized via molten salt synthesis (MSS), ceramic pellets with reasonably high density and conductivities were obtained, and the proton-exchange was found to be reversible through the incorporation of LiOH prior to pellet sintering.

The method disclosed herein can generate large amounts of cubic nanosized LLZO from inexpensive precursors in one intermediate to high temperature step (between 700-1000° C. in the case of chlorides and carbonates, and as low as 550° C. for highly basic salt medium, as described in Examples 10 and 11). The temperatures required are several hundreds of Kelvins lower than solid state reactions, reducing lithium volatilization and requiring less energy. Additionally, the nanosized LLZO has the advantage of easier processing due to lower sintering temperature. From a device fabrication standpoint, lower temperature processing and small particle size may enable easier and less costly fabrication such as roll-to-roll processing using methods including tape casting, slurry spin coating, and other inexpensive methods.

EXAMPLES

Example 1

Molten Salt Synthesis of LLZO in Eutectic $LiNO_3$:LiCl

The molten salt synthesis of LLZO in a $LiNO_3$:LiCl medium was investigated. Several experiments were performed using a 1:1 (by mass) ratio of reagents ($La(NO_3)_3$, $ZrO(NO_3)_2$) for LLZO and salts ($LiNO_3$:LiCl 88:12 by mol, eutectic mixture) as reaction medium. It was found that at temperatures as low as 650° C., phase pure t-LLZO could form in this medium a large particle size (as it is known that small undoped LLZO presents as the cubic phase). In order to form c-LLZO, a subsequent synthesis with added $Al(NO_3)_3$ was performed. However, even though a critical doping level of Al was added to the precursors, only t-LLZO was formed, as shown in FIG. 1.

It was observed that little to no salt remained in the crucibles used after synthesis. This observation in conjunction with the lack of c-LLZO forming even after addition of dopants indicates that incomplete mixing of all species occurred. Since in MSS, the flux should easily dissolve all species, the most likely explanation is evaporation or decomposition of the salts. While most molten salts have relatively low volatility, there is still some appreciable vapor pressure at elevated temperatures. Further, $LiNO_3$ boils/decomposes above roughly 600° C. These factors taken together indicate that the MSS method using eutectic $LiNO_3$:LiCl as salt medium does not result in fine particles of c-LLZO.

Example 2

Molten Salt Synthesis with Eutectic LiCl:KCl

In order to realize the molten salt synthesis of LLZO, a eutectic mixture of LiCl—KCl was used (59:41 mol %, melting point: ~352° C.; LiCl boiling point: ~1382° C., KCl: boiling point: ~1420° C.). In this case, since the molten chloride medium contains no innate reactive oxygen source (besides the slow diffusion of atmospheric oxygen), precursors that can provide reactive oxygen species are typically required. Therefore, a stoichiometric mixture (7:3:2 molar ratio for Li, La, and Zr, excess Li may be used if desired) using lithium nitrate, lanthanum nitrate hexahydrate, and zirconium oxynitrate hydrate was used as the reagents. Although LiCl may provide the $Li^+$ needed to form LLZO, $LiNO_3$ was also added as a reagent in order to ensure that enough reactive oxygen species could be generated upon decomposition of the $NO_3^-$ anion (Equation 1) to react with all metal cations:

$$4NO_3^- \rightarrow 2O^{2-} + 4NO_2 + O_2 \quad (1)$$

The excess $LiNO_3$ ensures that more than enough oxygen is provided to the system to generate stoichiometric LLZO. All salt precursors were chosen herein so that potential concentration gradients due to dissolution and diffusion of coarse metal oxides were minimized or eliminated. This is to aid the formation of a smaller particle size distribution and ensure initial homogeneity of all species in the reaction mixture.

To prepare the chloride salt mixture, 59 mol % LiCl and 41 mol % KCl were mixed followed by grinding thoroughly with a mortar and pestle. The LLZO nitrate precursors were mixed and ground thoroughly with a mortar and pestle. The LiCl:KCl flux salt mixture and the nitrate precursor salt mixture were mixed in a 1:1 mass ratio by grinding thoroughly with a mortar and pestle and then added to alumina crucibles. The total mass of salt ranged from 2 and 4 g for exploratory syntheses, and up to 50 g for producing larger batches for densification and ionic conductivity studies. The crucibles were covered with alumina lids to mitigate the evaporation of salts at high temperatures. Although the salt mixture melts at 352° C., temperatures between 500 and 900° C. were used to determine the optimal reaction conditions for preparing LLZO. In general, the mixtures were heated at a rate of 5° C./min (Thermo Scientific Lindberg Blue M), held for various times (between 1-6 h), and cooled naturally to room temperature in the furnace. After the synthesis, ultrapure water (>18 MOhm cm) was added to the cooled crucibles, and the suspension was ultrasonicated using an immersion probe (Cole-Parmer 500 W Ultrasonic Processor) to rapidly dissolve the fused salts and generate a slurry of powder. Subsequently, the slurry was vacuum filtered using poly(vinylidene fluoride) membranes (0.22 µm pore size, DuraPore, EMD corporation) and washed with at least 150 mL of water followed by 50 mL of methanol (BDH, HPLC grade) to facilitate fast drying. Finally, the filter membranes along with the wet powder cakes were placed in an oven at 50° C. and dried in air. After drying, the powders were removed from the filter membranes and lightly ground with a mortar and pestle.

Figure 2A:
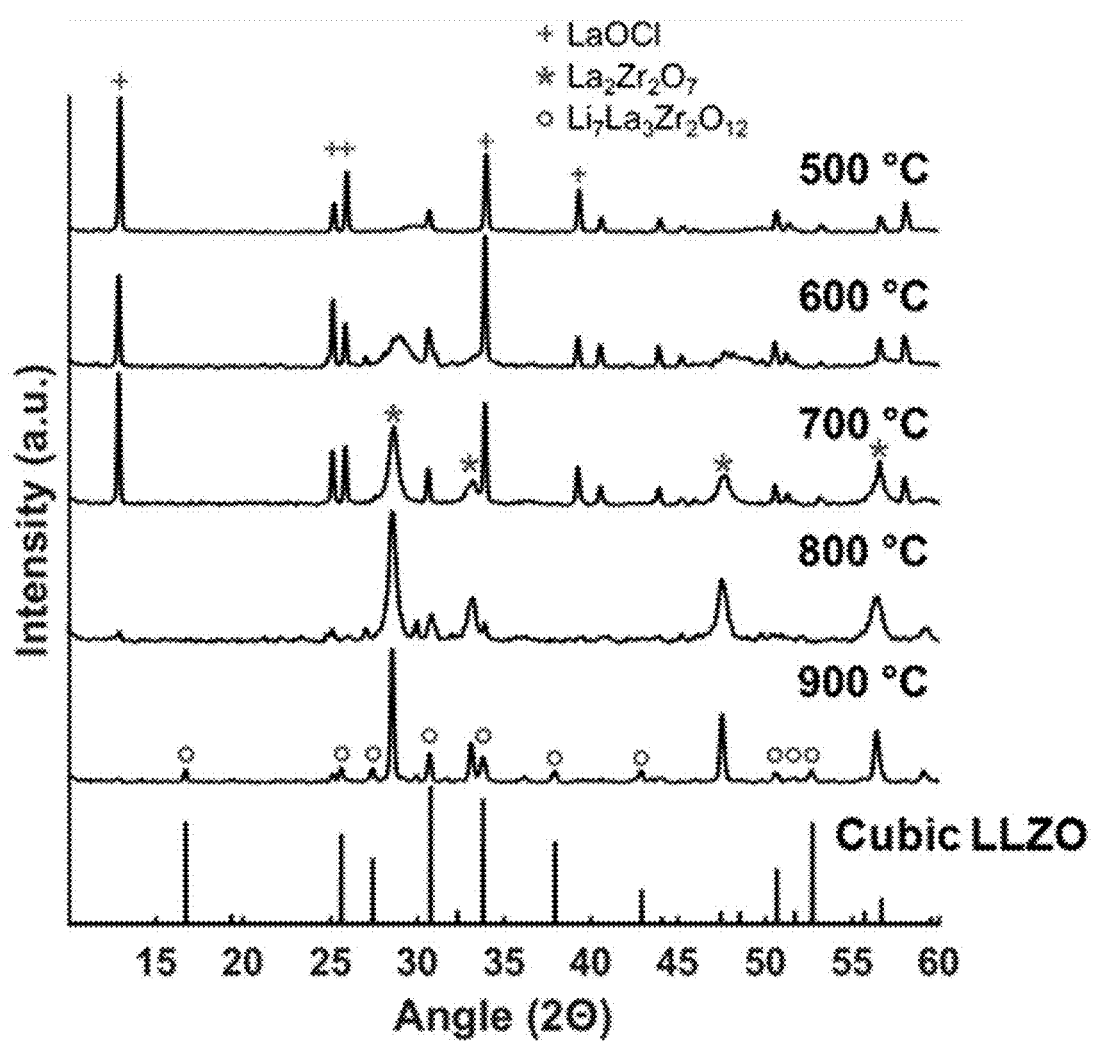
FIG. 2A shows an X-ray diffraction pattern of products obtained from molten salt synthesis in LiCl:KCl eutectic at 500-900° C. with 3 h reaction time.
Figure 2B:
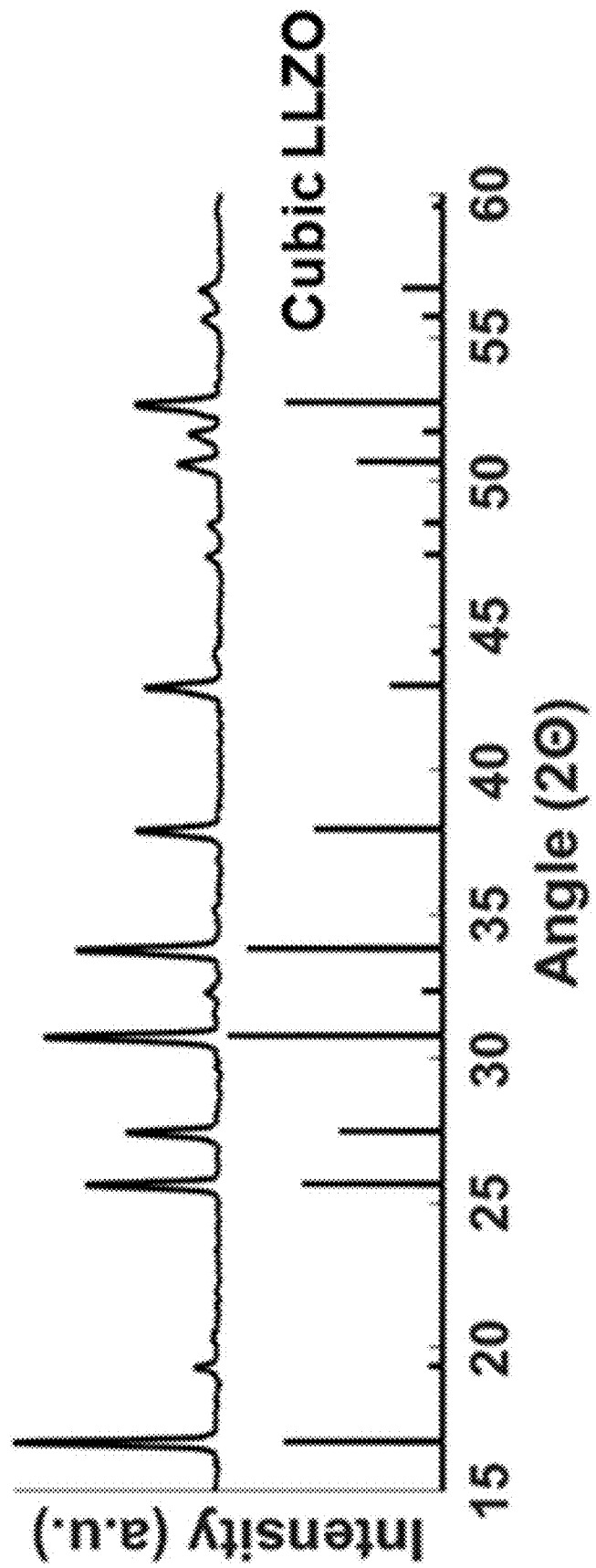
FIG. 2B shows an X-ray diffraction pattern of undoped, cubic LLZO products obtained from molten salt synthesis in LiCl:KCl eutectic at 900° C. with 4 h reaction time.

The X-ray diffraction results of the products obtained using a reaction time of 3 h and reaction temperature between 500-900° C. are shown in FIG. 2A. When using a reaction temperature of 500° C., the only crystalline phase formed is lanthanum oxychloride (LaOCl, space group P4/nmm), presenting as large plates with edge lengths on the order of several micrometers and thicknesses below several hundred nanometers. No obvious evidence of crystalline zirconium containing phases was observed at 500° C., indicating that most likely all of the lanthanum existed in the form of LaOCl. However, several very broad features in the baseline of the X-ray diffraction pattern from the reaction conducted at 500° C. coincide with $La_2Zr_2O_7$ peak positions, which may indicate that $La_2Zr_2O_7$ is beginning to form even at this temperature. $La_2Zr_2O_7$ (pyrochlore structure, space group Fd3m) is a known intermediate phase in LLZO syntheses and converts to LLZO upon reaction with additional Li. Increasing the reaction temperature to 600° C. results in the formation of ultrafine (as indicated by extremely wide X-ray diffraction reflections) $La_2Zr_2O_7$ nanocrystals in addition to LaOCl plates. At a reaction temperature of 700° C., both phases coexist, with the $La_2Zr_2O_7$ reflections becoming somewhat sharper in the X-ray diffraction patterns, indicating crystallite growth and/or an increasing degree of crystallization. As the temperature increases to 800° C., the majority of LaOCl is consumed in favor of $La_2Zr_2O_7$, presenting as octahedral particles 30-40 nm across. It is believed that the thermodynamic driving force is the energetic favorability of another phase (i.e., $La_2Zr_2O_7$ or LLZO) rather than the instability/solubility of LaOCl at 800° C. This is suggested by the fact that nearly all LaOCl is gone at 800° C. and no LaOCl exists at 900° C., with the implication that above a threshold temperature between 800 and 900° C., all LaOCl has redissolved, providing soluble La-species necessary to form LLZO from nanocrystalline $La_2Zr_2O_7$. At 900° C., a mixture of $La_2Zr_2O_7$ and cubic phase LLZO forms in 3 h, and both very fine powders as well as highly faceted particles with side lengths between 0.5 and 2 µm can be seen).

Figure 2C:
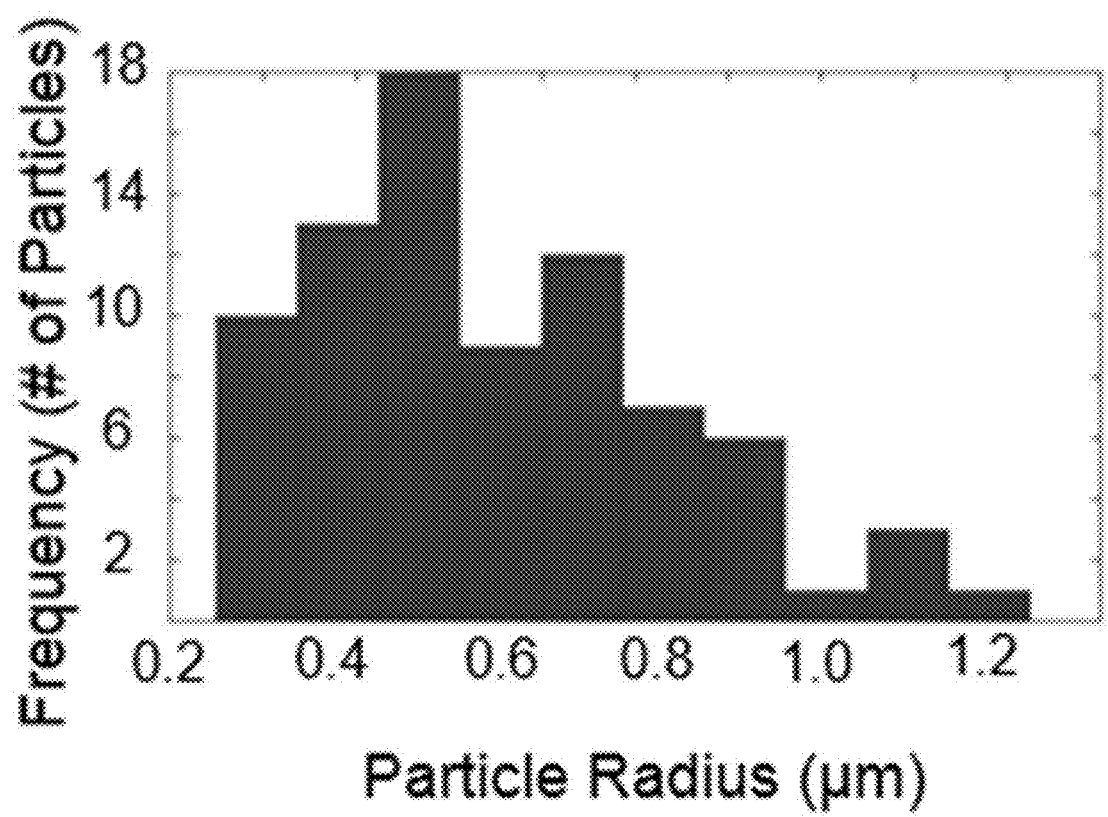
FIG. 2C depicts a particle size distribution determined from scanning electron microscopy image for phase pure cubic LLZO products obtained from molten salt synthesis in LiCl:KCl eutectic at 900° C. with 4 h reaction time.
Figure 2D:
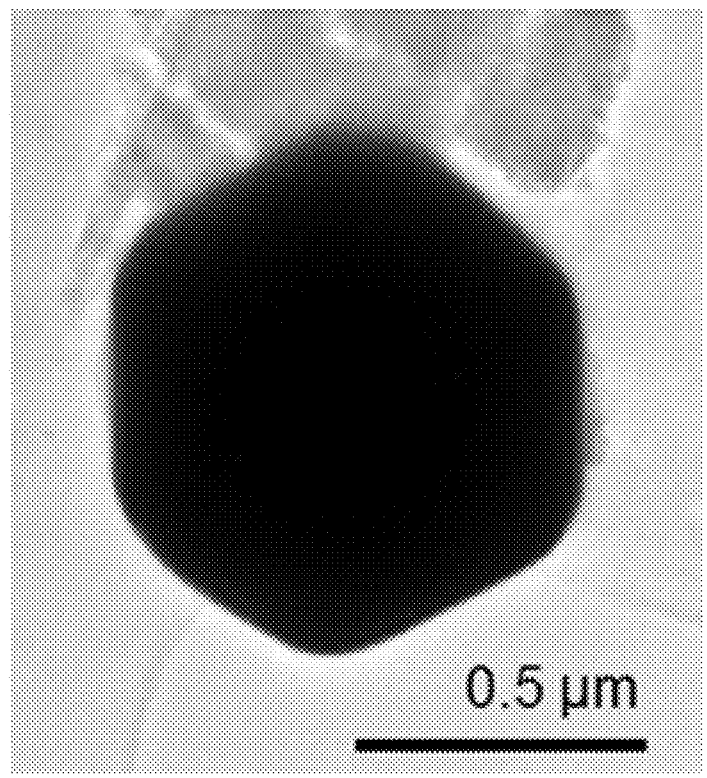
FIGS. 2D and 2E show transmission electron microscopy images of two phase pure, undoped cubic LLZO products obtained from molten salt synthesis in LiCl:KCl eutectic at 900° C. with 4 h reaction time.
Figure 2E:
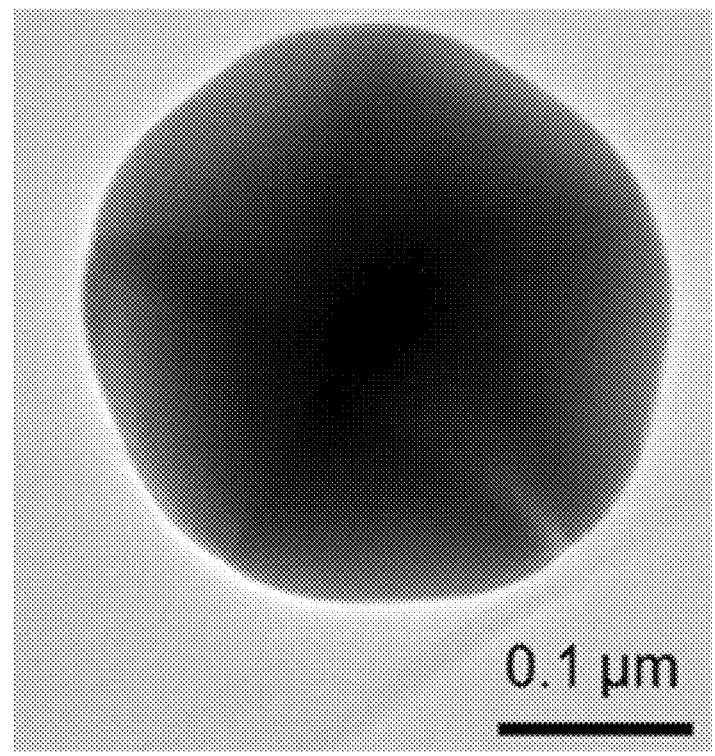

Phase pure c-LLZO without dopants could be obtained with a 900° C. reaction temperature and minimum reaction time of 4 hours. This indicates that all of the $La_2Zr_2O_7$ after 3 hours at 900° C. converts within 1 hour to LLZO. As seen in FIG. 2C, LLZO formed in this 4 hour reaction time had particle sizes primarily ranging from ~0.3-3 µm, with a mean and median particle size of 1.06 µm and 0.806 µm, respectively. Further, transmission electron microscopy imaging showed that some of the LLZO was found as faceted, discrete particles (FIGS. 2D and 2E) rather than agglomerated particles.

Example 3

Molten Salt Synthesis of Al, Ga, Ta, W, and Ga/Ta Co-Doped LLZO in Eutectic LiCl:KCl To prepare Al-doped LLZO (ALLZO) or Ga-doped LLZO (GLLZO) via molten salt synthesis, $LiNO_3$, $La(NO_3)_3$, $ZrO(NO_3)_2$, and $Al(NO_3)_3$ or $Ga(NO_3)_3$ were mixed in a 7:3:2:0.25 ratio (optionally with excess LiNO$_3$). Once coarsely mixed, the reagent salts were mixed intimately with the flux salts in a 1:1 ratio by mass using an agate mortar and pestle. Then, the mixed flux and reagent salts were subjected to heating and washing as described in Example 2.

Figure 3A:
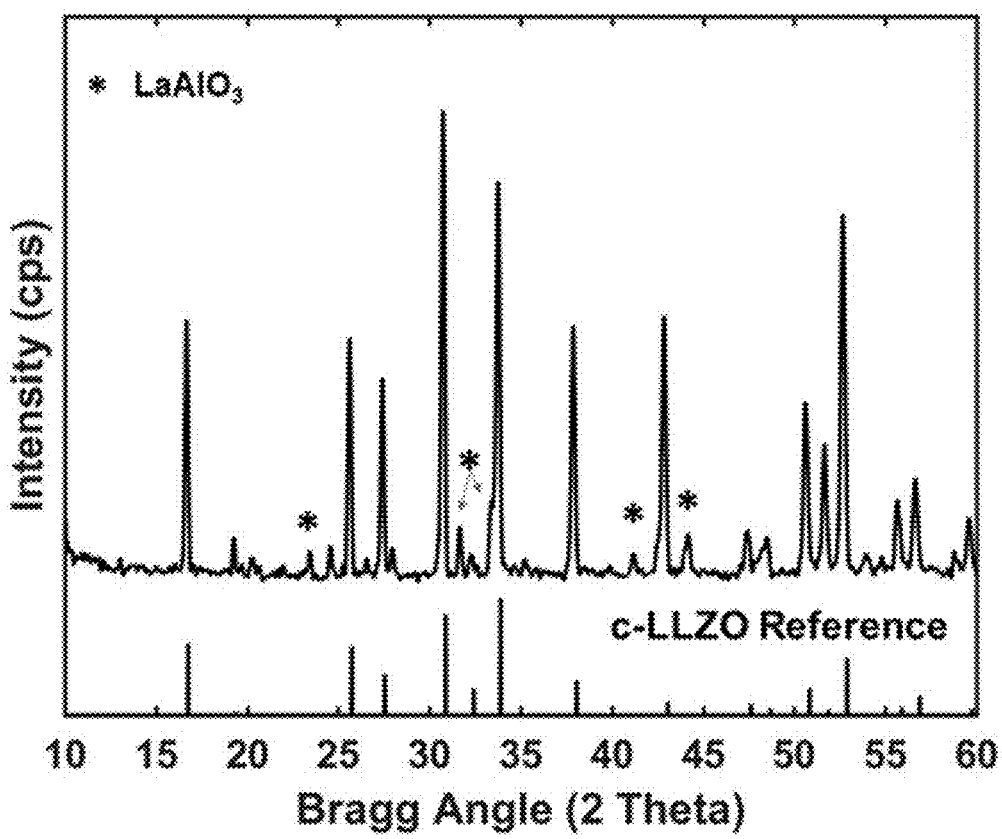
FIG. 3A shows an X-ray diffraction pattern of phase pure, Al-doped cubic LLZO products obtained from molten salt synthesis in LiCl:KCl eutectic at 900° C. with 4 h reaction time.
Figure 3B:
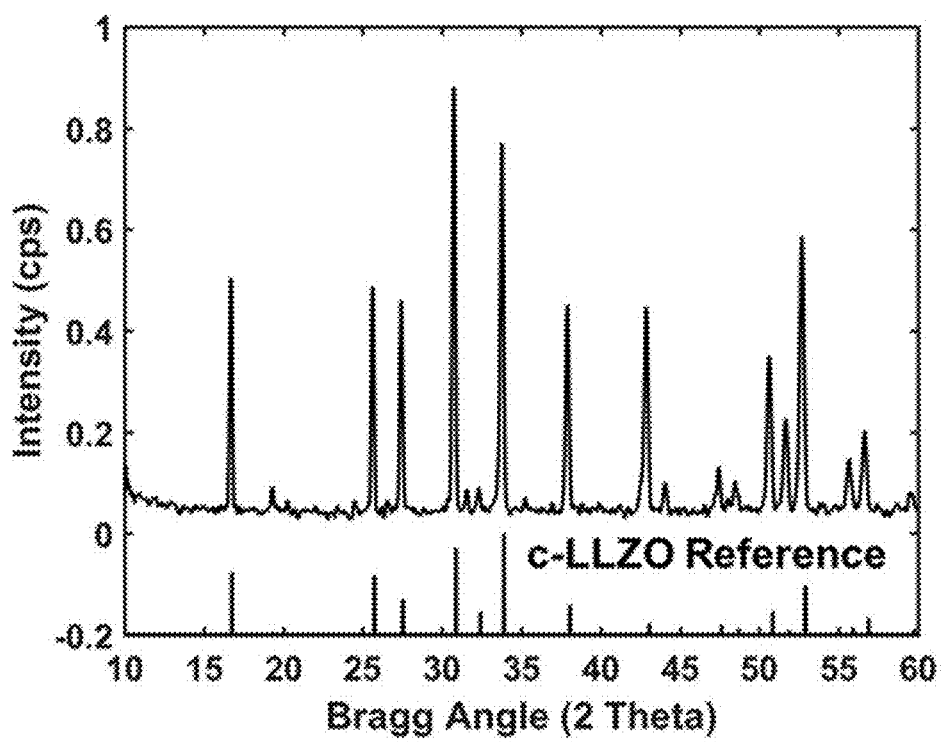
FIG. 3B shows an X-ray diffraction pattern of phase pure, Ga-doped cubic LLZO products obtained from molten salt synthesis in LiCl:KCl eutectic at 900° C. with 4 h reaction time.
Figure 3C:
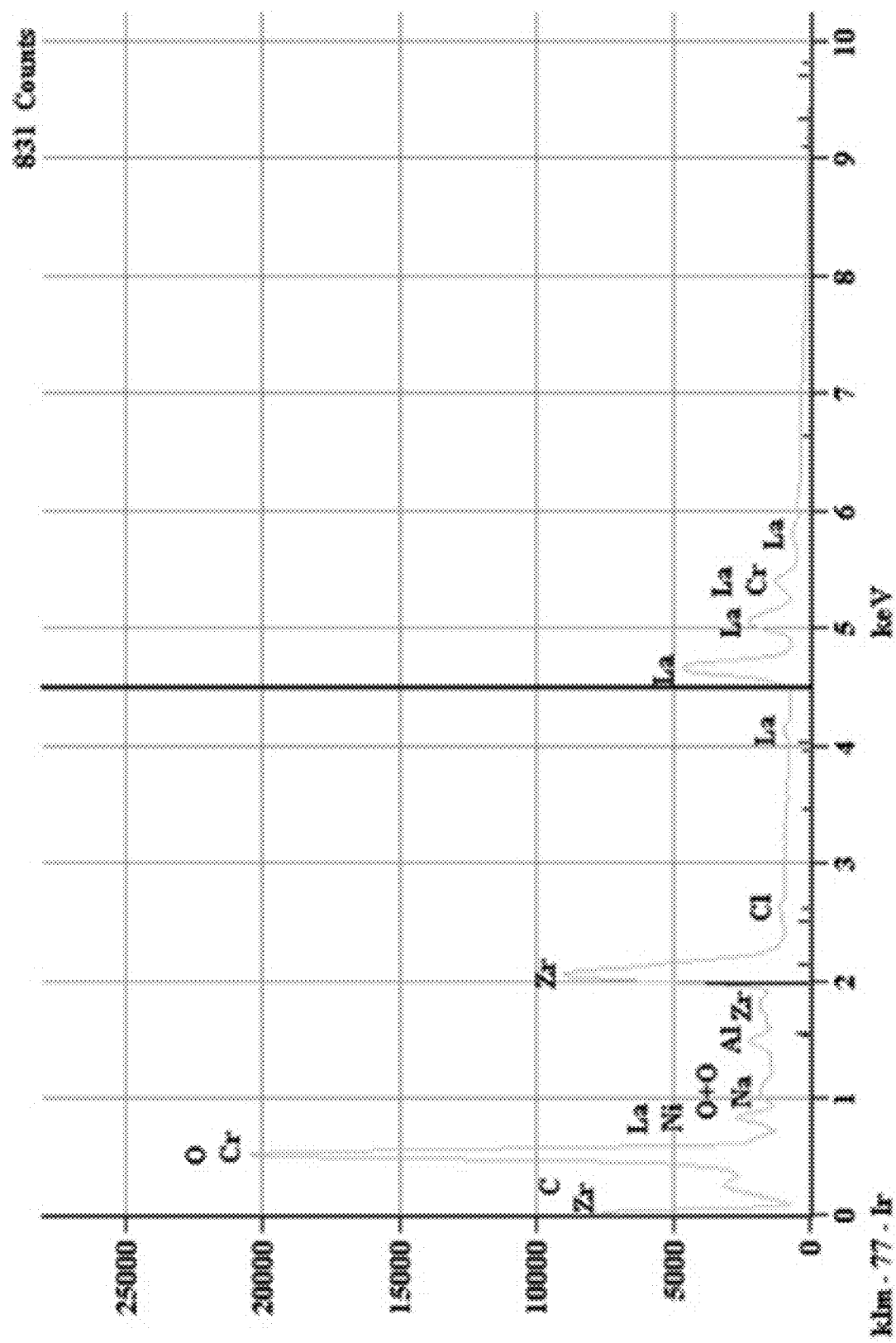
FIG. 3C shows an energy dispersive X-ray spectroscopy spectrum obtained from Al-doped LLZO powders, illustrating uniform distribution of Al.
Figure 3D:
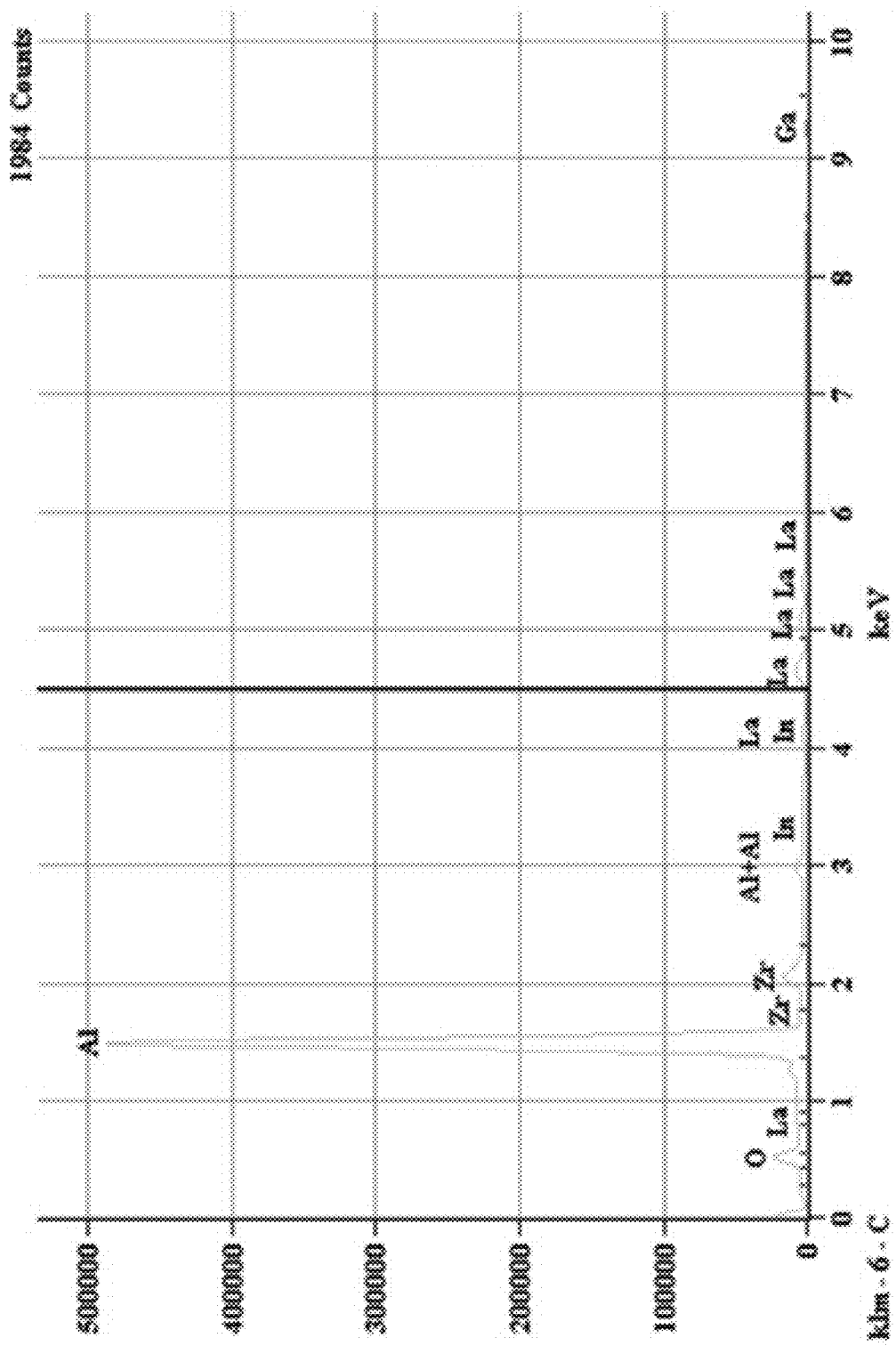
FIG. 3D shows Ga-doped LLZO powders, illustrating uniform distribution of Ga (note the Al-signal in the spectrum is from the substrate).

Representative X-ray diffraction patterns are shown in FIGS. 3A and 3B. Dopant-stabilized cubic LLZO could be obtained easily by addition of aluminum or gallium nitrate to the salt precursor mixture. In both cases, the cubic LLZO product was obtained using the same reaction conditions (i.e., 900° C. for 4 h) as for the undoped cubic LLZO. In addition, energy-dispersive X-ray spectroscopy maps taken of the synthesized ALLZO and GLLZO indicated that the dopants are uniformly distributed throughout the as-synthesized powders (FIGS. 3C and 3D).

Dense pellets from the ALLZO and GLLZO powders were prepared via uniaxial cold-pressing using a 7 mm stainless steel die. Before pressing, the powders were crushed using a mortar and pestle. Optionally, 3% or 10% (by mass) LiOH was added followed by vibratory ball-milling for 5 min to help mitigate agglomeration of particles and evenly disperse LiOH on the powder. Pellets were pressed using 2 tons of force for 5 min.

The pressed pellets were sintered at 1100° C. for 6 to 18 hours. For sintering, pellets were placed on a bed of mother powder and covered with additional mother powder to offset lithium loss. All pellets were supported on a MgO plate that was placed inside of an alumina crucible in order to prevent both adventitious aluminum doping and sticking of the LLZO pellets to the crucible. Further, 100-200 mg of lithium carbonate were also placed within the alumina crucible, adjacent to the pellets, to generate a lithium-rich vapor-phase during sintering. All crucibles were covered with an alumina lid during sintering. The density of pellets was calculated based on mass and geometry of the pellet and compared to the theoretical density of LLZO.

For ionic conductivity measurements, sintered pellets were polished using 400 grit alumina polishing films until a uniform surface was obtained. Metal contacts were applied by sputter coating each side with ~10 nm of Au. Then, electrochemical impedance spectroscopy was performed from 1 kHz to 7 MHz at room temperature.

Pellets formed using the as-synthesized powders (without added LiOH) generally had quite poor densification properties and ionic conductivity values could not be obtained. This phenomenon may be explained by the substantial hydration that most probably occurs during washing of the powders with water after the molten salt synthesis, which could lead to the formation of proton-exchanged LLZO and/or formation of surface Li$_2$CO$_3$ species.

To reverse this, LiOH (3% or 10% by mass) was added to the as-synthesized powder, followed by ball-milling for 5 minutes to intimately mix the powders, and then subsequent pressing and sintering. LiOH (melting point ~462° C.) easily forms an alkaline flux during sintering that should readily reverse proton exchange if present, with the formation of water vapor, according to Equation 2:

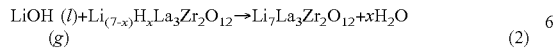

$$\text{LiOH }(l) + \text{Li}_{(7-x)}\text{H}_x\text{La}_3\text{Zr}_2\text{O}_{12} \rightarrow \text{Li}_7\text{La}_3\text{Zr}_2\text{O}_{12} + x\text{H}_2\text{O }(g) \quad (2)$$

Figure 3E:
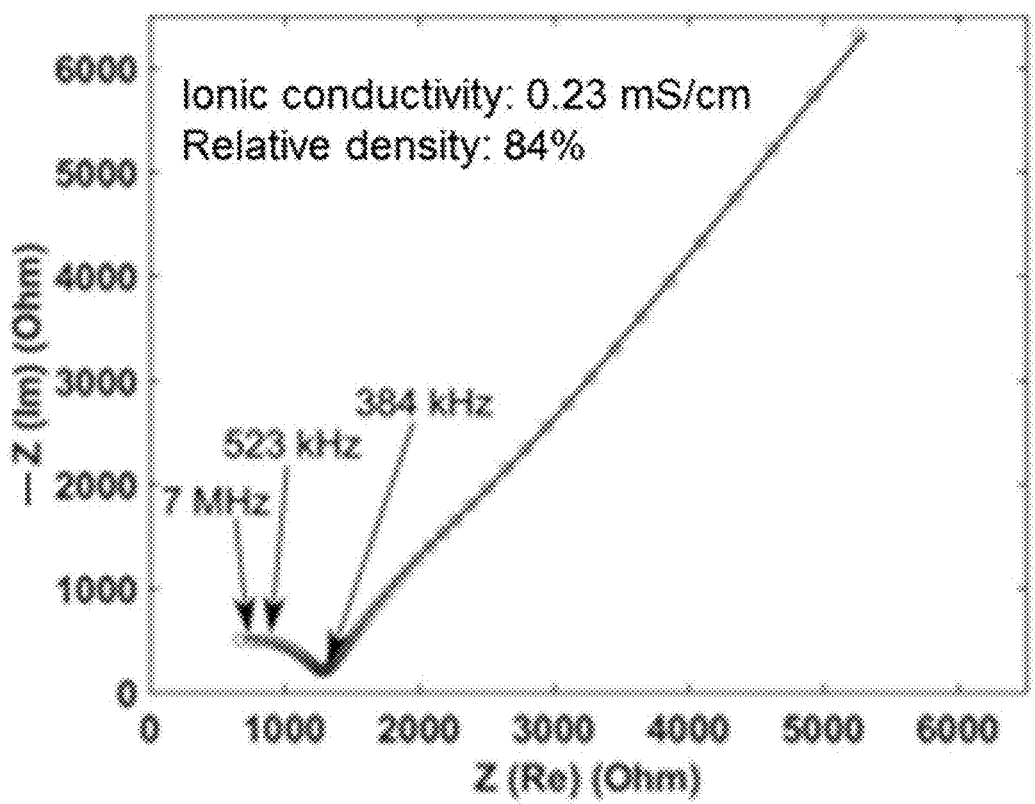
FIG. 3E shows a Nyquist plot obtained from ALLZO pellet sintered with 10% added LiOH at 1100° C. for 18 hr.
Figure 3F:
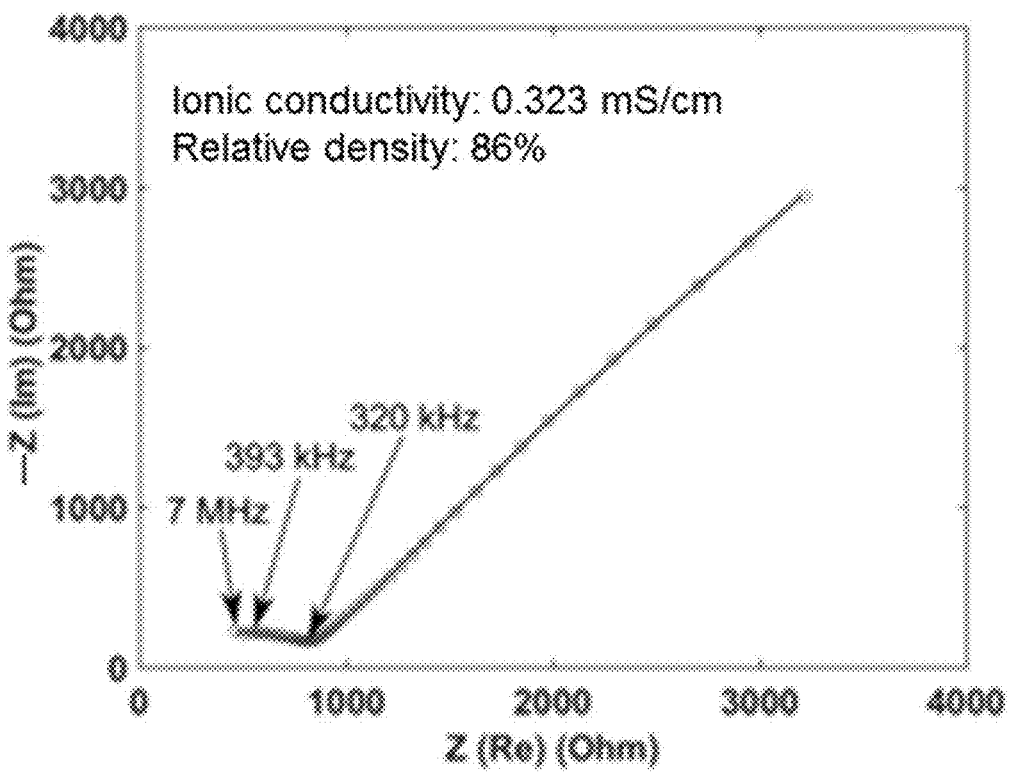
FIG. 3F shows a Nyquist plot obtained from GLLZO pellet sintered with 10% added LiOH at 1100° C. for 12 hr.
Figure 3G:
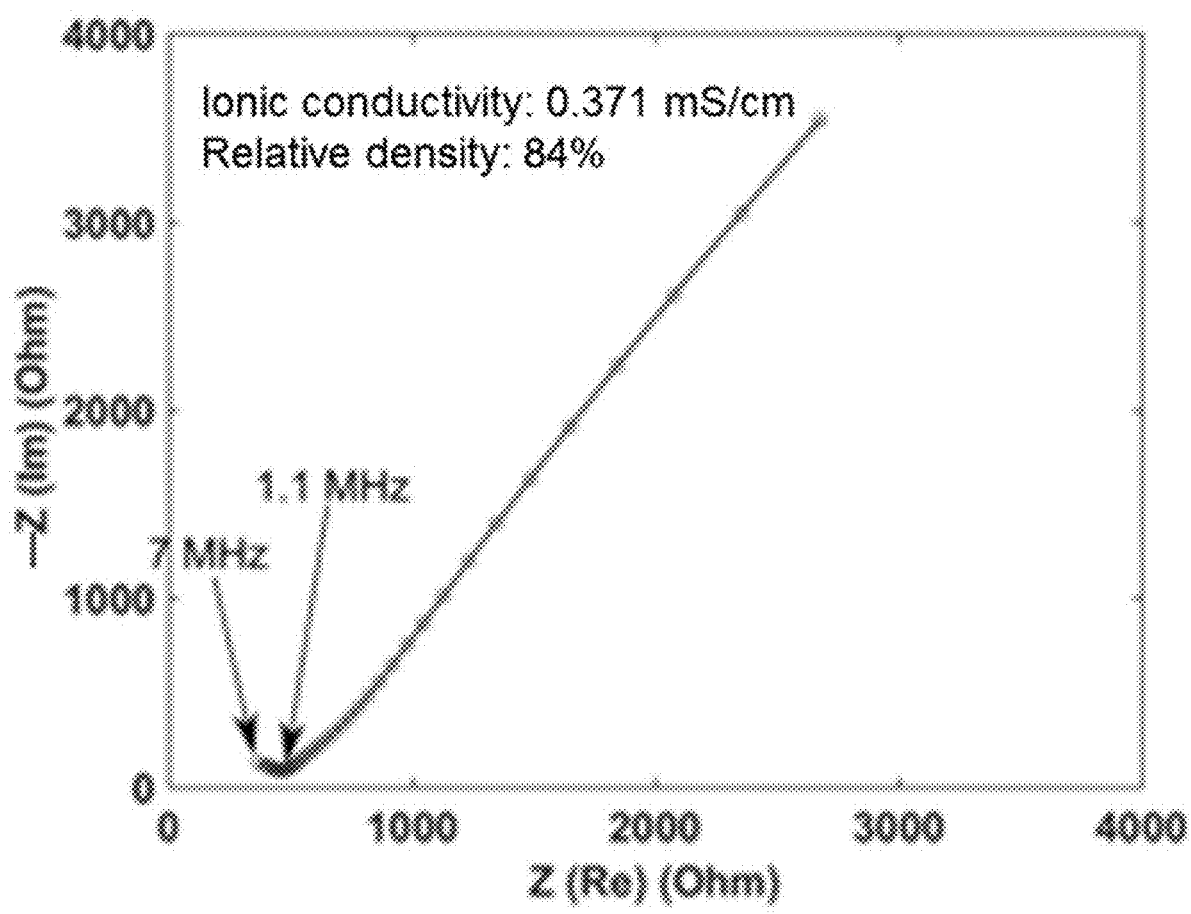
FIG. 3G shows Nyquist plot obtained from GLLZO pellet sintered with 3% added LiOH at 1100° C. for 6 hr.

In the case of powders with added LiOH, reasonably well-densified pellets (84-86% of the theoretical density) were obtained unlike those prepared from only as-synthesized powder. Fitting of the Nyquist plots (FIGS. 3E-3G) obtained from the electrochemical impedance measurements showed that these pellets had ionic conductivities between 0.230 mS cm$^{-1}$ and 0.371 mS cm$^{-1}$. This indicates that proton exchange was reversed and that the powders display good Li conductivity.

The fracture surfaces for the ALLZO and GLLZO pellets were characterized with scanning electron microscopy imaging. The results showed that without added LiOH, little sintering had occurred, as the particle morphology is nearly the same as that of the as-synthesized powders. Only slight coalescence of the particles can be seen, with little reduction of void space or porosity. In contrast for pellets prepared from powders including excess LiOH, significant sintering and grain coarsening, with predominantly transgranular fracture was observed.

Figure 3H:
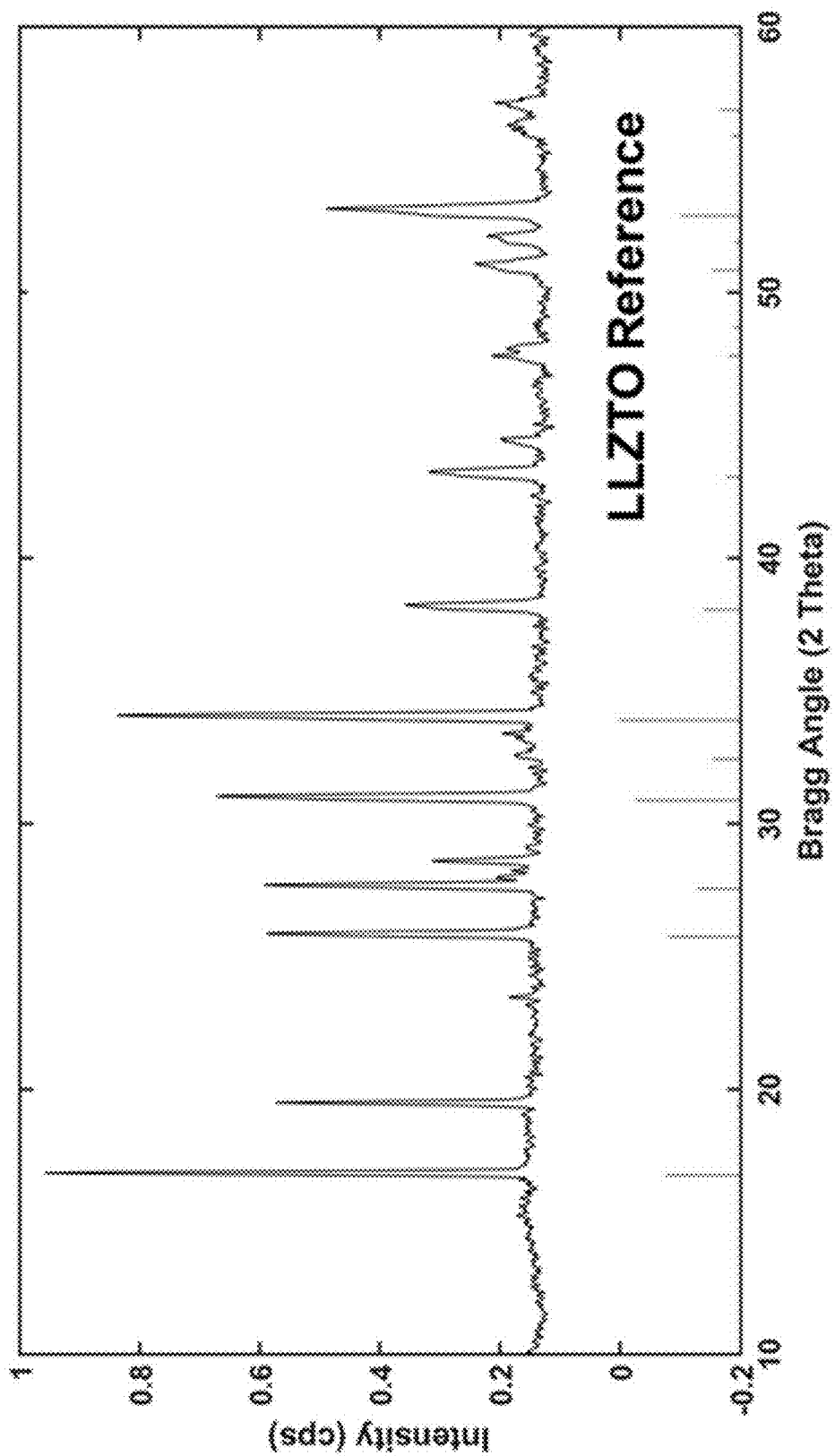
FIG. 3H shows an X-ray diffraction pattern of Ta-doped cubic LLZO products obtained from molten salt synthesis in LiCl:KCl eutectic at 800° C. with 3 h reaction time.

To obtain Ta-doped LLZO (LLZTO) of nominal composition Li$_{6.4}$La$_3$Zr$_{1.4}$Ta$_{0.6}$O$_{12}$, the LiCl:KCl eutectic was used with metal nitrates (lithium nitrate, lanthanum hexahydrate, and zirconium oxynitrate hydrate) and Ta$_2$O$_5$ as reagents. The X-ray diffraction pattern for the synthesis conducted at 800° C. for 3 h is shown in FIG. 3H. One important observation in the synthesis of LLZTO is that, evidently, Ta-doping reduces the formation temperature of LLZO. In these experiments, temperatures of 800-850° C. could successfully form Ta-doped LLZO, compared to 900° C. when undoped, Al-doped, or Ga-doped LLZO was the target material.

Figure 3I:
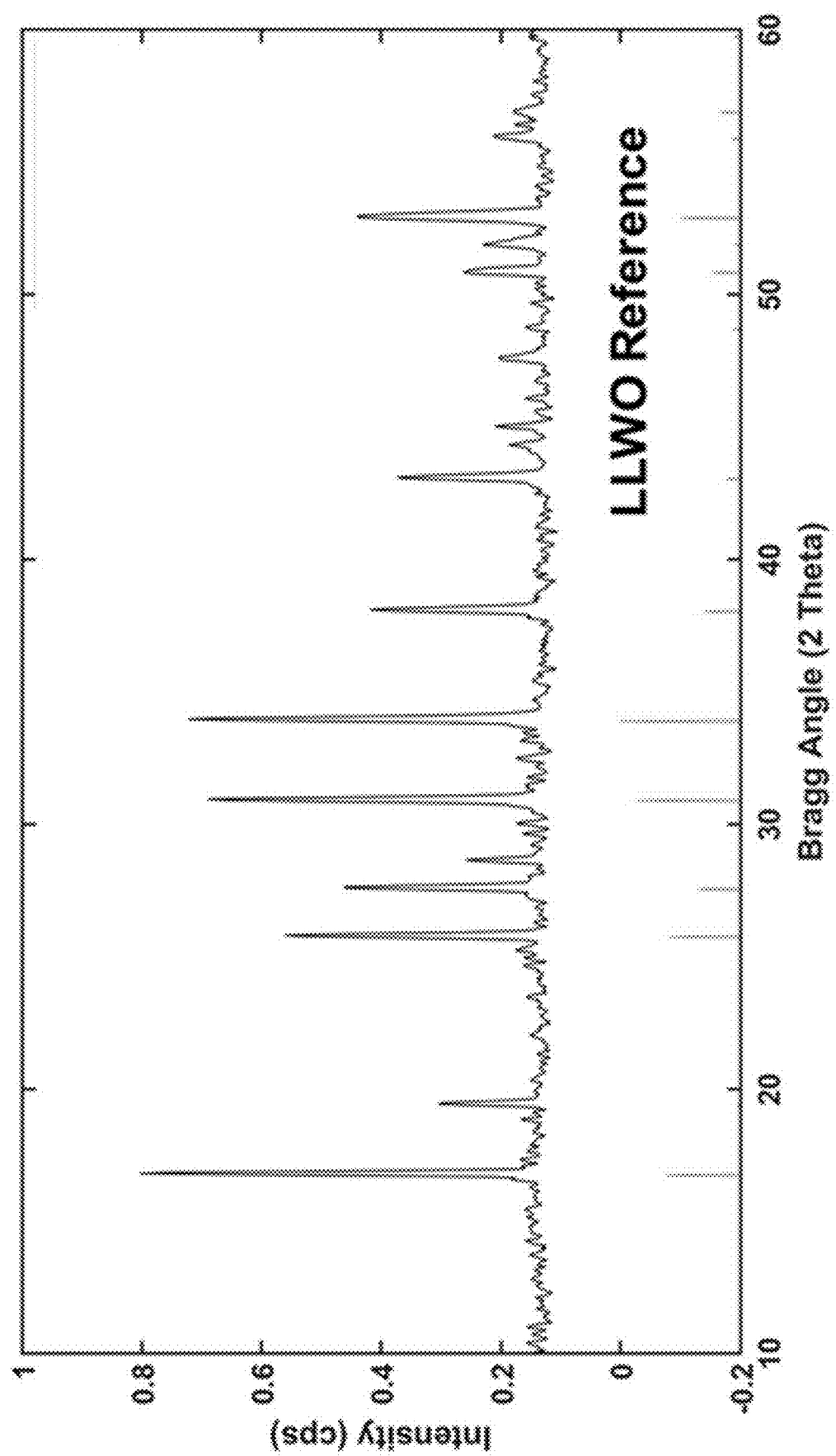
FIG. 3I shows an -ray diffraction pattern of W-doped LLZO product synthesized in LiCl:KCl flux with nominal composition of $Li_{6.3}La_3Zr_{1.65}W_{0.35}O_{12}$.

In addition to Al, Ga, and Ta-doped LLZO, W-doped LLZO (LLZWO) could also be synthesized in the eutectic LiCl:KCl flux under the same conditions as undoped and Al or Ga-doped LLZO in the above examples through the addition of Na$_2$WO$_4$ as the dopant precursor. In this case, nearly phase-pure (slight amount of La$_2$Zr$_2$O$_7$ present) LLZWO of nominal composition Li$_{6.3}$La$_3$Zr$_{1.65}$W$_{0.35}$O$_{12}$ formed, with a corresponding X-ray diffraction pattern shown in FIG. 3I.

Figure 3J:
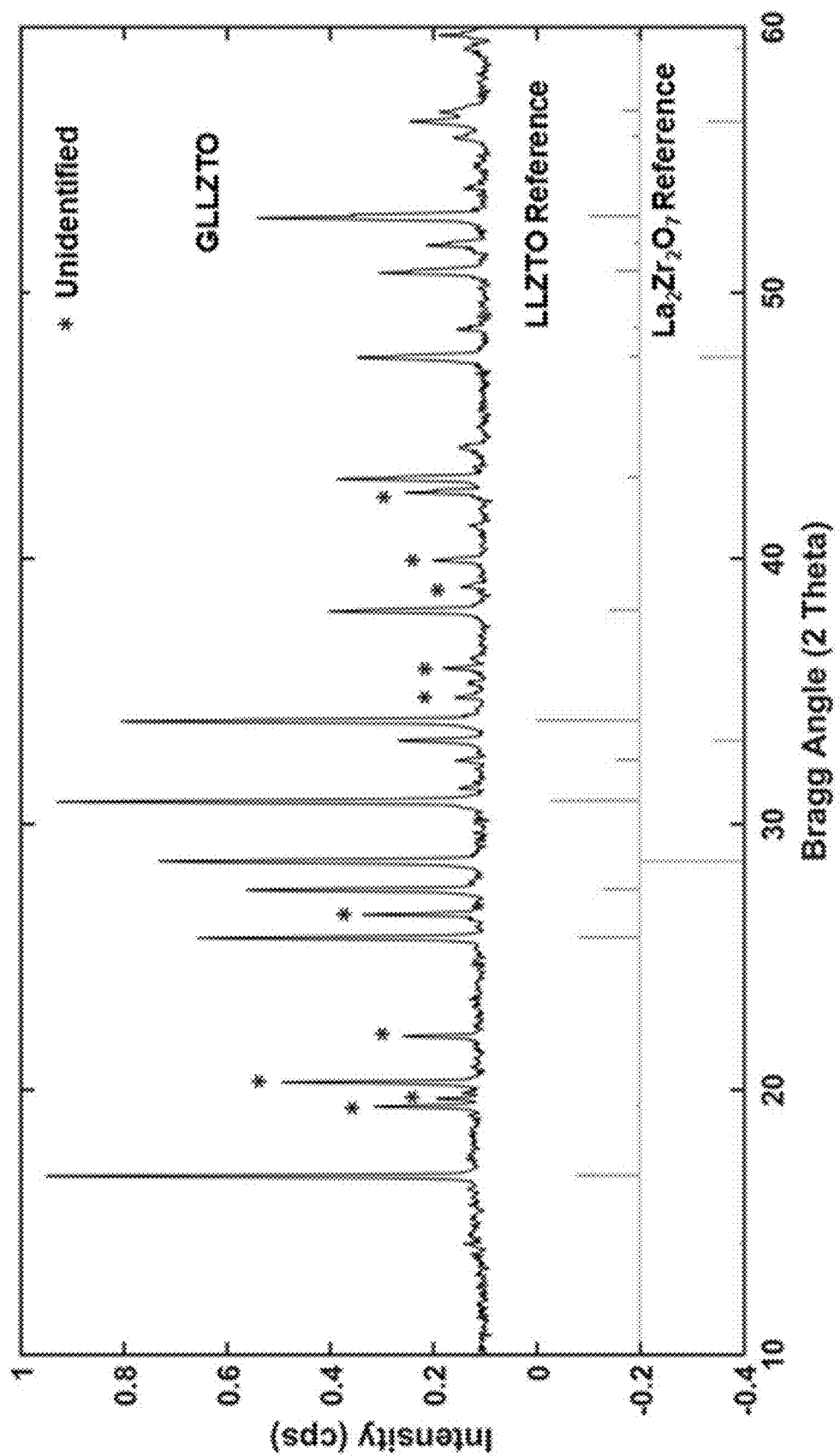
FIG. 3J shows an X-ray diffraction pattern of Ga- and Ta-co-doped LLZO synthesized in LiCl:KCl flux.

Ga- and Ta-co-doped LLZO (GLLZTO) can also be synthesized in the LiCl:KCl eutectic under the same conditions used above. In this case, a mixture of LiNO$_3$, La(NO$_3$)$_3$, ZrO(NO$_3$)$_2$, Ta$_2$O$_5$, and Ga(NO$_3$)$_3$ were mixed in a 7:3:1.4:0.6:0.25 molar ratio and ground using an agate mortar and pestle into a fine powder. This reagent mixture was mixed with eutectic LiCl:KCl flux-forming salts in a 1:1 mass ratio and ground intimately using an agate mortar and pestle. This mixture was subjected to heat treatment at 900° C. for 4 hours (5° C./min ramp rate). FIG. 3J shows an X-ray diffraction pattern of the as-synthesized material showing primarily LLZO with some La$_2$Zr$_2$O$_7$ and apparent (unidentified) impurity peaks. A representative energy dispersive X-ray spectroscopy map of the powder indicated even distribution of Ga- and Ta-dopants in the GLLZTO particles. Hence, although the reaction conditions still need to be optimized to obtain phase pure GLLZTO particles, these results show that the approach is effective for yielding co-doped LLZO particles.

Example 4

Figure 4:
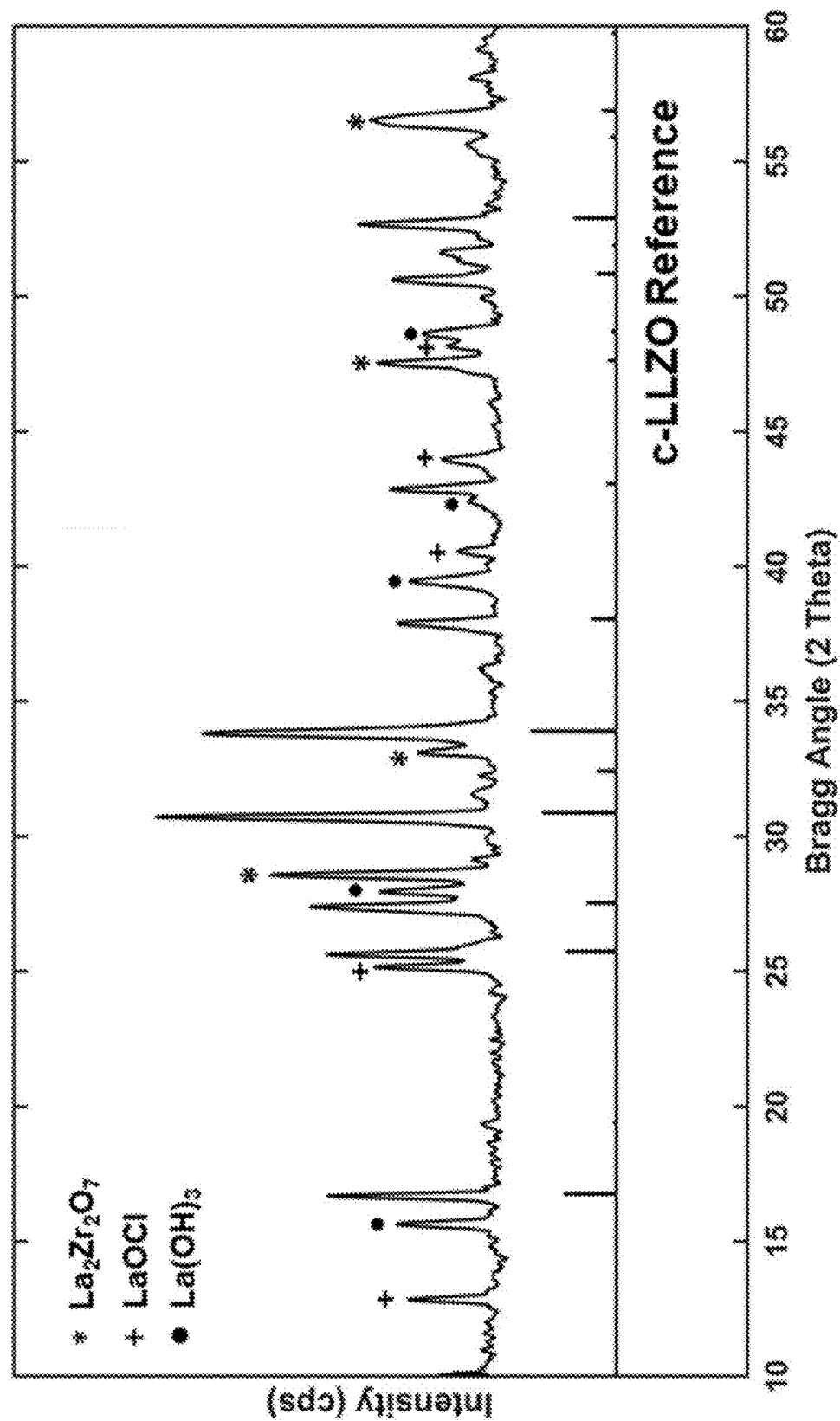
FIG. 4 shows an X-ray diffraction pattern of products obtained from molten salt synthesis of LLZO in LiCl:KCl eutectic using lithium nitrate, lanthanum hexahydrate, and $ZrO_2$ nanoparticles as reagents using reaction time of 800° C. for 8 h.

Molten Salt Synthesis of LLZO in Eutectic LiCl:KCl with ZrO$_2$ Nanospheres as a Zirconium Source The synthesis of LLZO in the LiCl:KCl eutectic was performed using LiNO$_3$, La(NO$_3$)$_3$, and ZrO$_2$ nanoparticles as reagents. The spherical zirconium oxide nanoparticles were synthesized by precipitation of zirconium n-butoxide in an aqueous-ethanolic solution under vigorous stirring at room temperature. The X-ray diffraction pattern of the product obtained after the molten salt synthesis performed at 800° C. for 8 h is shown in FIG. 4. The results showed that cubic LLZO was formed, along with some LaOCl, $La_2Zr_2O_7$, and $La(OH)_3$, indicating that these reaction conditions were not yet optimized for obtaining pure phase LLZO. The resulting materials appeared to take on the morphology of the $ZrO_2$ nanoparticle precursors, suggesting a topochemical reaction.

Example 5

Figure 5:
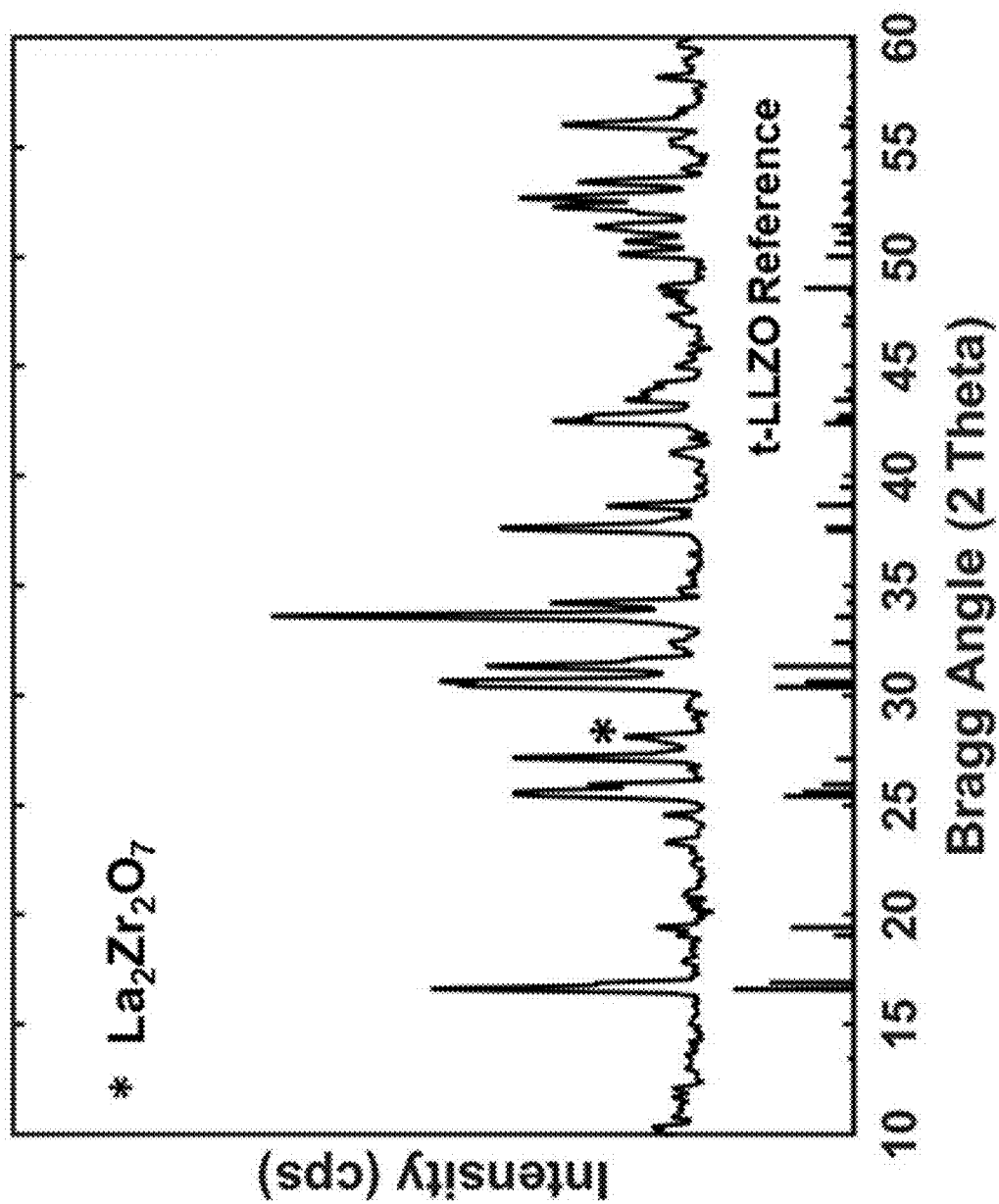
FIG. 5 shows an X-ray diffraction pattern of as-synthesized LLZO prepared from co-precipitated La:Zr precursor and $LiNO_3$ in LiCl:KCl flux using reaction at 800° C. for 8 h.

Molten Salt Synthesis of LLZO in Eutectic LiCl:KCl with Co-Precipitated Stoichiometric La—Zr The synthesis of LLZO in the LiCl:KCl eutectic was performed using lithium nitrate and a La—Zr precursor prepared by co-precipitation. Briefly, stoichiometric $La(NO_3)_3$ and $ZrO(NO_3)_2$ were dissolved in de-ionized water and precipitated by slow addition of a combined solution of 1 M NaOH and 0.6 M $NH_4OH$. The resultant suspension was stirred at room temperature for a desired amount of time (e.g. 30 minutes) and then vacuum filtered with several washings with de-ionized water to obtain clean precipitates with molar ratio 3:2. After drying at elevated temperature (e.g. 50° C.) for several hours, this precursor was combined with a stoichiometric amount of $LiNO_3$ (i.e. 7:3:2 Li:La:Zr) and mixed with eutectic LiCl:KCl in a 1:1 ratio by mass. Finally, the mixture was heated to 800° C. for 4-8 hours, cooled naturally to room temperature, and cleaned powders were obtained in the same manner as in Example 2. As can be seen from scanning electron microscopy images, the precursor appears to consist of large agglomerates of ultrafine particles. An X-ray diffraction pattern of as-synthesized LLZO obtained from an 8 hour hold at 800° C. is shown in FIG. 5. As can be seen, the material is nearly phase pure t-LLZO, indicating that LLZO may be formed in this medium with this precursor. The poor dispersion of the La:Zr precursor particles is the most likely explanation for formation of t-LLZO vs. c-LLZO using this precursor. Addition of dopants or better dispersion of the mixed La:Zr precursor is expected to allow dopant-stabilized or size-stabilized c-LLZO, respectively.

Example 6

Molten Salt Synthesis of LLZO in Eutectic LiCl:KCl with Added $Li_2O_2$

Figure 6:
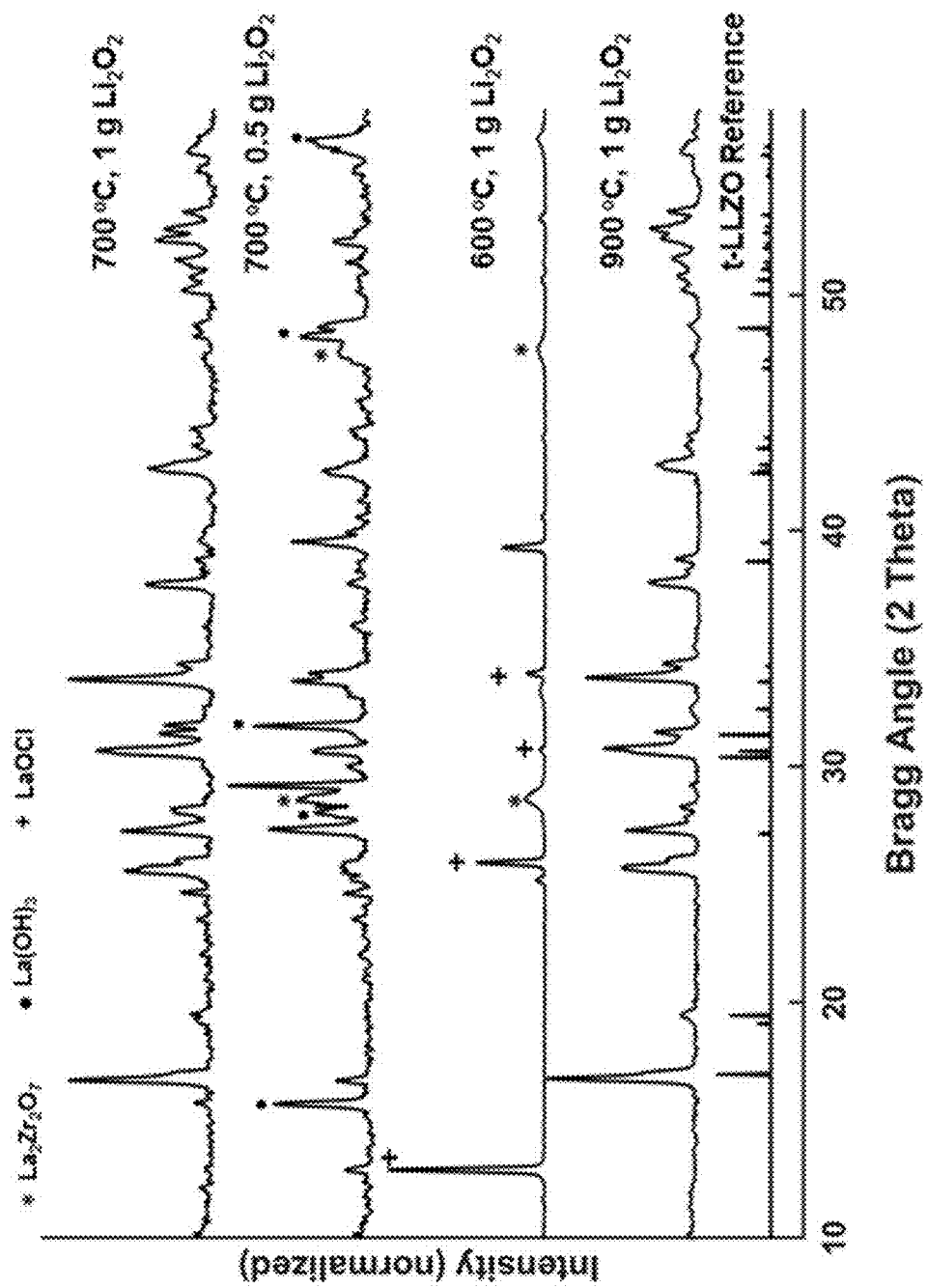
FIG. 6 shows an X-ray diffraction pattern of products obtained when different amounts of $Li_2O_2$ were added to LiCl:KCl flux at reaction temperatures of 600-900° C.

Since the eutectic LiCl:KCl flux has been shown to be an effective reaction medium for LLZO, addition of additives can be used to modify the reaction conditions. Knowing that more Lux-Flood basic salts will more strongly drive oxides to form at lower temperatures, adding such a base is a logical method to reduce the synthesis temperature of LLZO from 900° C. to a lower value. In this case, lithium peroxide ($Li_2O_2$) was chosen, as it will readily liberate a reactive oxygen anion. For these experiments, the same reagents and flux salts were used as in Example 2, with the only difference being added $Li_2O_2$. A series of reactions with various temperatures, hold times, and amounts of added $Li_2O_2$ were conducted, with results characterized by X-ray diffraction and shown in FIG. 6.

The results show that tetragonal phase LLZO could be formed with $Li_2O_2$ as an additive at not only 900° C., but also at 700° C., both with 3 h hold times. For the reaction performed at 700° C., as the amount of $Li_2O_2$ additive was increased from 0.5 g to 1 g, the main secondary phase, $La(OH)_3$, was eliminated and pure phase tetragonal LLZO could be obtained. At a reaction temperature of 600° C., LaOCl was the only crystalline product formed.

Example 7

Molten Salt Synthesis of LLZTO in Eutectic LiCl:KCl with NaF Additive

Ta-doped LLZO (LLZTO) of nominal composition $Li_{6.4}La_3Zr_{1.4}Ta_{0.6}O_{12}$ was synthesized in LiCl:KCl eutectic with metal nitrates (lithium nitrate, lanthanum hexahydrate, and zirconium oxynitrate hydrate) and $Ta_2O_5$ as reagents and various amounts of NaF as additive. The NaF additive is added to improve the dissolution of oxides, due to the greater solubilizing powder of the fluoride anion compared to other halides.

Figure 7A:
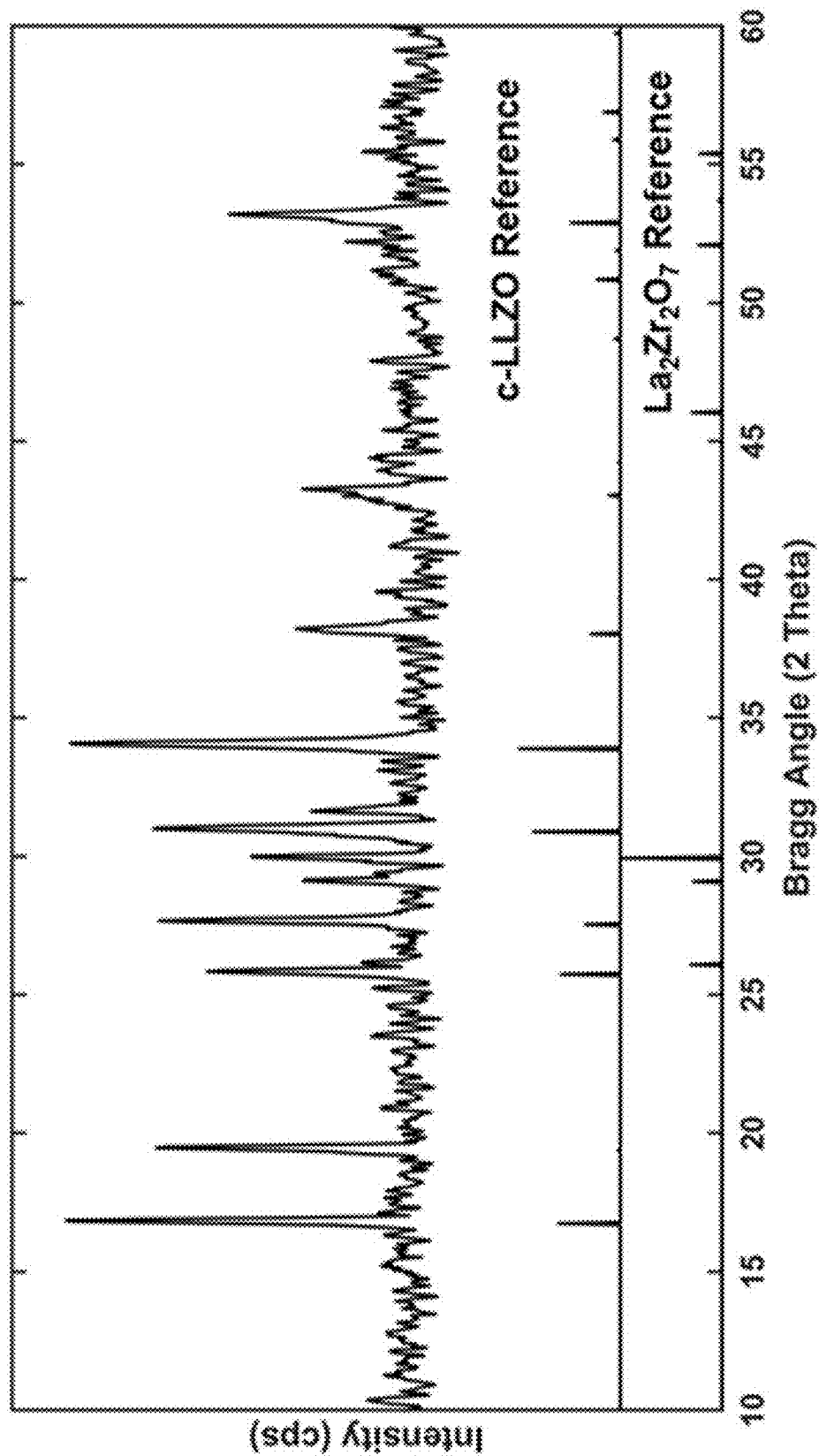
FIG. 7A shows an X-ray diffraction pattern of Ta-doped cubic LLZO products obtained from molten salt synthesis in LiCl:KCl eutectic at 850° C. with 1 h reaction time without NaF additive.
Figure 7B:
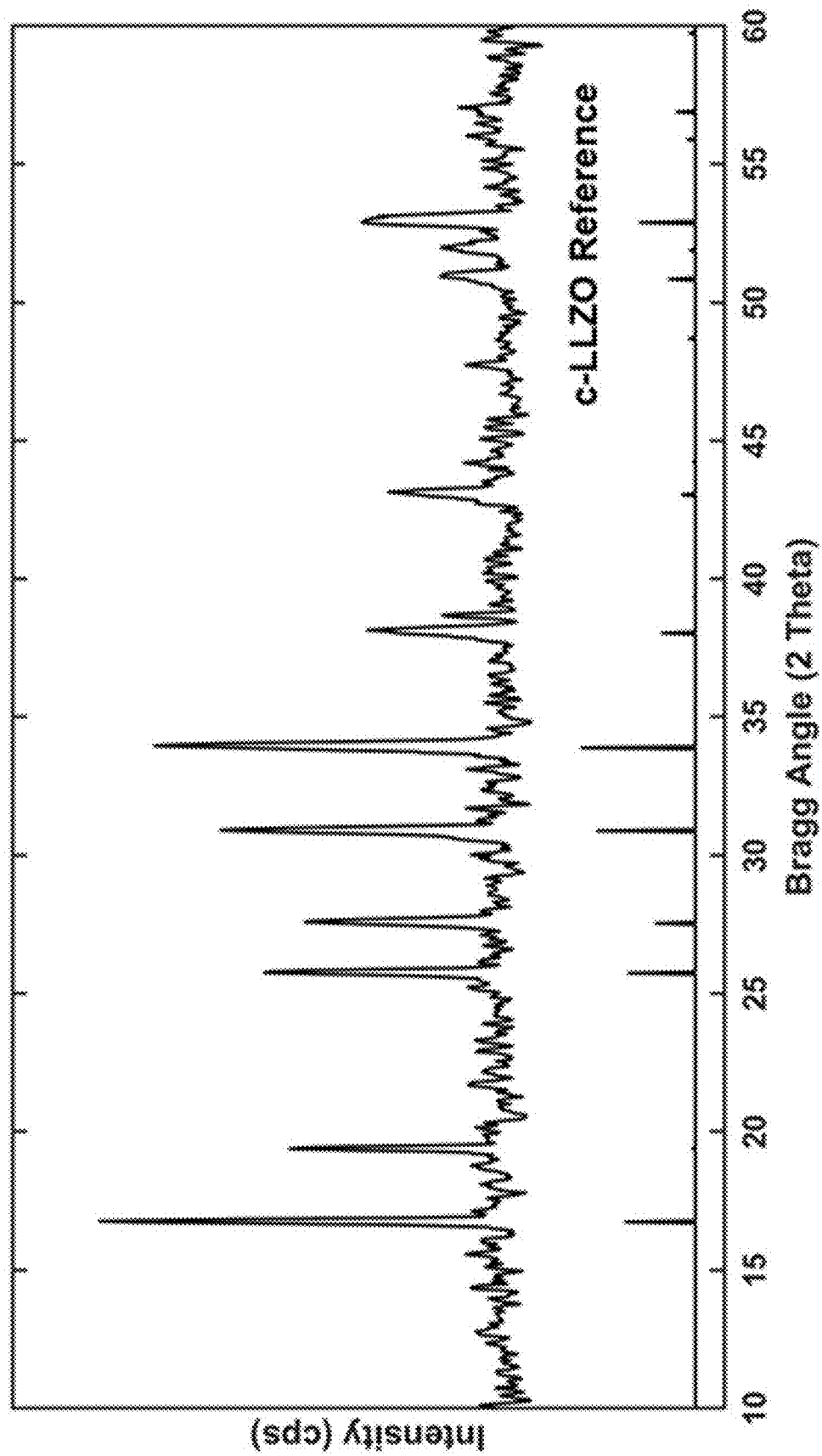
FIG. 7B shows and X-ray diffraction pattern of Ta-doped cubic LLZO products obtained from molten salt synthesis in LiCl:KCl eutectic at 850° C. with 1 h reaction time with NaF additive.
Figure 7C:
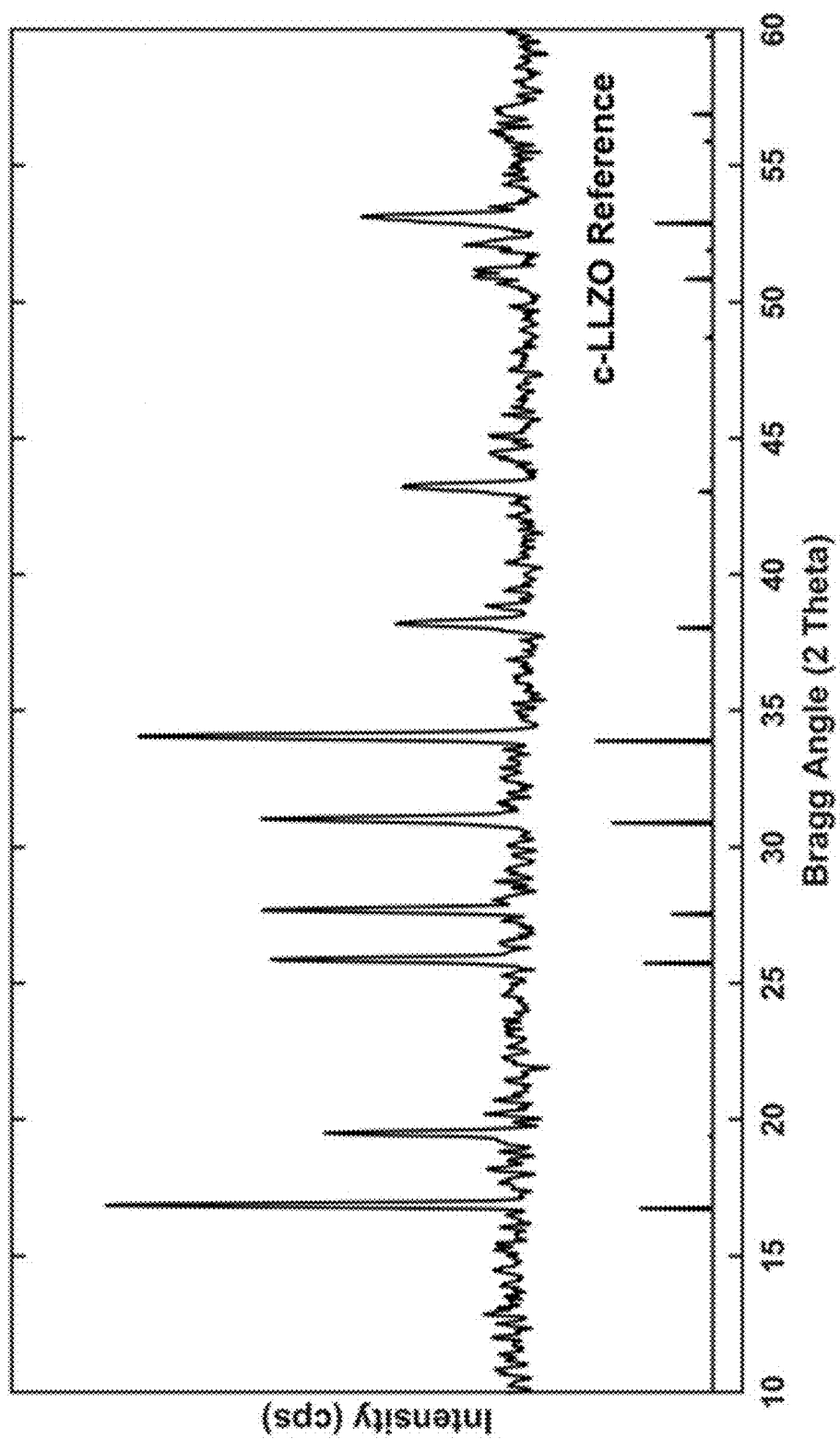
FIG. 7C shows an X-ray diffraction pattern of Ta-doped cubic LLZO products obtained from molten salt synthesis in LiCl:KCl eutectic at 800° C. with 4 h reaction time with NaF additive.
Figure 7D:
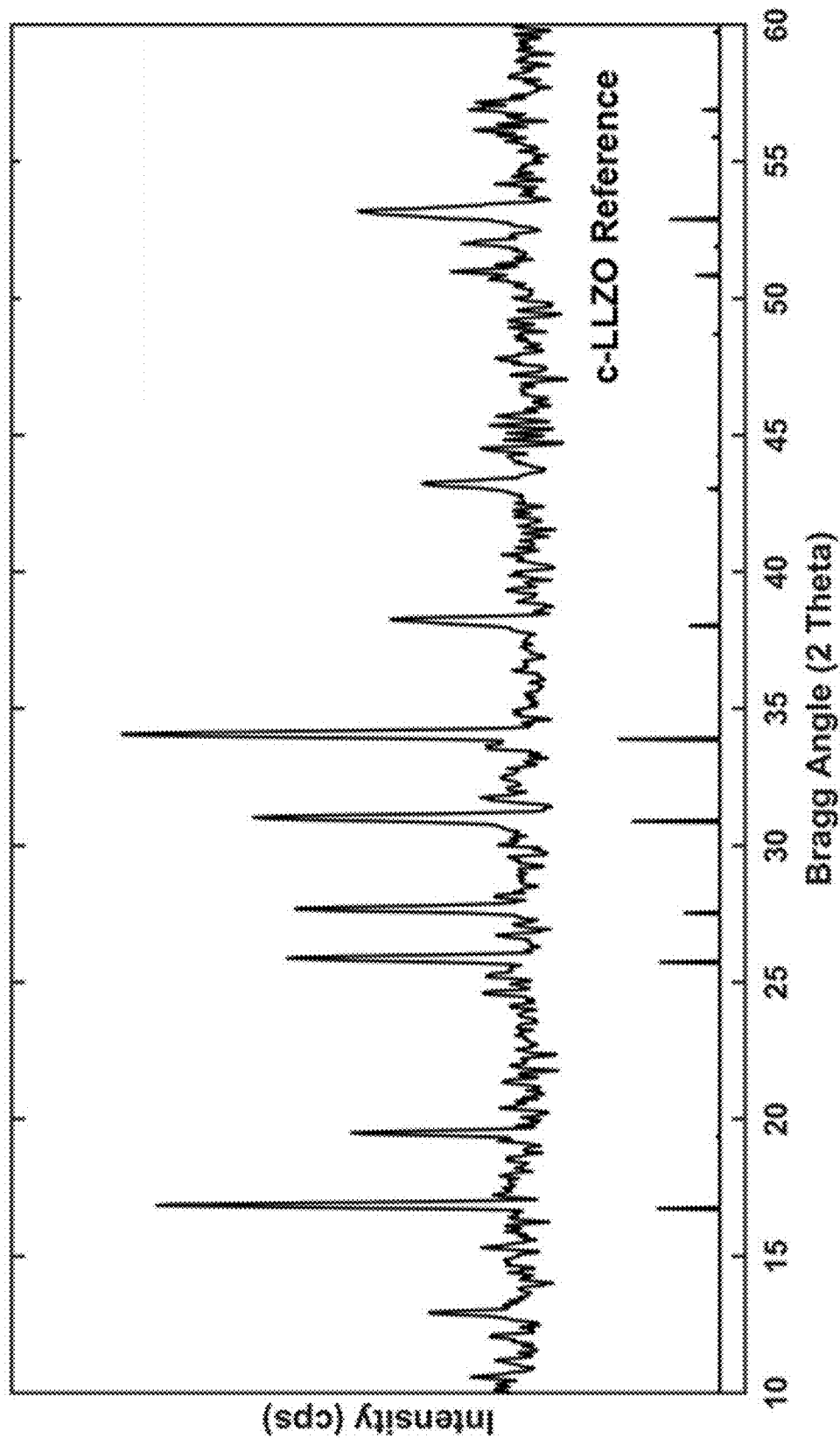
FIG. 7D shows an X-ray diffraction pattern of Ta-doped cubic LLZO products obtained from molten salt synthesis in LiCl:KCl eutectic at 800° C. with 4 h reaction time without NaF additive.

In these experiments, a 3:1 flux:reagents mass ratio was used to obtain more "dilute" melts. In a typical synthesis, 15 g of LiCl:KCl and 5 g of stoichiometric reagents to obtain LLZTO were used, with additions of 0%, 1%, 2.5%, 5%, 10%, and 25% (by mass) of NaF to investigate the effect of NaF addition. The presence of NaF was found to have a beneficial effect on the phase purity of the resulting product. For example, without any added NaF, the formation of LLZTO was incomplete, as shown by X-ray diffraction pattern in FIG. 7A (i.e. residual $La_2Zr_2O_7$ present) for the products obtained after reaction at 850° C. for 1 hour. On the other hand, after adding 5% NaF, the X-ray diffraction pattern showed that pure-phase LLZTO could be obtained after reaction 850° C. for 1 hour, as shown in FIG. 7B. When decreasing the reaction temperature to 800° C., the addition of 5% NaF was also found to be effective for obtaining phase-pure LLZTO after 4 hours of reaction time (FIG. 7C), while the products obtained from the NaF-free reaction carried out in the same conditions showed the presence of some impurities (FIG. 7D).

Figure 7E:
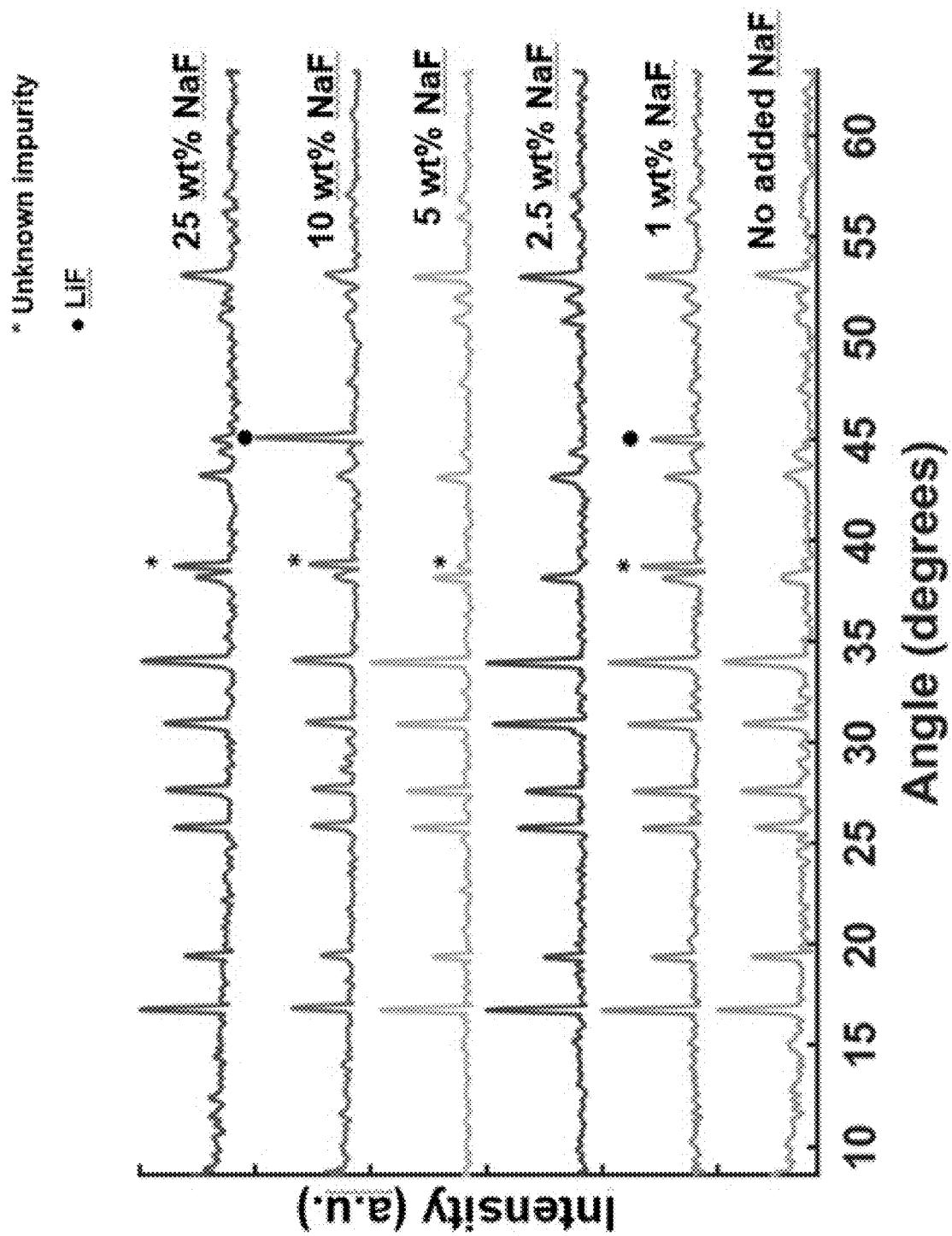
FIG. 7E shows X-ray diffraction patterns of Ta-doped cubic LLZO products obtained from molten salt synthesis in LiCl:KCl eutectic at 850° C. with 3 h reaction time with different amounts of NaF additive.

X-ray diffraction patterns of the powders obtained when the reaction was carried out at 850° C. for 3 hours with different amounts of added NaF is shown in FIG. 7E. The particle size and size distribution of the resultant powders from the reaction without NaF was relatively large, with some particles ~5 μm across seen as well as finer particles. However, when even a small amount of NaF was added, the particle sizes are clearly reduced. This effect does not appear to vary substantially when 1%, 2.5%, or 5% of NaF (based on mass of reactants and flux forming salts) were added. It also appears that the particle size distribution is narrower in all of these cases. When 10% or 25% NaF were added (based on mass of reactants and flux forming salts), the morphology appears worse than for lesser additions, and it was noted based on X-ray diffraction results that an impurity believed to be LiF was present in the product even after washing with water. This is likely due to the poor solubility of LiF in water.

From these results, addition of NaF appears to be beneficial in the correct proportion for particle size reduction of LLZTO. The mechanism is most likely the increased solubility of all metal oxide species that form in the melt and resultant narrowing of the temporal window in which LLZTO nucleates. This is corroborated by the fact that without any NaF added, the formation of LLZTO was incomplete under certain conditions at which pure LLZTO was obtained with the addition of even a small amount of NaF, such as 850° C. for 1 h.

Example 8

Molten Salt Synthesis of LLZO in Eutectic $Li_2CO_3:Na_2CO_3:K_2CO_3$

Figure 8A:
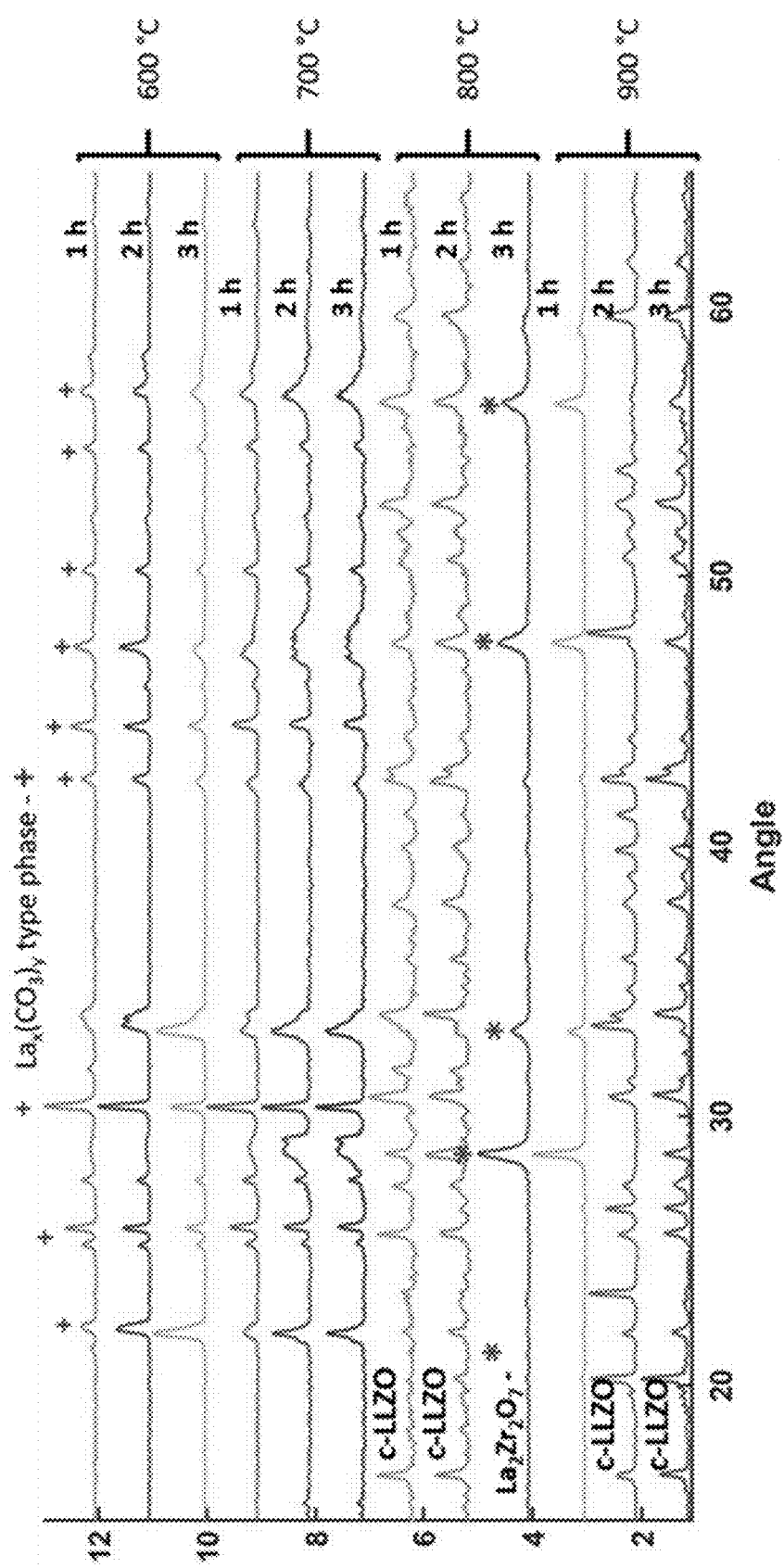
FIG. 8A shows X-ray diffraction patterns for products obtained in eutectic mixture of $Li_2CO_3$:$Na_2CO_3$:$K_2CO_3$ with $LiNO_3$, $La(NO_3)_3$, and $ZrO(NO_3)_2$ as reagents, reaction temperatures of 600-900° C., and reaction times between 1-3 h.
Figure 8B:
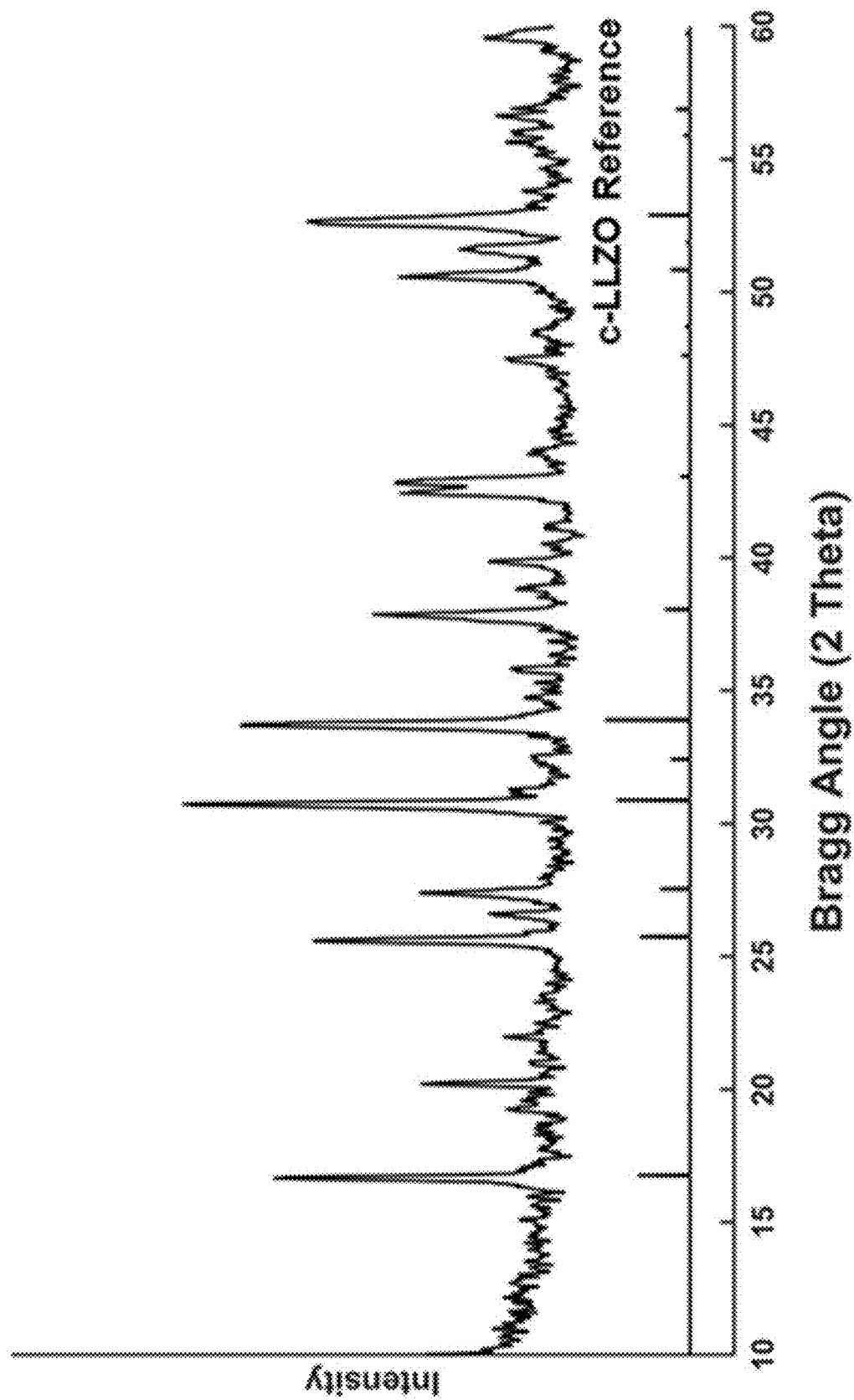
FIG. 8B shows an X-ray diffraction pattern for nearly phase-pure cubic LLZO product obtained in eutectic mixture of $Li_2CO_3$:$Na_2CO_3$:$K_2CO_3$ with $LiNO_3$, $La(NO_3)_3$, and $ZrO(NO_3)_2$ as reagents, reaction temperatures of 900° C. and reaction times of 7.5 h.

A mixture containing a eutectic mixture of $Li_2CO_3$: $Na_2CO_3$:$K_2CO_3$ (32.1 wt % $Li_2CO_3$; 34.5 wt % $K_2CO_3$; 33.4 wt % $Na_2CO_3$, melting point<500° C.) was investigated as a molten salt reaction medium, with $LiNO_3$, $La(NO_3)_3$, and $ZrO(NO_3)_2$ as reagents. In this case, successful formation of LLZO was accomplished using a 5:1 (by mass) flux salts to reagents ratio. This method was investigated between temperatures of 600-900° C. for reaction times between 1-3 h. A series of X-ray diffraction of materials synthesized with this method can be seen in FIG. 8A. At 600° C., an X-ray diffraction pattern tentatively identified as arising from a lanthanum carbonate type phase is observed. At 700° C., lanthanum zirconate ($La_2Zr_2O_7$) is seen to form. As the temperature increases to 800° C., pure $La_2Zr_2O_7$ is seen for a reaction time of 3 h. For 1 and 2 h reaction times, reflections correlating to c-LLZO can be seen, although for these reactions the salt phase had seemed to have evaporated after synthesis, indicating a different formation mechanism. However, at 900° C., impure c-LLZO can be seen to form for 2-3 h reaction times. Nearly pure c-LLZO is formed at 900° C. for 7.5 h, as can be seen in FIG. 8B. While this medium appears able to form LLZO much like the eutectic LiCl:KCl medium, longer reaction times are required, and the material seems more irregular with a greater particle size distribution. Further, the insolubility of $Li_2CO_3$ in water makes washing and purification of the products difficult.

Example 9

Figure 9A:
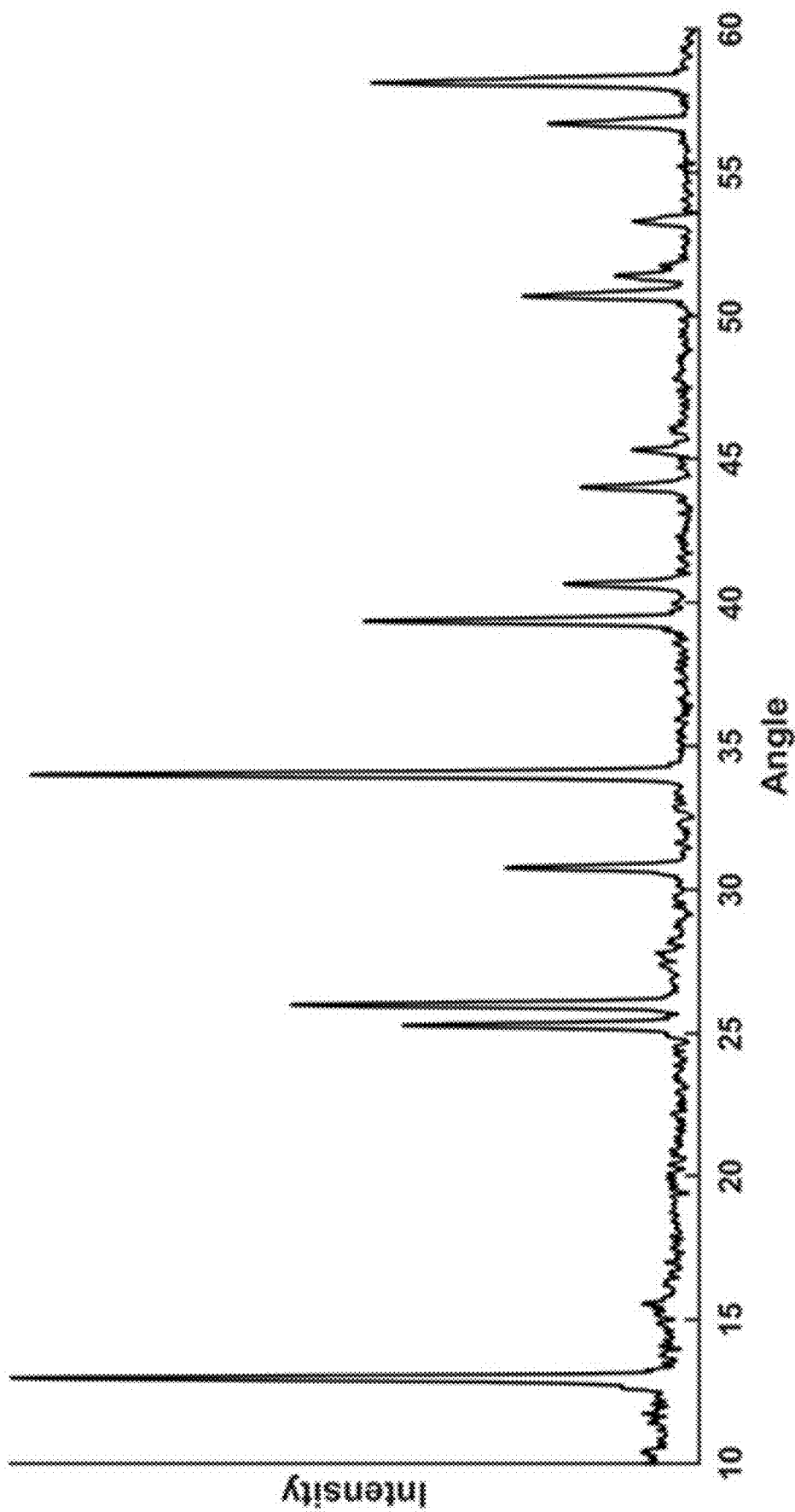
FIG. 9A shows an X-ray diffraction pattern of LaOCl synthesized in LiCl—KCl flux at 500° C.
Figure 9B:
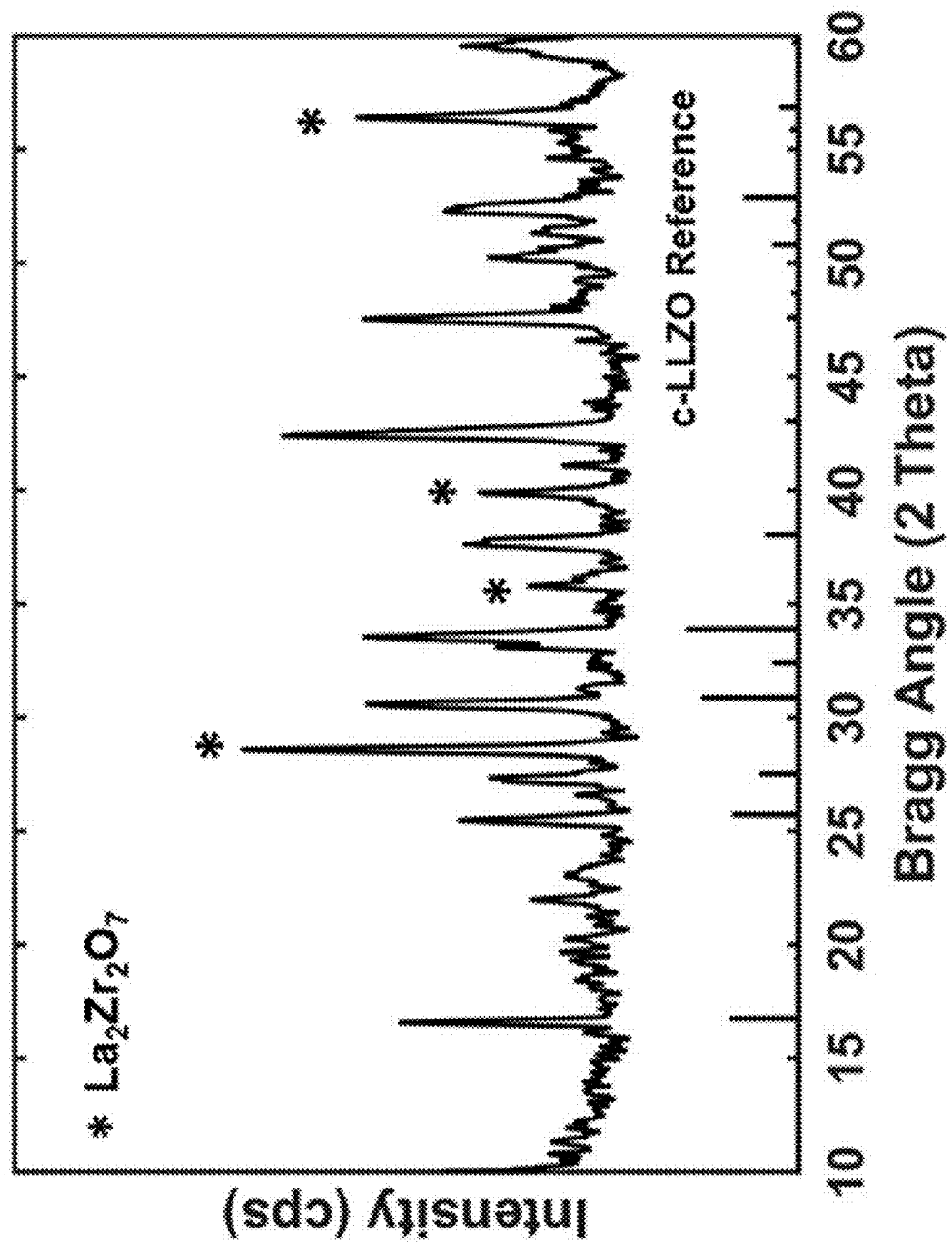
FIG. 9B shows an X-ray diffraction pattern of products obtained after synthesis of LLZO using LaOCl (synthesized in LiCl—KCl flux at 500° C.) as lanthanum source in eutectic $Li_2CO_3$:$Na_2CO_3$:$K_2CO_3$ and reaction at 800° C. for 8 h.

Molten Salt Synthesis of LLZO in Eutectic $Li_2CO_3$: $Na_2CO_3$:$K_2CO_3$ with LaOCl as a Lanthanum Source. In order to assess the ability of the molten carbonate medium to form LLZO with different reagents, $La(NO_3)_3$ was replaced by LaOCl. As discussed in Example 2, LaOCl forms easily in the eutectic LiCl—KCl flux at temperatures as low as 500° C. Pure LaOCl was first synthesized in the LiCl—KCl flux at 500° C., followed by washing with de-ionized water. An X-ray diffraction pattern of the LaOCl is shown in FIG. 9A. Then, $LiNO_3$, LaOCl, and $ZrO(NO_3)_2$ were combined in a 7:3:2 molar ratio and ground intimately with an agate mortar and pestle. Finally, this reagent mixture was mixed with eutectic $Li_2CO_3$:$Na_2CO_3$:$K_2CO_3$ in a 1:5 mass ratio and heat treated at 800° C. for 8 h with a 3.33° C./min ramp rate. An X-ray diffraction pattern (FIG. 9B) of the resultant material shows the presence of both $La_2Zr_2O_7$ and c-LLZO. Scanning electron microscopy images of the as-synthesized material show hard agglomerates of smaller plate-like particles. This may indicate that LLZO forms topochemically on pre-existing LaOCl plates in the carbonate flux.

Example 10

Molten Salt Synthesis of LLZO in $LiNO_3$:LiOH:$Li_2O_2$

Figure 10A:
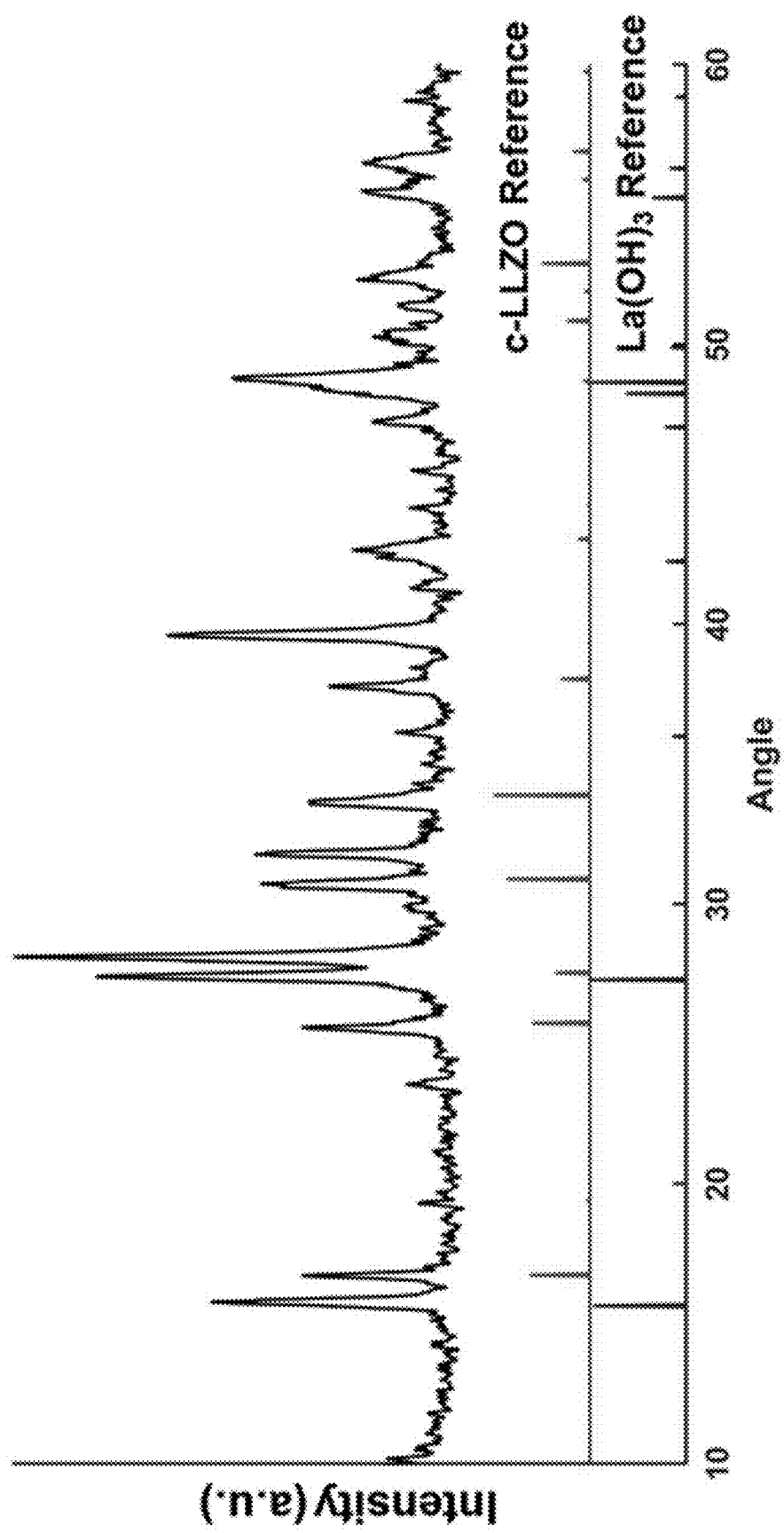
FIG. 10A shows an X-ray diffraction pattern of product obtained from the reaction of $LiNO_3$, $La(NO_3)_3$, and $ZrO(NO_3)_2$ in a mixture containing 1:2:2 (mole ratio) of $LiNO_3$, LiOH, and $Li_2O_2$ using a 2 hour ramp to 550° C., 3 hour hold at 550° C., followed by natural cooling to room temperature.
Figure 10B:
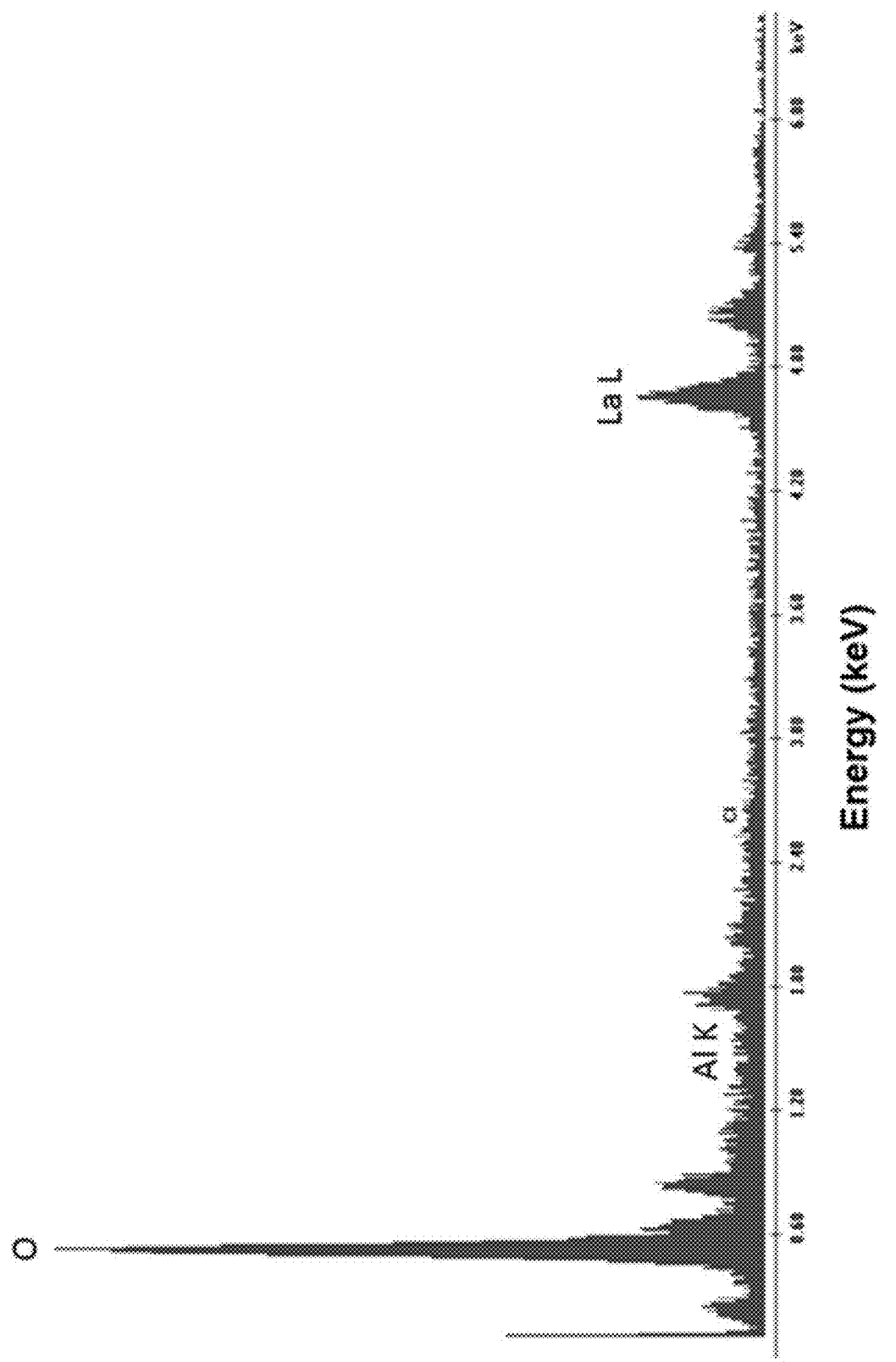
FIGS. 10B-10D show energy dispersive X-ray spectra of three different morphologies of the product described with respect to FIG. 10A.
Figure 10C:
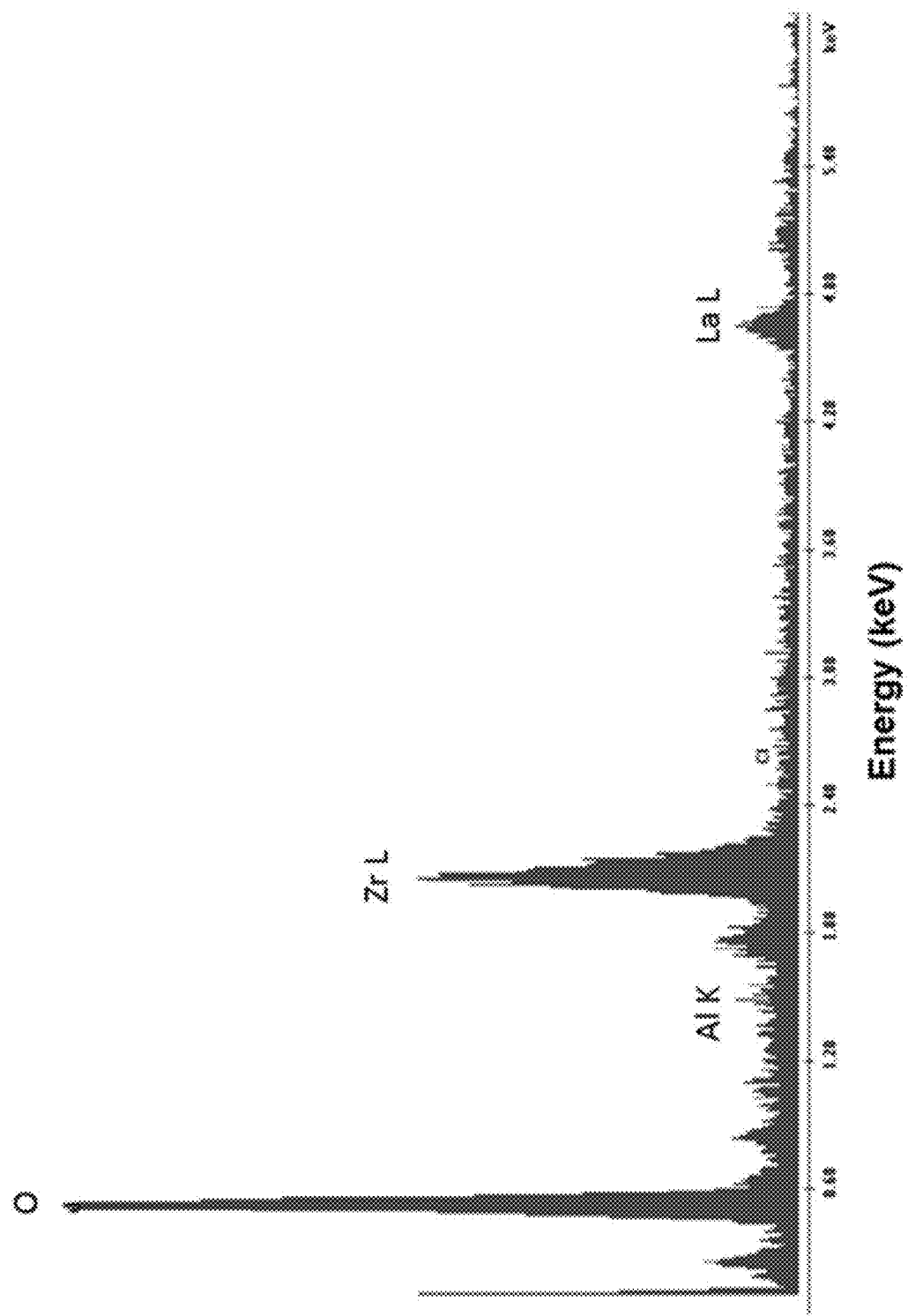
Figure 10D:
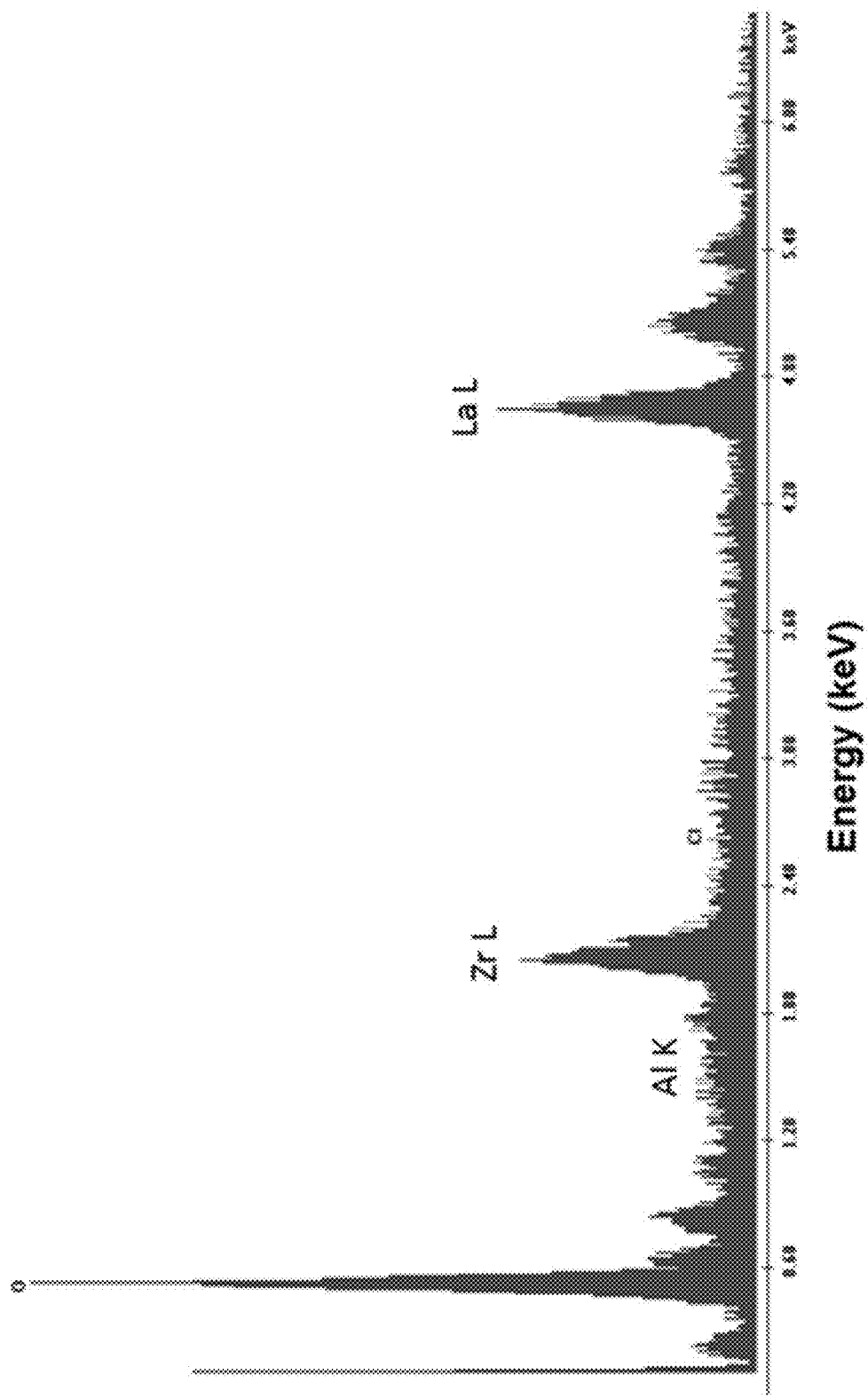

A mixture containing 1:2:2 (mole ratio) of $LiNO_3$, LiOH, and $Li_2O_2$ was used as a highly basic salt medium. In this case, a synthesis temperature of 550° C. was used (the melting point of this mixture is less than 300° C.). As in previous examples, $LiNO_3$, $La(NO_3)_3$, and $ZrO(NO_3)_2$ were used as reagents. Flux salts and reagents were mixed in a 1:1 ratio by mass. The X-ray diffraction pattern of the product obtained using reaction conditions consisting of a 2 hour ramp to 550° C., 3 hour hold at 550° C., followed by natural cooling to room temperature is shown in FIG. 10A. Based on the results, the primary crystalline phases are cubic LLZO and $La(OH)_3$. Some unidentified lithium zirconates may also be present, accounting for some of the smaller particles. Based on scanning electron microscopy images, there appear to be three primary morphologies: hexagonally shaped particles several microns across, aggregates of small particles, and submicron to few micron sized cubes. The hexagonal particles of the first type are most likely $La(OH)_3$ particles based on the energy dispersive X-ray spectrum (FIG. 10B) containing primarily signal from the La L X-ray lines. The second type are most likely some amorphous zirconium-containing species and possibly also small LLZO nuclei based on the element ratios in the energy dispersive X-ray spectrum (FIG. 10C) that shows a higher Zr to La peak ratio. The presence of La suggests some LLZO since $La(OH)_3$ is seen to present a different morphology elsewhere in this sample, and since no $La_2Zr_2O_7$ is present in the X-ray diffraction pattern. The highly faceted cubes are most likely cubic LLZO based on visible observation of their cubic crystal habit as well as the presence of a large amount of c-LLZO in the X-ray diffraction pattern. Further, energy dispersive X-ray spectroscopy of the cube (FIG. 10D) showed a composition with La:Zr ratio consistent with that found in LLZO. While phase-pure LLZO did not result in these reaction conditions, clearly it is possible to form LLZO at very low temperatures in this medium.

Figure 10E:
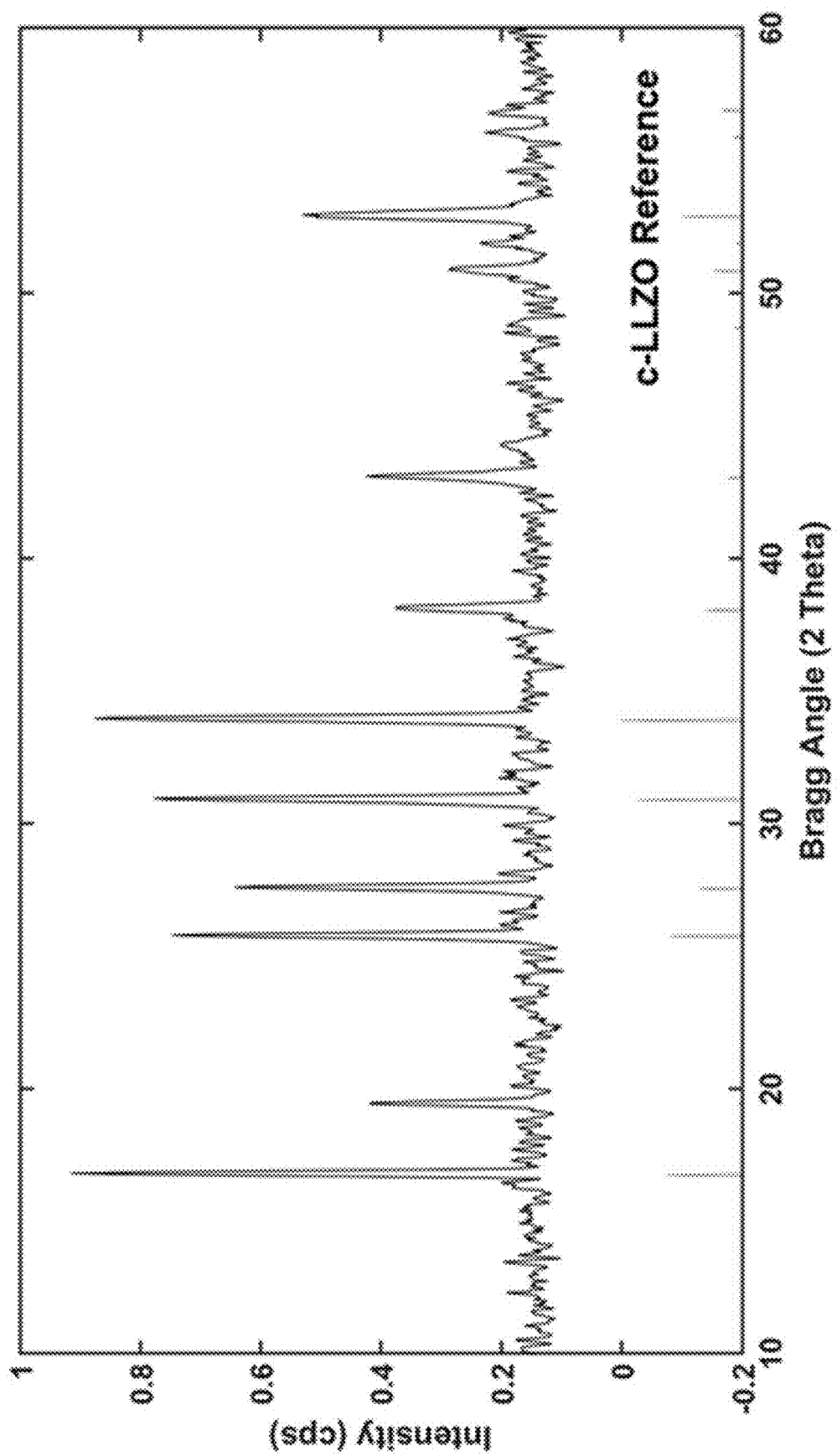
FIG. 10E shows an X-ray diffraction pattern of phase-pure Ta-doped LLZO in a mixture containing 1:2:2 (mole ratio) of $LiNO_3$, LiOH, and $Li_2O_2$, with a 10:1 flux: precursor ratio, reaction time of 550° C., and 4 hours reaction time.
Figure 10F:
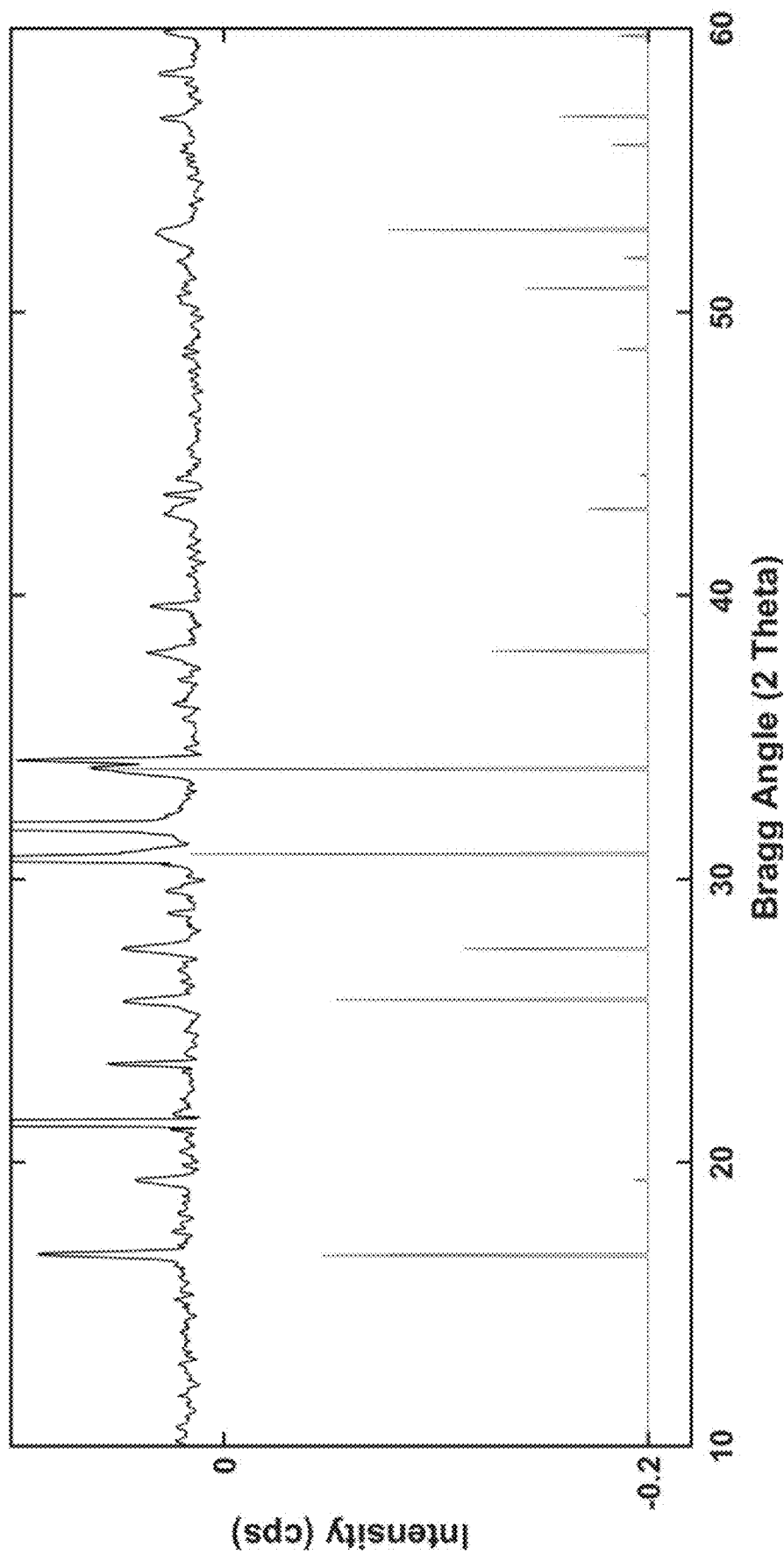
FIG. 10F is an X-ray diffraction pattern showing the presence of LLZTO formed at a temperature as low as 500° C.

To improve the phase-purity of the products in this highly basic salt medium, a 10:1 ratio of flux:precursors was used. Additionally, instead of co-mixing reagents and flux-forming salts, the flux salts were preheated to 550° C. followed by slow addition of the ground reagent salts to the molten flux, followed by a brief gentle mixing to ensure uniformity. Using a reaction temperature of 550° C. for 4 hours, pure-phase cubic LLZTO (nominal composition $Li_{6.4}La_3Zr_{1.4}Ta_{0.6}O_{12}$) could be obtained, as shown by the X-ray diffraction pattern in FIG. 10E. Preliminary results indicate that LLZTO forms at a temperature as low as 500° C., as shown by the X-ray diffraction pattern in FIG. 10F. In this case, some impurity phase is still present, but reflections corresponding to the garnet structure can be clearly seen by comparison with a reference pattern for LLZO (also shown in FIG. 10F). This indicates that, with ideal synthesis conditions, pure LLZTO can be formed in this medium.

Example 11

Molten Salt Synthesis of LLZO and LLZTO in LiOH Salt Medium

Figure 11A:
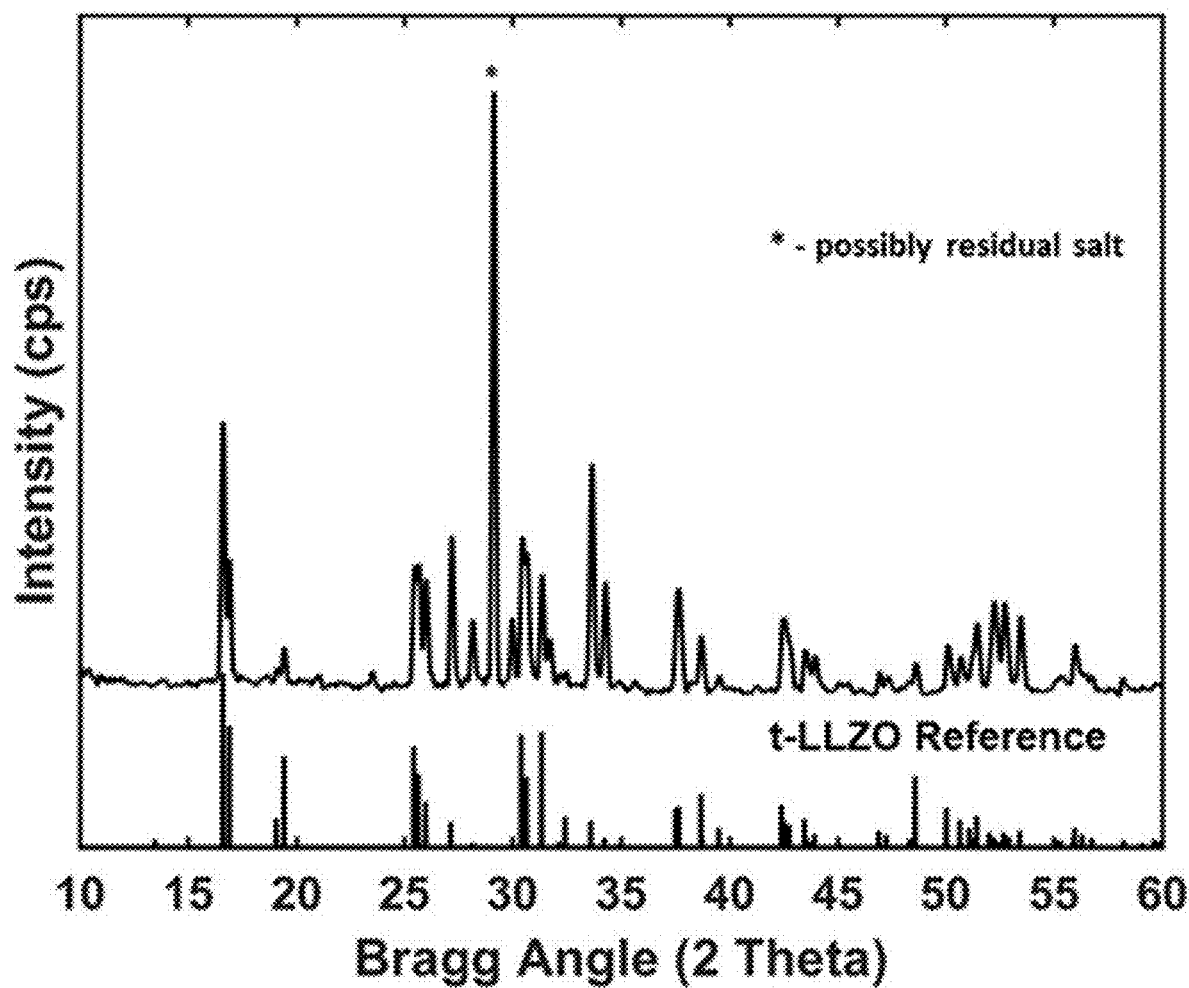
FIG. 11A shows an X-ray diffraction pattern of tetragonal LLZO obtained after synthesis in LiOH molten salt at 550° C. for 4 h.
Figure 11B:
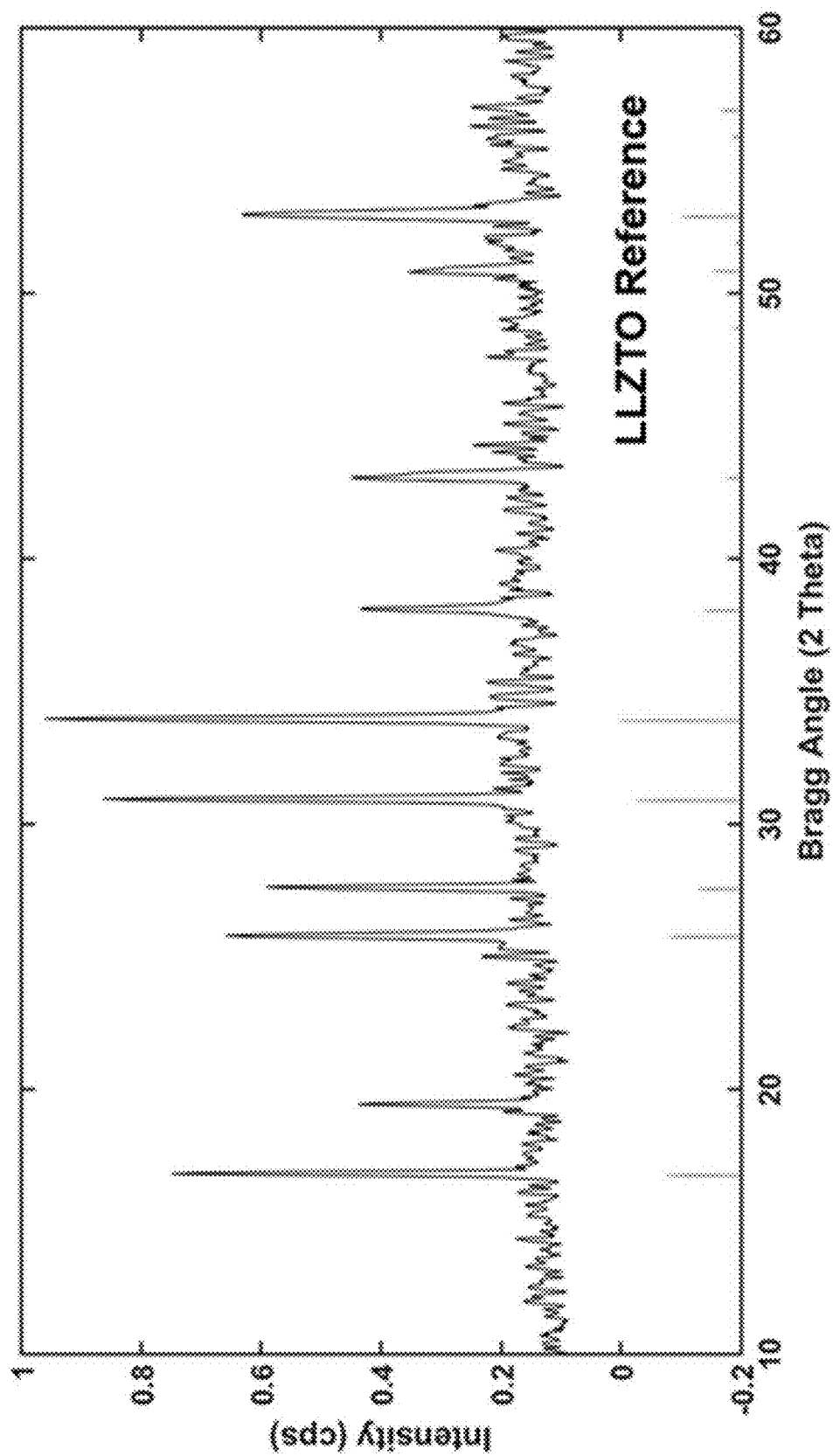
FIG. 11B shows an X-ray diffraction pattern of LLZTO obtained after synthesis in LiOH molten salt at 550° C. for 4 h.
Figure 11C:
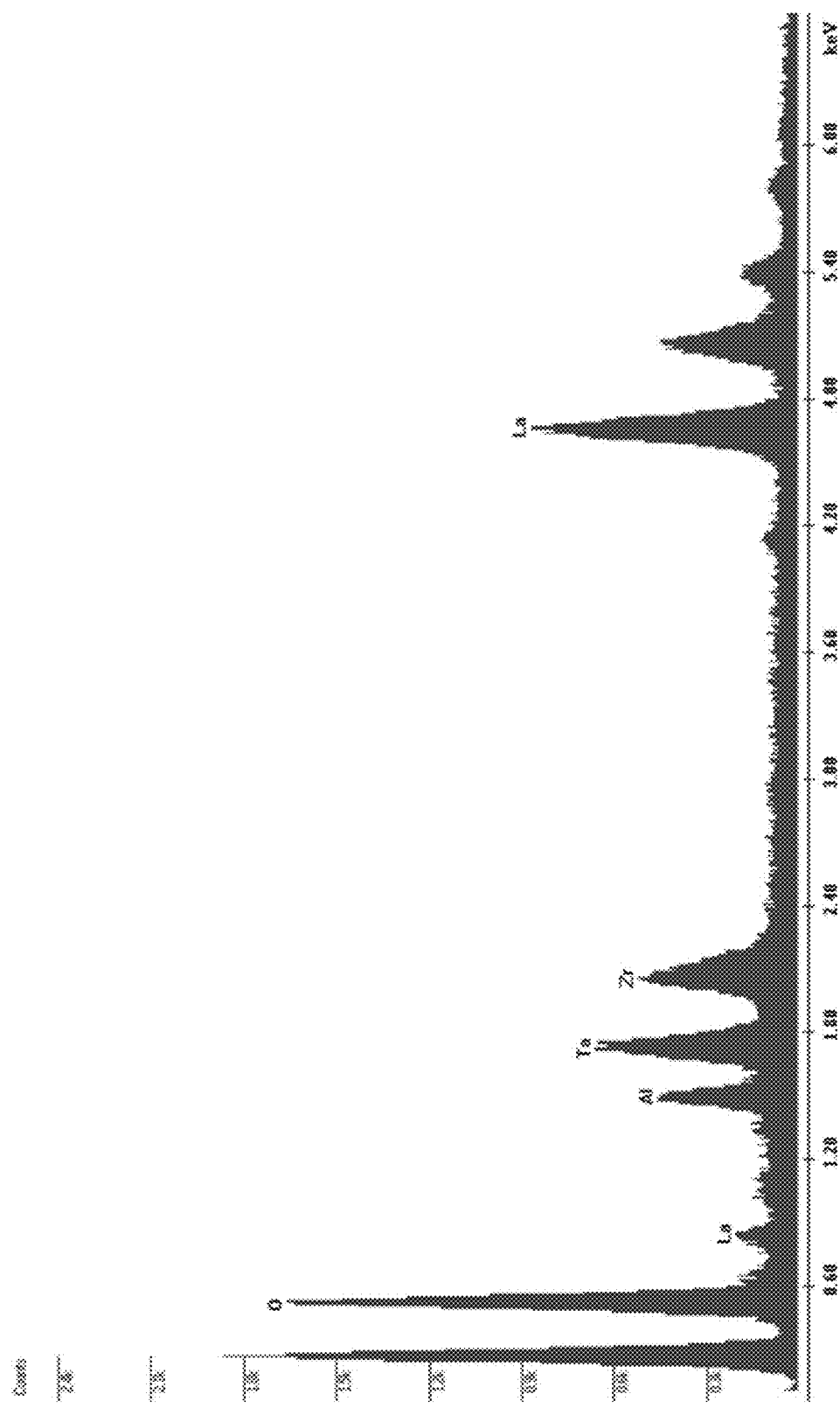
FIG. 11C shows energy dispersive X-ray spectroscopy results of LLZTO obtained after synthesis in LiOH molten salt at 550° C. for 4 h.

Pure LiOH (melting point: 462° C., boiling point: 924° C.) was used as the molten flux in this example using $LiNO_3$, $ZrO(NO_3)_2$, $La(NO_3)_3$, and optionally $Ta_2O_5$ as precursors, and an alumina crucible as the reaction vessel. Reagents and molten flux salts were either mixed together via grinding using an agate mortar and pestle, or the reagents were ground together and added to pre-melted LiOH at the desired temperature. When using pre-mixed reagents and LiOH and a 2 h ramp to 550° C., a 4 h hold at 550° C., and natural cooling to room temperature, the X-ray diffraction result showed that the product was predominately tetragonal LLZO in the absence of Ta dopant (FIG. 11A). The product appears to consist only of t-LLZO and with one unidentified peak observed in the X-ray diffraction pattern, which could be from residual salt. In the case of LLZTO synthesized in this medium, $LiNO_3$, $ZrO(NO_3)_2$, $La(NO_3)_3$, and $Ta_2O_5$ were ground together into a fine powder using an agate mortar and pestle. This reagent mixture was then poured into molten LiOH at 550° C. (10:1 LiOH:reagents ratio by mass), briefly stirred, and allowed to react for 4 h at 550° C. followed by natural cooling to room temperature. In this case, highly phase pure cubic LLZTO was obtained with no apparent impurity phases as can be observed in the X-ray diffraction pattern in FIG. 11B. A representative energy dispersive X-ray spectroscopy spectrum is shown in FIG. 11C. The majority of the particles are faceted and in the 1-5 μm size range, with some smaller and larger particles observed. Additionally, the energy dispersive X-ray spectrum indicates that these particles are LLZTO based on the presence of both Zr L and Ta M X-ray lines.

Example 12

Molten Salt Synthesis of LLZTO in LiCl:LiOH Salt Medium

Figure 12:
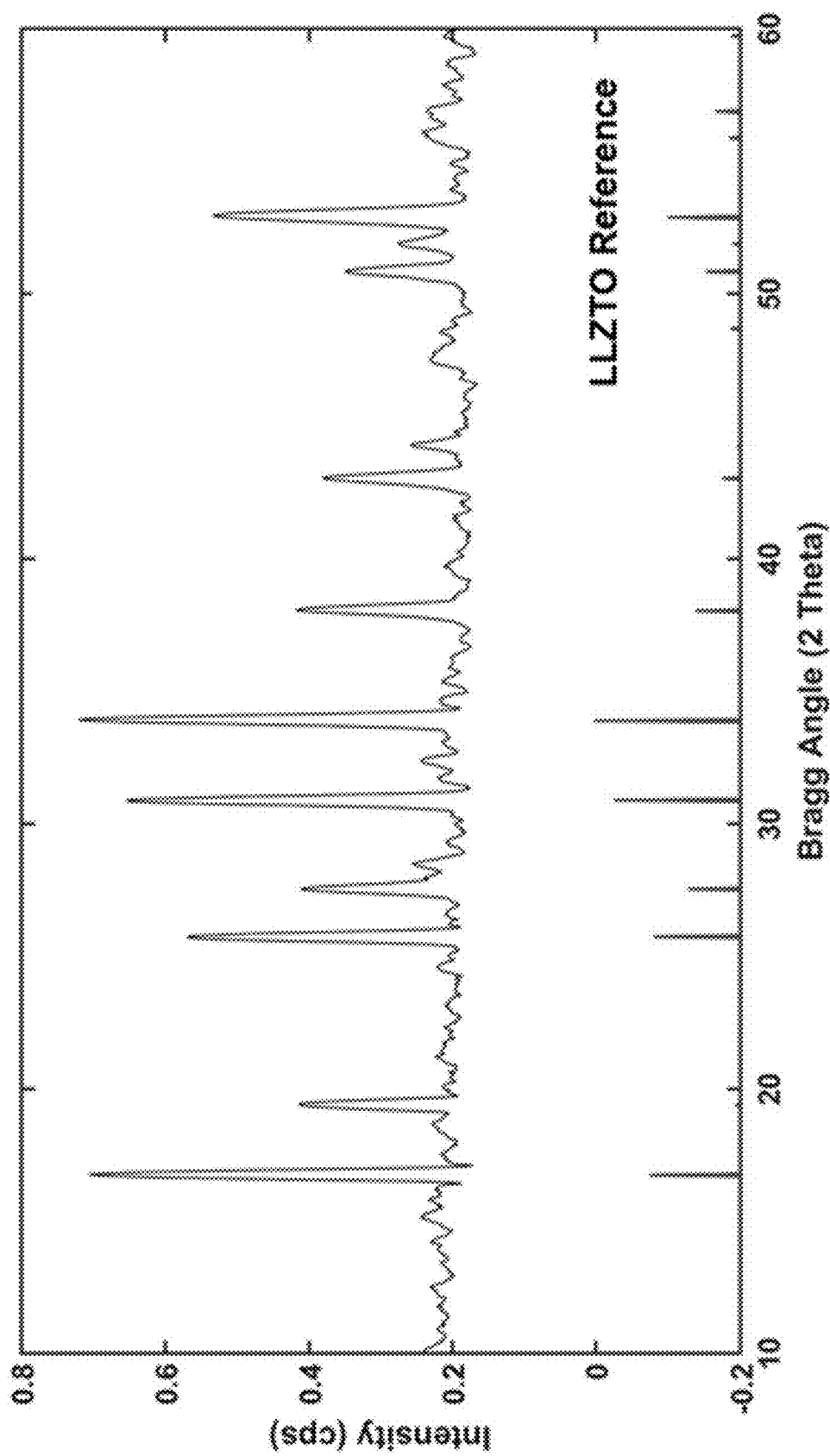
FIG. 12 shows an X-ray diffraction pattern of LLZTO prepared in LiCl:LiOH flux at 700° C. for 1.5 h.

To investigate the effect of a Lux-Flood basic medium with a large proportion of "neutral" salts, a molten flux system consisting of 1:1 LiCl:LiOH (by mass, melting point<350° C.) was investigated. In this case, LLZTO of nominal composition $Li_{6.4}La_3Zr_{1.4}Ta_{0.6}O_{12}$ was the target material. This synthesis was performed using a 2:1 ratio of flux salts to reagents (by mass) and $LiNO_3$, $La(NO_3)_3$, $ZrO(NO_3)_2$, and $Ta_2O_5$ as reagents. Similar to the LiCl—KCl medium with added $Li_2O_2$, LLZTO could be synthesized at temperatures as low as 700° C. in this medium. Further, only a short 1.5 h hold time is required to obtain phase-pure LLZTO. An X-ray diffraction pattern of LLZTO synthesized at 700° C. for 1.5 h is shown in FIG. 12. As can be seen in scanning electron microscopy images of the as-synthesized material, somewhat large (5-20 μm) faceted particles of LLZTO are present, and the phase purity based on the X-ray diffraction pattern is very high.

Example 13

Molten Salt Synthesis of LLZTO in LiBr:KBr Salt Medium

Figure 13:
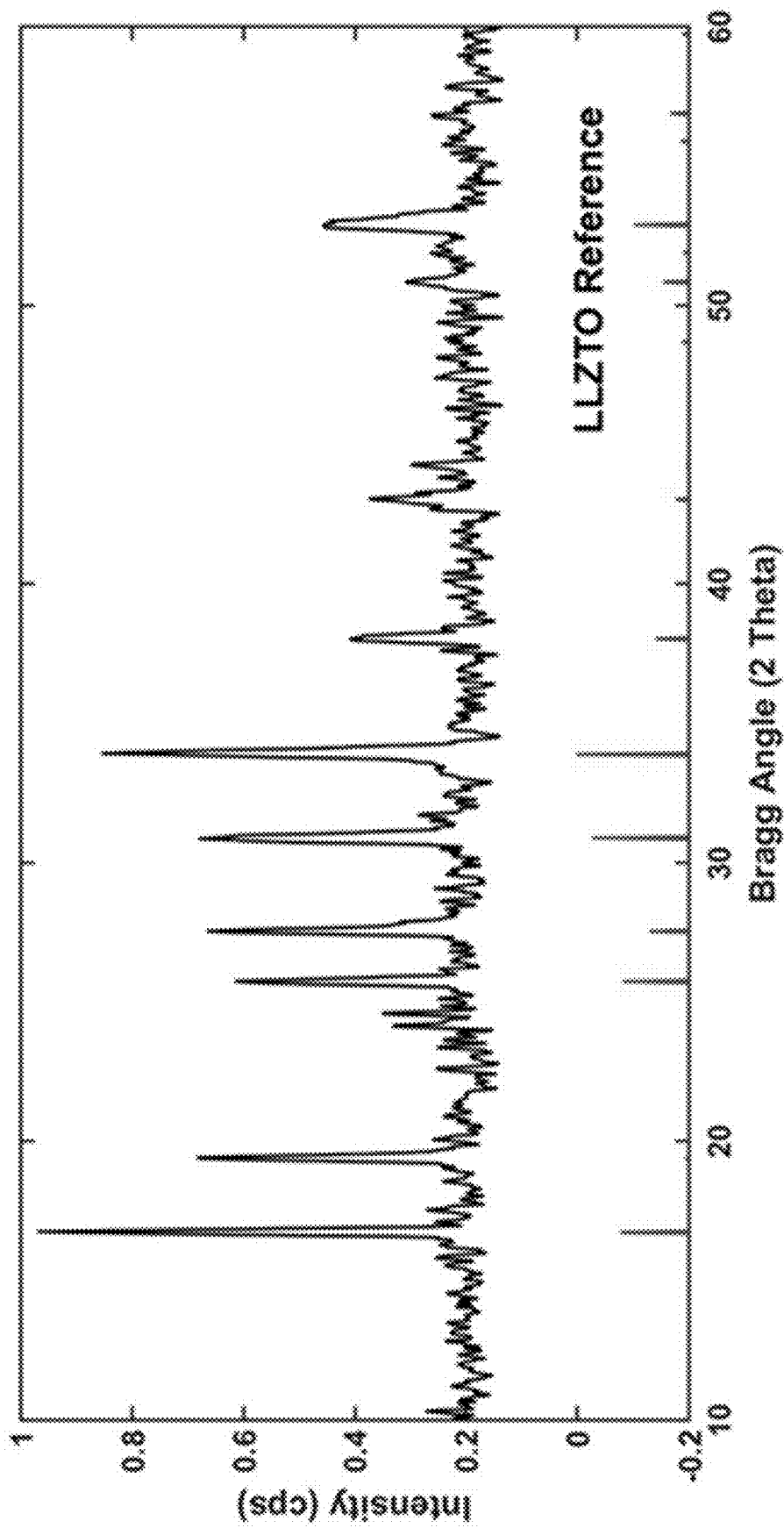
FIG. 13 shows an X-ray diffraction pattern of LLZTO prepared in LiBr:KBr flux at 900° C. for 4 h.

Much like the LiCl:KCl medium, LLZTO can be synthesized in eutectic LiBr:KBr (~0.6:0.4 molar ratio, melting point ~329° C.). In this case as in several previous examples, $LiNO_3$, $La(NO_3)_3$, $ZrO(NO_3)_2$, and $Ta_2O_5$ were used as reagents, and mixed with flux salts in a 1:1 ratio by mass and reactions took place in alumina crucibles. Heating to 900° C. at a rate of 5° C./min and holding for 4 h resulted in apparently phase pure LLZTO, as can be seen in the X-ray diffraction pattern in FIG. 13.

Example 14

Molten Salt Synthesis of LLZTO in NaCl:KCl Salt Medium

Figure 14A:
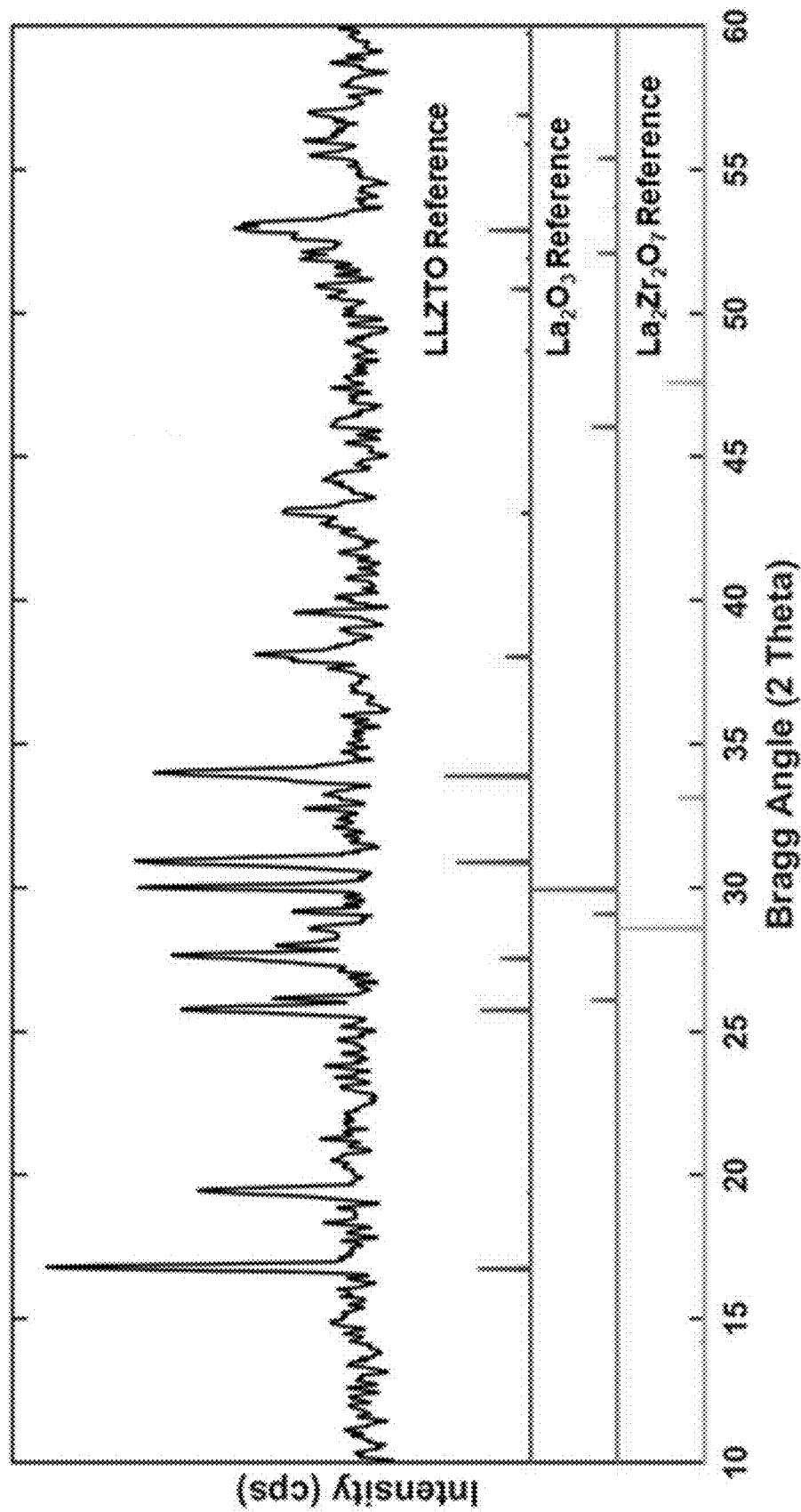
FIG. 14A shows an X-ray diffraction pattern of LLZTO synthesized in NaCl—KCl flux at 900° C.
Figure 14B:
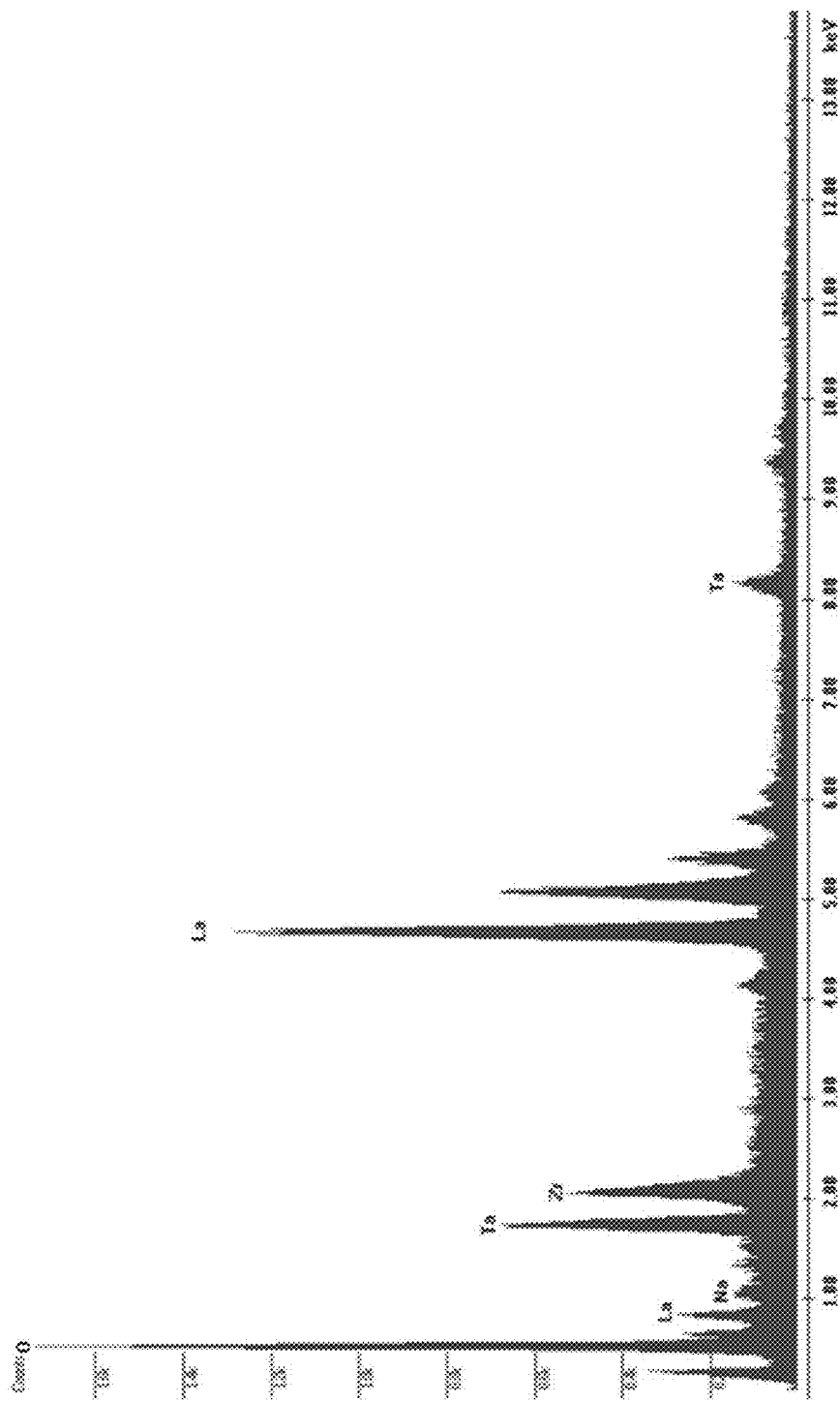
FIG. 14B shows energy dispersive X-ray spectrum of LLZTO synthesized in NaCl—KCl flux at 900° C.

Similar to the LiCl:KCl medium, LLZTO can be synthesized in eutectic NaCl:KCl (~0.5:0.5 molar ratio, melting point ~657° C.). In this case as in several previous examples, $LiNO_3$, $La(NO_3)_3$, $ZrO(NO_3)_2$, and $Ta_2O_5$ were used as reagents, and mixed with flux salts in a 1:1 ratio by mass and reactions took place in alumina crucibles. Heating to 900° C. at a rate of 5° C./min and holding for 4 h resulted in LLZTO along with some $La_2Zr_2O_7$ and $La(OH)_3$, as can be seen in the X-ray diffraction pattern in FIG. 14A. An energy dispersive X-ray spectrum confirming the presence of LLZTO based on the presence of Ta M, Zr L, and La L X-ray lines is shown in FIG. 14B.

Example 15

Molten Salt Synthesis of LLZO in LiCl:NaCl Salt Medium

Figure 15:
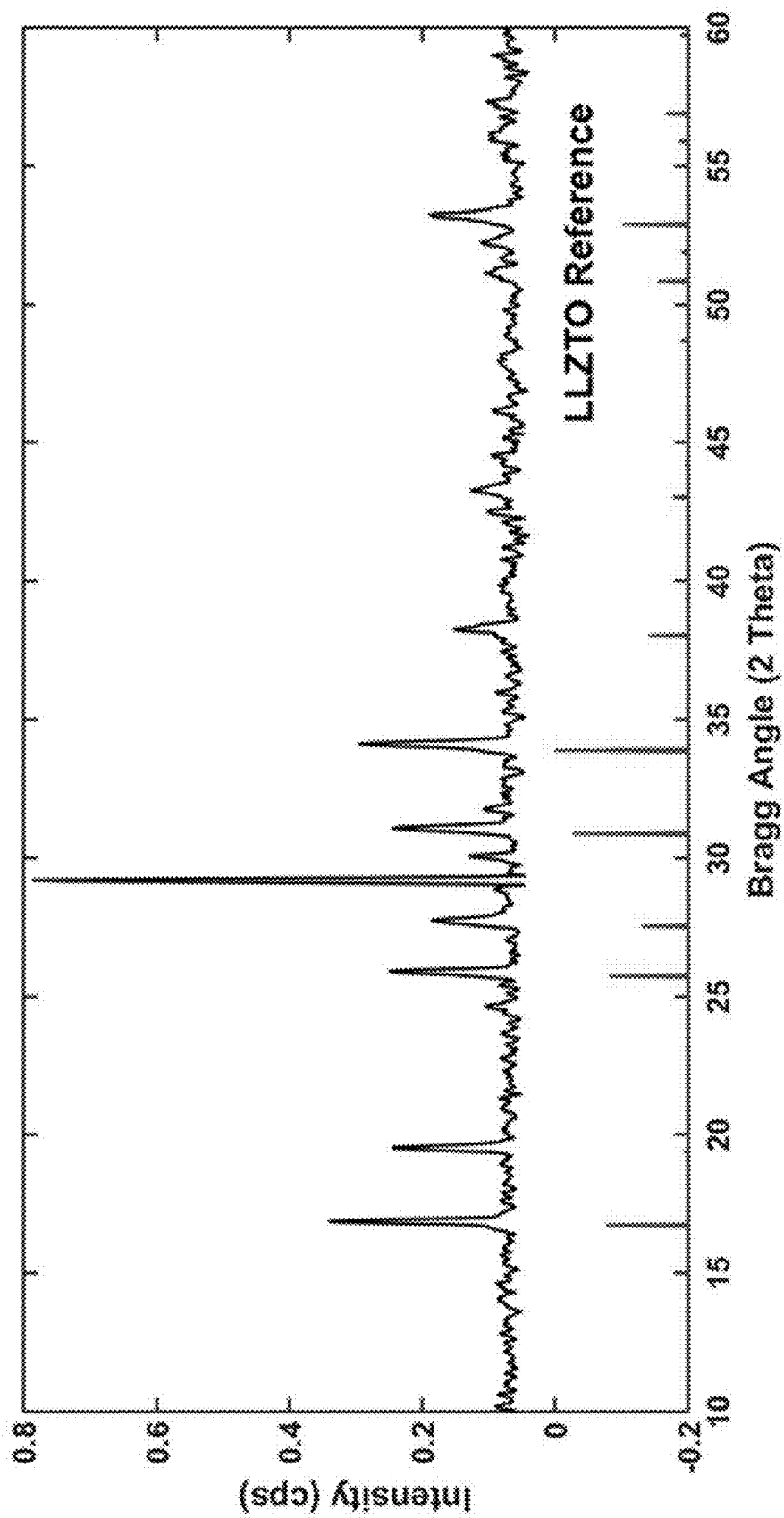
FIG. 15 shows an X-ray diffraction pattern of LLZTO prepared in LiCl:NaCl flux at 900° C. for 4 h.

Similar to the LiCl:KCl medium, LLZTO can be synthesized in eutectic LiCl:NaCl (~0.72:0.28 molar ratio, melting point ~553° C.). In this case as in several previous examples, $LiNO_3$, $La(NO_3)_3$, $ZrO(NO_3)_2$, and $Ta_2O_5$ were used as reagents, and mixed with flux salts in a 1:1 ratio by mass and reactions took place in alumina crucibles. Heating to 900° C. at a rate of 5° C./min and holding for 4 h resulted in LLZTO along with an unidentified impurity phase as seen in FIG. 15 depicting an X-ray diffraction pattern of the as-synthesized material.

Summary of Examples

Figure 16A:
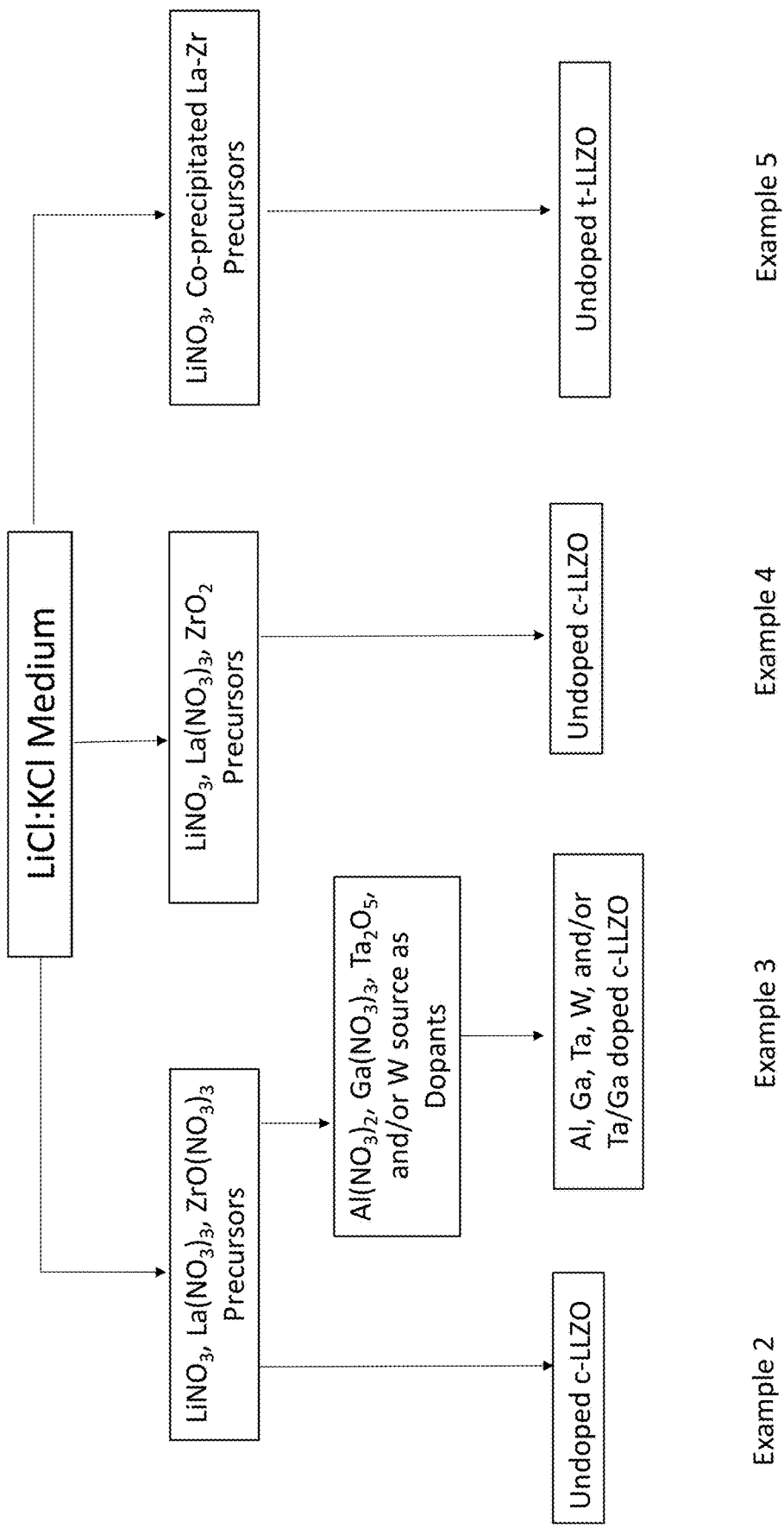
FIGS. 16A-16E show flow charts for precursors and products of various LLZO and LLZTO compounds.

Examples 2, 3, 4, 5 indicate that various precursors in combination with LiCl:KCl molten salt medium may enable synthesis of undoped cubic, doped cubic, and undoped tetragonal LLZO. FIG. 16A shows a flow chart for products resulting from these examples.

Figure 16B:
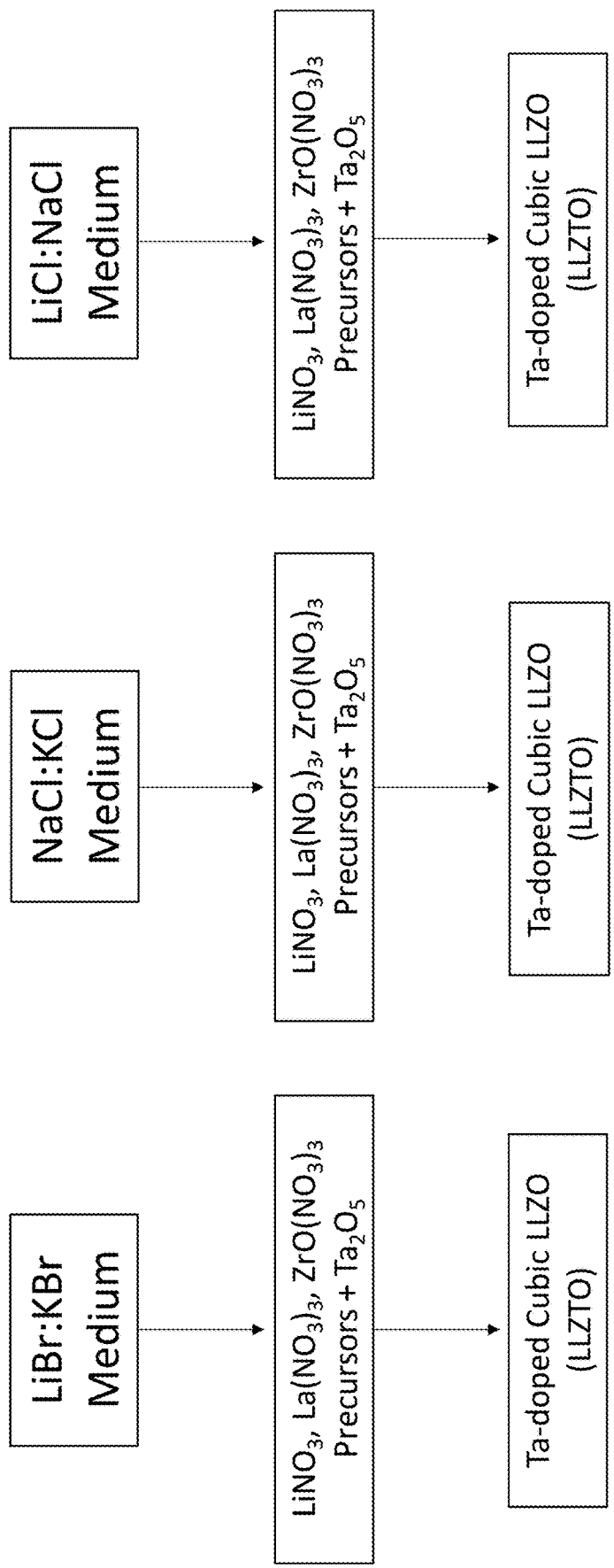

Examples 2, 13, 14, and 15 indicate that various combinations of alkali halides may be used to synthesize LLZO, and may enable control over particle size and formation conditions depending on which cations (i.e. alkalis) or anions (i.e. halogens) comprise the molten flux. It is expected that further control over the resultant material should be achievable based on choosing a given combination of any alkalis or halogens. FIG. 16B shows a flow chart for products resulting from Examples 13, 14, and 15.

Figure 16C:
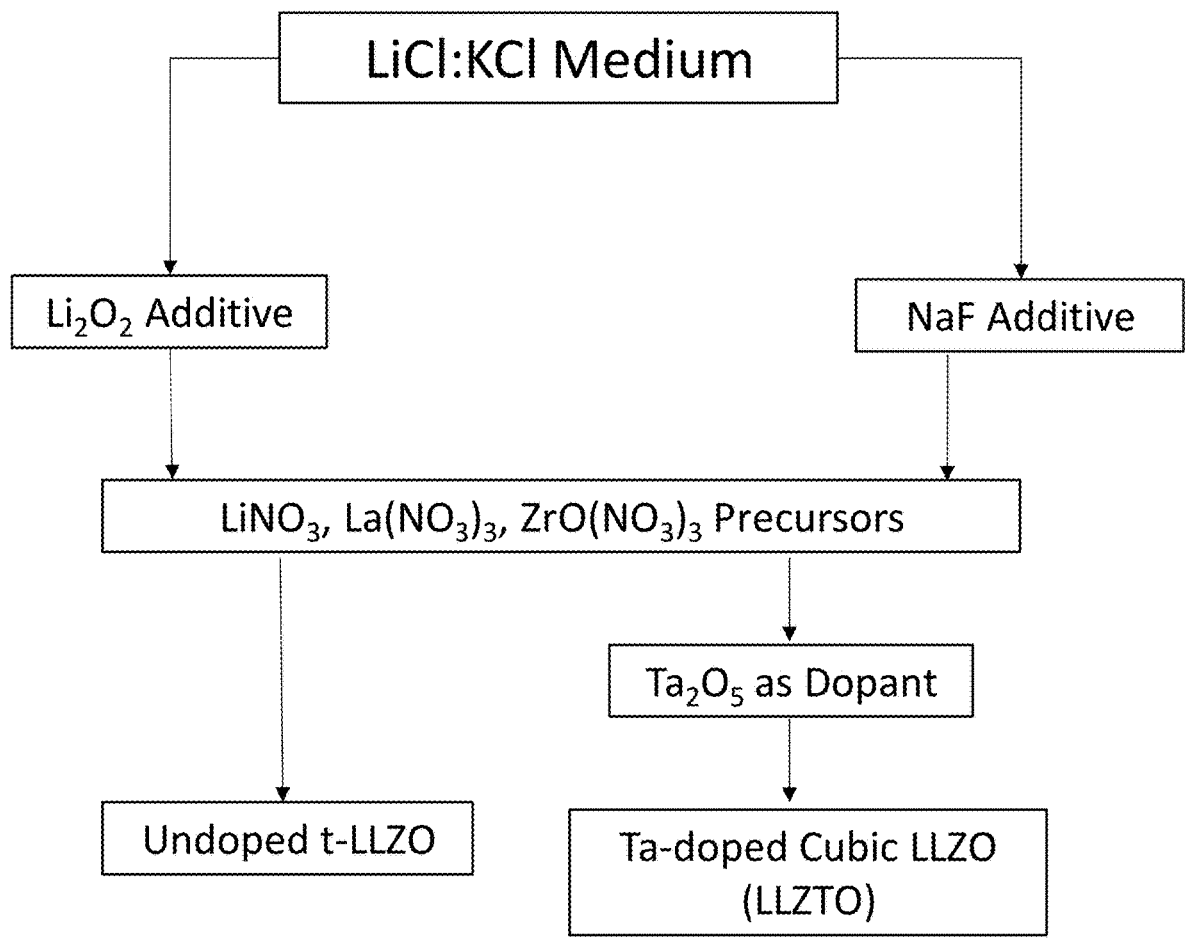
Figure 16D:
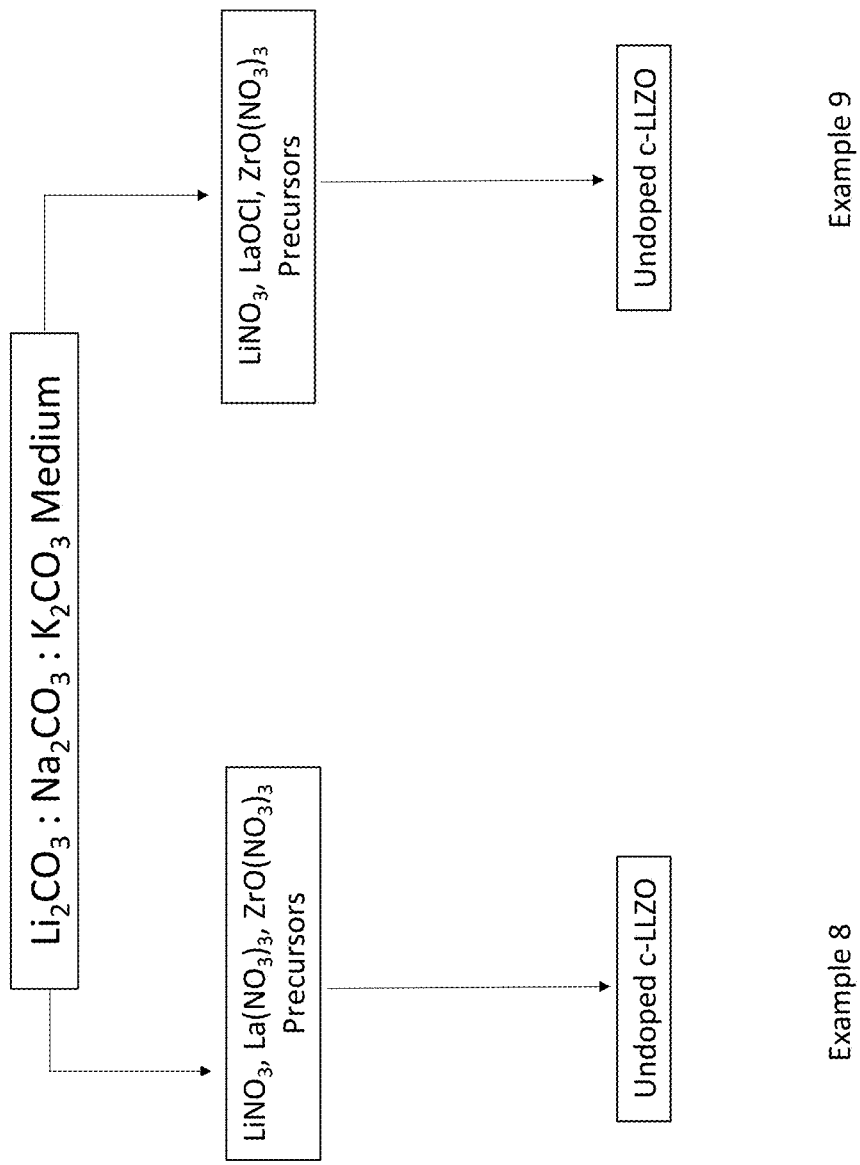
Figure 16E:
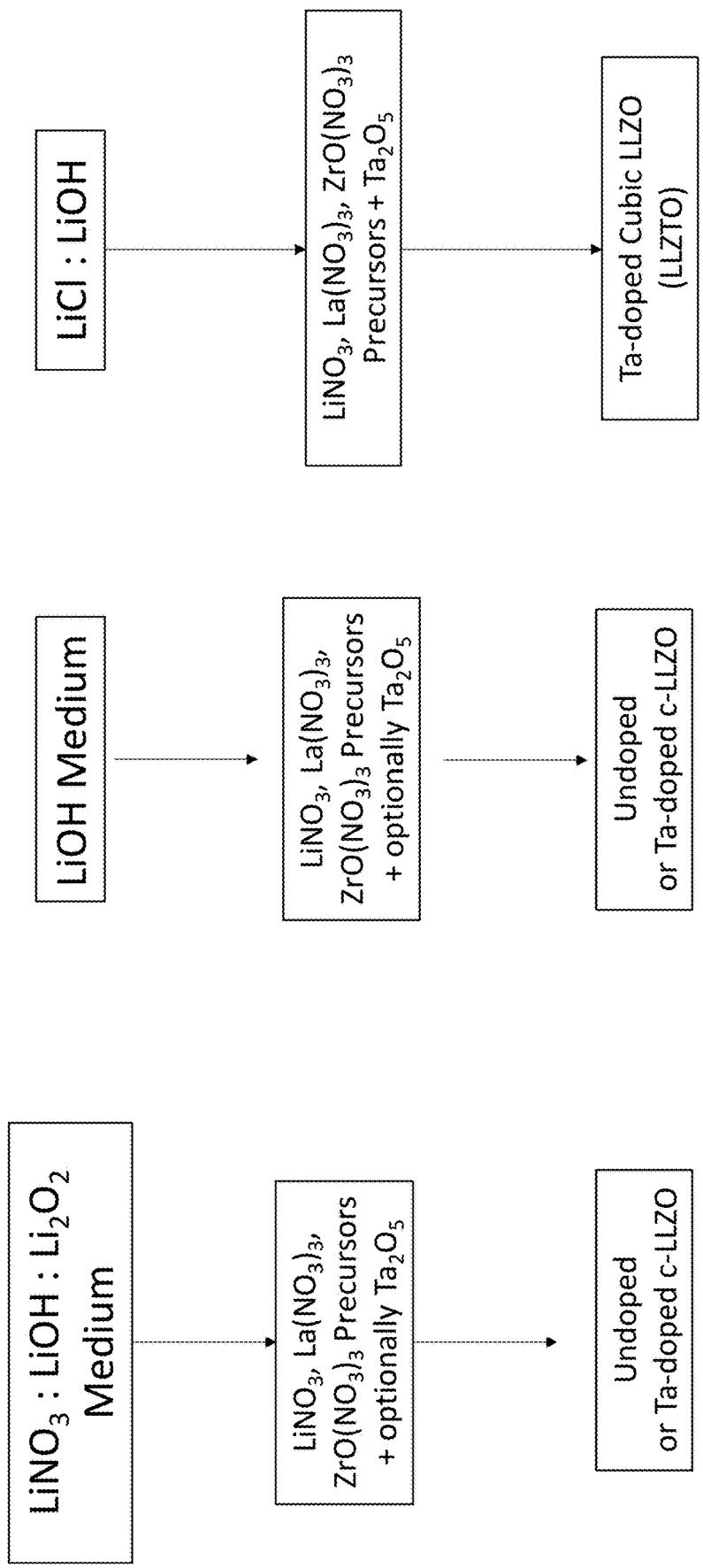

FIG. 16C shows a flow chart for products resulting from Examples 6 and 7. Examples 8, 9, 10, 11, 12 indicate that various combinations of alkaline (basic) salt media may enable synthesis of undoped cubic, doped cubic, and undoped tetragonal LLZO, and in some cases result in required reaction temperatures of as low as 550° C. FIG. 16D shows flow charts for products resulting from Examples 8 and 9, and FIG. 16E shows flow chart for products resulting from Examples 10, 11, and 12.

Only a few implementations are described and illustrated. Variations, enhancements and improvements of the described implementations and other implementations can be made based on what is described and illustrated in this document.

What is claimed is:

1. A method of synthesizing lithium lanthanum zirconate, the method comprising:
   combining a reagent composition with a salt composition to yield a salt reaction medium, wherein the reagent composition comprises a lithium component, a lanthanum component, and zirconium component having a lithium:lanthanum:zirconium molar ratio of about 7:3:2;
   heating the salt reaction medium to yield a reaction product; and
   washing the reaction product to yield a crystalline powder comprising lithium lanthanum zirconate,
   wherein the salt composition is selected from the group consisting of one of the following mixtures:
   a eutectic mixture of potassium chloride and lithium chloride, a eutectic mixture of lithium carbonate, sodium carbonate, and potassium carbonate,
a eutectic mixture of lithium chloride and lithium hydroxide,
a eutectic mixture of lithium bromide and potassium bromide, and
a basic mixture of lithium nitrate, lithium peroxide, and lithium hydroxide in a molar ratio of 1:2:2.

2. The method of claim 1, wherein the lithium component comprises lithium nitrate, lithium hypochlorite, or both.

3. The method of claim 1, wherein the lanthanum component comprises lanthanum nitrate, lanthanum oxychloride, or both.

4. The method of claim 1, wherein the zirconium component comprises zirconium oxide, zirconium oxynitrate, or both.

5. The method of claim 1, wherein the molten salt reaction medium comprises an extrinsic dopant.

6. The method of claim 5, wherein the extrinsic dopant comprises aluminum, gallium, tantalum, tungsten, or any combination thereof.

7. The method of claim 1, wherein the salt reaction medium comprises a reagent composition: salt composition weight ratio of 1:1.

8. The method of claim 1, wherein the lithium lanthanum zirconate consists of cubic phase $Li_7La_3Zr_2O_{12}$.

9. The method of claim 1, wherein the lithium lanthanum zirconate consists essentially of cubic phase $Li_7La_3Zr_2O_{12}$.

10. The method of claim 1, wherein the lithium lanthanum zirconate is in the form of nanoparticles.

11. The method of claim 10, wherein a maximum dimension of the nanoparticles is less than 1000 nm.

12. The method of claim 11, wherein the maximum dimension of the nanoparticles is between 300 nm and 500 nm.

13. The method of claim 1, wherein heating the molten salt reaction medium comprises heating to a temperature in a range of 700° C. to 1000° C.

14. The method of claim 1, wherein heating the molten salt reaction medium comprises heating for a length of time up to 12 hours.

15. The method of claim 1, further comprising combining sodium fluoride with the salt reaction mixture.

16. The method of claim 1, wherein the zirconium component comprises zirconium oxide nanoparticles.

17. The method of claim 1, wherein combining the reagent composition with the salt composition to yield the salt reaction medium comprises forming a mixture comprising the reagent composition and the salt composition and melting the mixture to yield the salt reaction medium.

18. The method of claim 1, wherein the salt composition is a molten salt composition.

19. The method of claim 18, further comprising melting the salt composition to yield the molten salt composition.

20. The method of claim 19, wherein heating the salt reaction medium comprises heating to a temperature in a range of 500° C. to 600° C.

* * * * *